(12) United States Patent
Leeman-Munk et al.

(10) Patent No.: US 10,048,826 B2
(45) Date of Patent: Aug. 14, 2018

(54) INTERACTIVE VISUALIZATIONS OF A CONVOLUTIONAL NEURAL NETWORK

(71) Applicants: SAS Institute Inc., Cary, NC (US); North Carolina State University, Raleigh, NC (US)

(72) Inventors: Samuel Paul Leeman-Munk, Cary, NC (US); Saratendu Sethi, Raleigh, NC (US); Christopher Graham Healey, Cary, NC (US); Shaoliang Nie, Raleigh, NC (US); Kalpesh Padia, Raleigh, NC (US); Ravinder Devarajan, Cary, NC (US); David James Caira, Chapel Hill, NC (US); Jordan Riley Benson, Ellerbe, NC (US); James Allen Cox, Cary, NC (US); Lawrence E. Lewis, Raleigh, NC (US); Mustafa Onur Kabul, Apex, NC (US)

(73) Assignees: SAS INSTITUTE INC., Cary, NC (US); NORTH CAROLINA STATE UNIVERSITY, Raleigh, NC (US)

( * ) Notice: Subject to any disclaimer, the term of this patent is extended or adjusted under 35 U.S.C. 154(b) by 0 days.

(21) Appl. No.: 15/724,029

(22) Filed: Oct. 3, 2017

(65) Prior Publication Data
US 2018/0095632 A1    Apr. 5, 2018

Related U.S. Application Data

(63) Continuation-in-part of application No. 15/584,984, filed on May 2, 2017, now Pat. No. 9,934,462.
(Continued)

(51) Int. Cl.
*G06N 3/04* (2006.01)
*G06F 3/0481* (2013.01)
(Continued)

(52) U.S. Cl.
CPC .......... *G06F 3/04812* (2013.01); *G06F 8/34* (2013.01); *G06N 3/04* (2013.01); *G06T 11/60* (2013.01); *G06N 3/105* (2013.01)

(58) Field of Classification Search
CPC ........................................................ G06N 3/04
(Continued)

(56) References Cited

U.S. PATENT DOCUMENTS

2006/0070005 A1    3/2006  Gilbert et al.
2015/0346972 A1   12/2015  Boekling et al.
(Continued)

OTHER PUBLICATIONS

Krizhevsky et al., "ImageNet Classification with Deep Convolutional Neural Networks" NIPS Proceedings, (2012), 9 pages.
(Continued)

*Primary Examiner* — Lut Wong
(74) *Attorney, Agent, or Firm* — Kilpatrick Townsend & Stockton LLP

(57) ABSTRACT

Interactive visualizations of a convolutional neural network are provided. For example, a graphical user interface (GUI) can include a matrix having symbols indicating feature-map values that represent likelihoods of particular features being present or absent at various locations in an input to a convolutional neural network. Each column in the matrix can have feature-map values generated by convolving the input to the convolutional neural network with a respective filter for identifying a particular feature in the input. The GUI can detect, via an input device, an interaction indicating that that the columns in the matrix are to be combined into a particular number of groups. Based on the interaction, the columns can be clustered into the particular number of groups using a clustering method. The matrix in the GUI can then be updated to visually represent each respective group of columns as a single column of symbols within the matrix.

30 Claims, 35 Drawing Sheets
(20 of 35 Drawing Sheet(s) Filed in Color)

Related U.S. Application Data

(60) Provisional application No. 62/486,112, filed on Apr. 17, 2017, provisional application No. 62/403,944, filed on Oct. 4, 2016, provisional application No. 62/439,968, filed on Dec. 29, 2016.

(51) Int. Cl.
*G06F 8/34* (2018.01)
*G06T 11/60* (2006.01)
*G06N 3/10* (2006.01)

(58) Field of Classification Search
USPC .......................................................... 706/11
See application file for complete search history.

(56) References Cited

U.S. PATENT DOCUMENTS

2016/0350336 A1* 12/2016 Checka ............. G06F 17/30268
2017/0364800 A1* 12/2017 Kiranyaz ................ G06F 11/26

OTHER PUBLICATIONS dos Santos et al., "Deep Convolutional Networks for Sentiment Analysis of Short Texts" Proceedings of COLING 2014, the 25th International Conference on Computational Linguistics: Technical Papers Dublin, Ireland, (Aug. 23-29, 2014) pp. 69-78.

Erhan et al., "Visualizing Higher-Layer Fatures of a Deep Network" University of Montreal, Technical Report 1341 (Jul. 9, 2009) 13 pages.

Hinton et al., "Deep Neural Networks for Acoustic Modeling in Speech Recognition" University of Toronto, (Apr. 27, 2012) 27 pages.

Lin et al., "Why does deep and cheap learning work so well?" Dept. of Physics, Harvard University and Dept. of Physics MIT Kavli Institute (Aug. 31, 2016) 14 pages.

Herman et al., "Graph Visualization and Navigation in Information Visualization" IEEE Transactions on Visualization and Computer Graphics, vol. 6 No. X (2000) 21 pages.

Leeman-Munk et al., "Deep Encoding and Reconstruction for Normalization of Noisy Text" Proceedings of the ACL 2015 Workshop on Noisy User-generated Text, Beijing, China (2015) pp. 154-161.

Ciresan et al., "Multi-column Deep Neural Networks for Image Classification" IDSIA USI-SUPSI, Lugano, Switzerland (2012) 8 pages.

Yosinski et al., "Understanding Neural Networks Through Deep Visualization" 31st International Conference on Machine Learning, Lille, France (2015), 12 pages.

Zeiler et al., "Visualizing and Understanding Convolutional Networks" Department of Computer Science, New York University (2014) 16 pages.

Ghoniem et al., "A comparison of the Readability of Graphs Using Node-Link and Matrix-Based Representations" IEEE Symposium on Information Visualization Oct. 10-12, 2004 Austin, TX (2004) 8 pages.

Ribeiro et al., "Why Should I Trust You?" Explaining the Predictions of Any Classifier, Computer Science & Engineering, University of Washington,(2017) 8 pages.

Henry et al., "Node Trix: A Hybrid Visualization of Social Networks" INRIA Futurs, France, (2007) 8 pages.

Kalchubrenner et al., "A Convolutional Neural Network for Modelling Sentences" Department of Computer Science, University of Oxford (2014) 11 pages.

Xu et al., "Interactive Visual Co-Cluster Analysis of Bipartite Graphs" IEEE VGTC sponsored conference proceedings (2016) 8 pages.

Kotsiantis, "Supervised Machine Learning: A Review of Classification Techniques" Department of Computer Science and Technology, University of Peloponnese, Greece (2007) 20 pages.

Russell et al., "Research Priorities for Robust and Beneficial Artificial Intelligence" Association for the Advancement of Artificial Intelligence, ISSN 0738-4602, (Winter 2015) 10 pages.

Playground Tensorflow, "A Neural Network Playground" retrieved from http://playground.tensorflow.org/ (2017) 3 pages.

Watson et al., "Visualizing very large layered graphs with quilts" retrieved from www.researchgate.net (2007), 9 pages.

Kim, "Convolutional Neural Networks for Sentence Classification" New York University, Proceedings of the 2014 Conference on Empirical Methods in Natural Language Proceedings (2014) pp. 1746-1751.

LeCun et al., "Deep learning" Macmillan Publishers Limited, 436 Nature vol. 521, (May 2015) 9 pages.

Zhang et al., "A Visual Analytics Approach to High-Dimensional Logistic Regression Modeling and its Application to an Environmental Health Study" IEEE Pacific Visualization Symposium (2016) 8 pages.

Non-Final Office Action dated Jul. 7, 2017 for U.S. Appl. No. 15/584,984, 12 pages.

Harley Adam W. "An Interactive Node-Link Visualization of Convolutional Neural Networks" Springer International Publishing Switzerland (2015) 11 pages.

Landesberger et al., "Visual Analysis of Large Graphs: State-of-the-Art and Future Research Challenges" Computer Graphics forum vol. 20 No. 6 (2011) 31 pages.

Rauber et al., "Visualizing the Hidden Activity of Artificial Neural Networks" IEEE Transactions on Visualization and Computer Graphics 23, 1, (2016) 10 pages.

Liu et al., "Towards Better Analysis of Deep Convolutional Neural Networks" IEEE Transactions on Visualization and Computer Graphics 23, 1, (2016) 10 pages.

Li Jiwei et al., "Visualizing and Understanding Neural Models in NLP" arXiv preprint arXiv:1506.01066, (2015) 10 pages.

Maaten et al., "Visualizing Data using t-SNE" Journal of Machine Learning Research 9, (2008) 27 pages.

Final Office Action dated Nov. 2, 2017 for U.S. Appl. No. 15/584,984, 15 pages.

Notice of Allowance dated Jan. 17, 2018 for U.S. Appl. No. 15/584,984, 8 pages.

Non-Final Office Action dated Feb. 21, 2018 for U.S. Appl. No. 15/725,026; 10 pages.

* cited by examiner

INTERACTIVE VISUALIZATIONS OF A CONVOLUTIONAL NEURAL NETWORK

REFERENCE TO RELATED APPLICATION

This claims the benefit of priority under 35 U.S.C. § 119(e) to U.S. Provisional Patent Application No. 62/486,112, titled "Visualizing Convolutional Deep Neural Networks" and filed Apr. 17, 2017, and under 35 U.S.C. § 120 as a continuation-in-part of co-pending U.S. patent application Ser. No. 15/584,984, titled "Visualizing Deep Neural Networks" and filed on May 2, 2017, which claims the benefit of priority under 35 U.S.C. § 119(e) to U.S. Provisional Patent Application No. 62/403,944, titled "Visualizing Deep Neural Networks" and filed Oct. 4, 2016, and to U.S. Provisional Patent Application No. 62/439,968, titled "Visualizing Deep Neural Networks" and filed Dec. 29, 2016, the entirety of each of which is hereby incorporated by reference herein.

TECHNICAL FIELD

The present disclosure relates generally to operator interface processing. More specifically, but not by way of limitation, this disclosure relates to graphical user interfaces for visualizing convolutional neural networks.

BACKGROUND

A neural network can be represented as one or more layers of interconnected "neurons" (or "nodes") that can exchange data between one another. The connections between the neurons can have numeric weights that can be tuned based on experience. Such tuning can make neural networks adaptive and capable of "learning."

A deep neural network is a neural network that has one or more hidden layers of neurons between an input layer and an output layer of the neural network. Such layers between the input layer and the output layer may be referred to as "hidden" because they may not be directly observable in the normal functioning of the neural network. A deep neural network can include any number of hidden layers, and each hidden layer can include any number of neurons.

SUMMARY

One example of the present disclosure includes a system for providing an interactive visualization of a convolutional neural network. The system includes a processing device and a memory device on which instructions executable by the processing device are stored. The instructions can cause the processing device to display, via a display device, a graphical user interface comprising a matrix having rows and columns of symbols indicating feature-map values that represent likelihoods of particular features being present or absent at various locations in an input to a convolutional neural network. Each column in the matrix can have feature-map values generated by convolving the input to the convolutional neural network with a respective filter for identifying a particular feature in the input. The instructions can cause the processing device to detect, via an input device, an interaction with the graphical user interface indicating that the columns in the matrix are to be combined into a particular number of groups. The instructions can cause the processing device to perform operations in response to detecting the interaction. The operations can include clustering the columns into the particular number of groups using a clustering method. The operations can include, for each group of columns, determining a plurality of average feature-map values. Each average feature-map value can be determined by averaging the feature-map values represented in a respective row of the columns. The operations can include displaying an updated version of the matrix within the graphical user interface by visually representing each respective group of columns as a single column of symbols within the matrix. Each symbol in the single column of symbols can have visual characteristics representing an average feature-map value, from among the plurality of average feature-map values, that corresponds to a row in which the symbol is positioned.

Another example of the present disclosure includes a method for providing an interactive visualization of a convolutional neural network. The method can include displaying, via a display device, a graphical user interface comprising a matrix having rows and columns of symbols indicating feature-map values that represent likelihoods of particular features being present or absent at various locations in an input to a convolutional neural network. Each column in the matrix can have feature-map values generated by convolving the input to the convolutional neural network with a respective filter for identifying a particular feature in the input. The method can include detecting, via an input device, an interaction with the graphical user interface indicating that the columns in the matrix are to be combined into a particular number of groups. The method can include performing operations in response to detecting the interaction. The operations can include clustering the columns into the particular number of groups using a clustering method. The operations can include, for each group of columns, determining a plurality of average feature-map values. Each average feature-map value can be determined by averaging the feature-map values represented in a respective row of the columns. The operations can include displaying, via the display device, an updated version of the matrix within the graphical user interface by visually representing each respective group of columns as a single column of symbols within the matrix. Each symbol in the single column of symbols can have visual characteristics representing an average feature-map value, from among the plurality of average feature-map values, that corresponds to a row in which the symbol is positioned. Some or all of the method can be performed by a processing device.

Another example of the present disclosure includes a non-transitory computer-readable medium comprising program code that is executable by a processing device. The program code can cause the processing device to display, via a display device, a graphical user interface comprising a matrix having rows and columns of symbols indicating feature-map values that represent likelihoods of particular features being present or absent at various locations in an input to a convolutional neural network. Each column in the matrix can have feature-map values generated by convolving the input to the convolutional neural network with a respective filter for identifying a particular feature in the input. The program code can cause the processing device to detect, via an input device, an interaction with the graphical user interface indicating that the columns in the matrix are to be combined into a particular number of groups. The program code can cause the processing device to perform operations in response to detecting the interaction. The operations can include clustering the columns into the particular number of groups using a clustering method. The operations can include, for each group of columns, determining a plurality of average feature-map values. Each average feature-map value can be determined by averaging the feature-map values represented in a respective row of the columns. The operations can include displaying an updated version of the matrix within the graphical user interface by visually representing each respective group of columns as a single column of symbols within the matrix. Each symbol in the single column of symbols can have visual characteristics representing an average feature-map value, from among the plurality of average feature-map values, that corresponds to a row in which the symbol is positioned.

This summary is not intended to identify key or essential features of the claimed subject matter, nor is it intended to be used in isolation to determine the scope of the claimed subject matter. The subject matter should be understood by reference to appropriate portions of the entire specification, any or all drawings, and each claim.

The foregoing, together with other features and examples, will become more apparent upon referring to the following specification, claims, and accompanying drawings.

BRIEF DESCRIPTION OF THE DRAWINGS

The patent or application file contains at least one drawing executed in color. Copies of this patent or patent application publication with color drawings will be provided by the office upon request and payment of any necessary fee. The present disclosure is described in conjunction with the appended figures.

Figure 1:
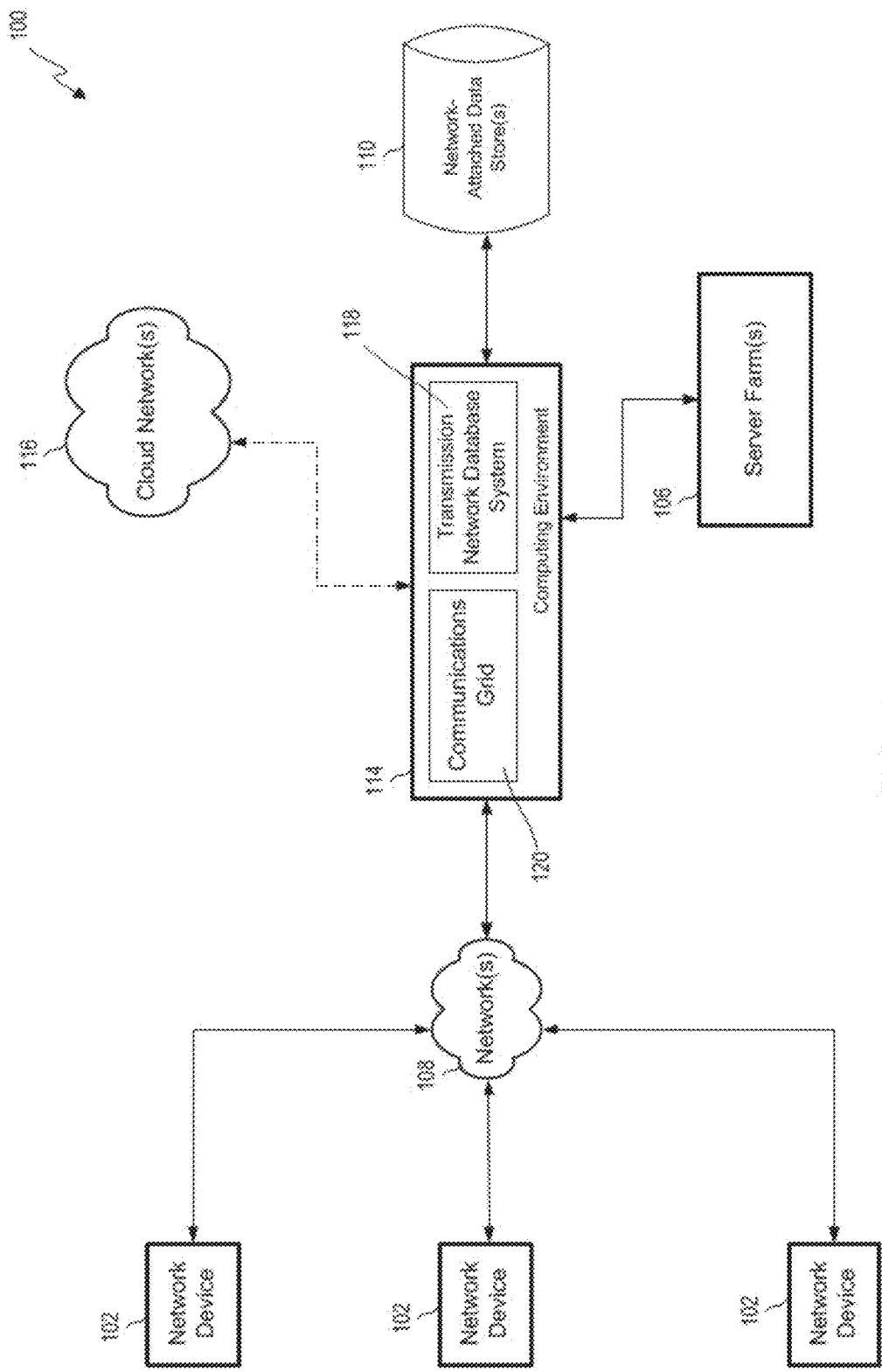
FIG. 1 is a block diagram of an example of the hardware components of a computing system according to some aspects.

In the appended figures, similar components or features can have the same reference label. Further, various components of the same type can be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

In the following description, for the purposes of explanation, specific details are set forth in order to provide a thorough understanding of examples of the technology. But various examples can be practiced without these specific details. The figures and description are not intended to be restrictive.

The ensuing description provides examples only, and is not intended to limit the scope, applicability, or configuration of the disclosure. Rather, the ensuing description of the examples provides those skilled in the art with an enabling description for implementing an example. Various changes may be made in the function and arrangement of elements without departing from the spirit and scope of the technology as set forth in the appended claims.

Specific details are given in the following description to provide a thorough understanding of the examples. But the examples may be practiced without these specific details. For example, circuits, systems, networks, processes, and other components can be shown as components in block diagram form to prevent obscuring the examples in unnecessary detail. In other examples, well-known circuits, processes, algorithms, structures, and techniques may be shown without unnecessary detail in order to avoid obscuring the examples.

Also, individual examples can be described as a process that is depicted as a flowchart, a flow diagram, a data flow diagram, a structure diagram, or a block diagram. Although a flowchart can describe the operations as a sequential process, many of the operations can be performed in parallel or concurrently. In addition, the order of the operations can be re-arranged. A process is terminated when its operations are completed, but can have additional operations not included in a figure. A process can correspond to a method, a function, a procedure, a subroutine, a subprogram, etc. When a process corresponds to a function, its termination can correspond to a return of the function to the calling function or the main function.

Systems depicted in some of the figures can be provided in various configurations. In some examples, the systems can be configured as a distributed system where one or more components of the system are distributed across one or more networks in a cloud computing system.

Certain aspects and features of the present disclosure relate to a graphical user interface (GUI) for visualizing a deep neural network. The GUI can include a node-link diagram that visually represents nodes (neurons) in the deep neural network and connections (links) between the nodes. The GUI can additionally or alternatively include a quilt graph having a matrix of cells indicating connections between nodes in the deep neural network. The node-link diagram and the quilt graph can be color coded to express information about the nodes and connections in the deep neural network. For example, objects representing nodes and connections in the node-link diagram and the quilt graph can be colored various shades of red or blue to express the activation values of the nodes and connections in the deep neural network. The GUI can also provide thresholding, node inspection, and tooltip operations that enable a user to customize the amount of visual information displayed by the GUI.

In some examples, the GUI can have multiple operational modes—for instance, an input mode, an animation mode, and a comparison mode. The input mode can enable a user to provide an input to the deep neural network and visualize how the deep neural network responds to the input. The animation mode can provide multiple inputs to the deep neural network, aggregate values associated with the nodes and connections resulting from the multiple inputs, and display the aggregate values in the node-link diagram and the quilt graph. The comparison mode can enable a user to compare a first set of values resulting from one input into the deep neural network against a second set of values resulting from another input into the deep neural network. For example, the comparison mode can determine a difference between the first set of values and the second set of values and display the difference in the node-link diagram and the quilt graph.

In some examples, the GUI can be tailored for presenting information about a convolutional neural network, which can be a type of deep neural network. More specifically, a convolutional neural network can be a deep neural network that includes a convolutional layer for performing convolution operations on an input to the convolutional neural network. The convolutional layer can include one or more filters (which can also be referred to as "kernels") for identifying features in the input. A filter can be a two-dimensional matrix of weights that can be trained or tuned. During a forward pass, each of the filters slides across (e.g., is convolved with) an input to the convolutional neural network. As a filter slides over the input, dot products are computed between the filter's weights and each position in the input. This can result in a feature map that includes the filter's responses at every spatial position in the input. This process can be repeated for each filter to produce separate feature maps for each filter. The convolutional neural network can learn which filters activate when the filter "sees" a particular feature in the input. For example, the convolutional neural network can learn that a certain filter actives when there is a particular visual feature in an input image. Some GUIs of the present disclosure can display information related to the convolutional layer(s), filter(s), feature maps, or any combination of these. The convolutional neural network can also include a pooling layer, a set of fully connected layers (e.g., that form a feed forward neural network), or both. Some examples of the present disclosure can include graphical information related to the pooling layer, the set of fully connected layers, or both.

In some examples, the abovementioned features can enable a user to discover and explore characteristics of a deep neural network that are not well understood currently. Presently, deep neural networks are often considered a "black box." For example, although the procedure to train and use deep neural networks may be known, a deeper understanding of the inner workings of deep neural networks is often lacking. And, as deep neural networks grow in size, more parameters accumulate and it can become more difficult to understand what the deep neural network is doing to produce its final results. But some examples of the present disclosure provide an intuitive, easy-to-use GUI that can enable users to obtain a better understanding of how a deep neural network is operating, why the deep neural network is making certain decisions, and how the deep neural network produces final results. This may lead to a better understanding of how to train and build deep neural networks that are more efficient, robust, and accurate. For example, information displayed in the GUI may enable a designer to determine: (i) how a deep neural network returns a certain output;

(ii) how input values move through nodes and links in the deep neural network to generate the output; and (iii) how changing the values of the input affect movement through the deep neural network and the output value returned. In one particular example, a designer of a deep neural network can review hidden-layer activations for patterns that relate to concepts to be learned by the deep neural network. If the designer fails to recognize any patterns in the hidden-layer activations, it may indicate that the deep neural network is simply storing data by rote memorization, rather than learning the deeper concepts. The designer may be able to address this issue by, for example, supplying more training data to the deep neural network or simplifying the deep neural network. But without the visualizations provided in some examples of the present disclosure, the designer may be unable to properly identify the issue.

In some examples, information displayed in the GUI may enable a designer of a deep neural network to optimize the deep neural network to reduce (i) the number of processing cycles executed by the deep neural network, (ii) the amount of memory consumed by the deep neural network, (iii) the amount of memory accesses performed by the deep neural network, (iv) or any combination of these. As a particular example, a designer of a deep neural network can use the GUI to determine that certain hidden layers (or nodes) produce repetitive results or are otherwise extraneous. So, the designer can remove these hidden layers (or nodes) to reduce the amount of unnecessary processing that is performed by the neural network.

Some examples of the present disclosure can use specific rules that render information in a specific format that is then used and applied to create the GUI. For example, in the animation mode, the computing device can use specific rules that (i) generate different states in a deep neural network as a function of multiple different inputs; (ii) aggregate information from the different states of the neural network into aggregated data; and (iii) apply transformations to the aggregated data to generate output data. The output data can then be used to generate the GUI. As another example, in the comparison mode, the computing device can use specific rules that (i) generate two different states in a deep neural network as a function of two different inputs; (ii) compare information from the different states of the neural network to determine comparison data; (iii) apply transformations to the comparison data to generate output data. The output data can then be used to generate the GUI. In some examples, the transformations of the aggregated data (or the comparison data) can include multiplying, dividing, subtracting, or otherwise manipulating portions of the aggregated data (or the comparison data).

In some examples, a deep neural network can be represented by specific rules. For example, a set of rules can define outputs of the deep neural network as a function of inputs and weights corresponding nodes and connections in the deep neural network. Respective values for the nodes in the deep neural network can be generated by evaluating an input against the set of rules. These values can be referred to as intermediate values. Respective values for the connections between the nodes in the deep neural network can also be generated by evaluating the input against the set of rules. These values can be transition values. A final output of the deep neural network can be generated from the intermediate values and the transition values. The intermediate values, transition values, final output, or any combination of these can be rendered in the GUI.

FIGS. 1-10 depict examples of systems and methods usable for visualizing deep neural networks according to some aspects. For example, FIG. 1 is a block diagram of an example of the hardware components of a computing system according to some aspects. Data transmission network 100 is a specialized computer system that may be used for processing large amounts of data where a large number of computer processing cycles are required.

Data transmission network 100 may also include computing environment 114. Computing environment 114 may be a specialized computer or other machine that processes the data received within the data transmission network 100. The computing environment 114 may include one or more other systems. For example, computing environment 114 may include a database system 118 or a communications grid 120. The computing environment 114 can include one or more processing devices (e.g., distributed over one or more networks or otherwise in communication with one another) that, in some examples, can collectively be referred to as a processor or a processing device.

Data transmission network 100 also includes one or more network devices 102. Network devices 102 may include client devices that can communicate with computing environment 114. For example, network devices 102 may send data to the computing environment 114 to be processed, may send communications to the computing environment 114 to control different aspects of the computing environment or the data it is processing, among other reasons. Network devices 102 may interact with the computing environment 114 through a number of ways, such as, for example, over one or more networks 108.

In some examples, network devices 102 may provide a large amount of data, either all at once or streaming over a period of time (e.g., using event stream processing (ESP)), to the computing environment 114 via networks 108. For example, the network devices 102 can transmit electronic messages (e.g., for use in visualizing deep neural networks) all at once or streaming over a period of time, to the computing environment 114 via networks 108.

The network devices 102 may include network computers, sensors, databases, or other devices that may transmit or otherwise provide data to computing environment 114. For example, network devices 102 may include local area network devices, such as routers, hubs, switches, or other computer networking devices. These devices may provide a variety of stored or generated data, such as network data or data specific to the network devices 102 themselves. Network devices 102 may also include sensors that monitor their environment or other devices to collect data regarding that environment or those devices, and such network devices 102 may provide data they collect over time. Network devices 102 may also include devices within the internet of things, such as devices within a home automation network. Some of these devices may be referred to as edge devices, and may involve edge-computing circuitry. Data may be transmitted by network devices 102 directly to computing environment 114 or to network-attached data stores, such as network-attached data stores 110 for storage so that the data may be retrieved later by the computing environment 114 or other portions of data transmission network 100. For example, the network devices 102 can transmit data usable for visualizing deep neural networks to a network-attached data store 110 for storage. The computing environment 114 may later retrieve the data from the network-attached data store 110 and use the data to generate a GUI for visualizing deep neural networks.

Network-attached data stores 110 can store data to be processed by the computing environment 114 as well as any intermediate or final data generated by the computing system in non-volatile memory. But in certain examples, the configuration of the computing environment 114 allows its operations to be performed such that intermediate and final data results can be stored solely in volatile memory (e.g., RAM), without a requirement that intermediate or final data results be stored to non-volatile types of memory (e.g., disk). This can be useful in certain situations, such as when the computing environment 114 receives ad hoc queries from a user and when responses, which are generated by processing large amounts of data, need to be generated dynamically (e.g., on the fly). In this situation, the computing environment 114 may be configured to retain the processed information within memory so that responses can be generated for the user at different levels of detail as well as allow a user to interactively query against this information.

Network-attached data stores 110 may store a variety of different types of data organized in a variety of different ways and from a variety of different sources. For example, network-attached data stores may include storage other than primary storage located within computing environment 114 that is directly accessible by processors located therein. Network-attached data stores may include secondary, tertiary or auxiliary storage, such as large hard drives, servers, virtual memory, among other types. Storage devices may include portable or non-portable storage devices, optical storage devices, and various other mediums capable of storing, containing data. A machine-readable storage medium or computer-readable storage medium may include a non-transitory medium in which data can be stored and that does not include carrier waves or transitory electronic communications. Examples of a non-transitory medium may include, for example, a magnetic disk or tape, optical storage media such as compact disk or digital versatile disk, flash memory, memory or memory devices. A computer-program product may include code or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing or receiving information, data, arguments, parameters, or memory contents. Information, arguments, parameters, data, etc. may be passed, forwarded, or transmitted via any suitable means including memory sharing, message passing, token passing, network transmission, among others. Furthermore, the data stores may hold a variety of different types of data. For example, network-attached data stores 110 may hold unstructured (e.g., raw) data.

The unstructured data may be presented to the computing environment 114 in different forms such as a flat file or a conglomerate of data records, and may have data values and accompanying time stamps. The computing environment 114 may be used to analyze the unstructured data in a variety of ways to determine the best way to structure (e.g., hierarchically) that data, such that the structured data is tailored to a type of further analysis that a user wishes to perform on the data. For example, after being processed, the unstructured time-stamped data may be aggregated by time (e.g., into daily time period units) to generate time series data or structured hierarchically according to one or more dimensions (e.g., parameters, attributes, or variables). For example, data may be stored in a hierarchical data structure, such as a relational online analytical processing (ROLAP) or multidimensional online analytical processing (MOLAP) database, or may be stored in another tabular form, such as in a flat-hierarchy form.

Data transmission network 100 may also include one or more server farms 106. Computing environment 114 may route select communications or data to the sever farms 106 or one or more servers within the server farms 106. Server farms 106 can be configured to provide information in a predetermined manner. For example, server farms 106 may access data to transmit in response to a communication. Server farms 106 may be separately housed from each other device within data transmission network 100, such as computing environment 114, or may be part of a device or system.

Server farms 106 may host a variety of different types of data processing as part of data transmission network 100. Server farms 106 may receive a variety of different data from network devices, from computing environment 114, from cloud network 116, or from other sources. The data may have been obtained or collected from one or more websites, sensors, as inputs from a control database, or may have been received as inputs from an external system or device. Server farms 106 may assist in processing the data by turning raw data into processed data based on one or more rules implemented by the server farms. For example, sensor data may be analyzed to determine changes in an environment over time or in real-time.

Data transmission network 100 may also include one or more cloud networks 116. Cloud network 116 may include a cloud infrastructure system that provides cloud services. In certain examples, services provided by the cloud network 116 may include a host of services that are made available to users of the cloud infrastructure system on demand. Cloud network 116 is shown in FIG. 1 as being connected to computing environment 114 (and therefore having computing environment 114 as its client or user), but cloud network 116 may be connected to or utilized by any of the devices in FIG. 1. Services provided by the cloud network 116 can dynamically scale to meet the needs of its users. The cloud network 116 may include one or more computers, servers, or systems. In some examples, the computers, servers, or systems that make up the cloud network 116 are different from the user's own on-premises computers, servers, or systems. For example, the cloud network 116 may host an application, and a user may, via a communication network such as the Internet, order and use the application on demand. In some examples, the cloud network 116 may host an application for visualizing deep neural networks.

While each device, server, and system in FIG. 1 is shown as a single device, multiple devices may instead be used. For example, a set of network devices can be used to transmit various communications from a single user, or remote server 140 may include a server stack. As another example, data may be processed as part of computing environment 114.

Each communication within data transmission network 100 (e.g., between client devices, between a device and connection management system 150, between server farms 106 and computing environment 114, or between a server and a device) may occur over one or more networks 108. Networks 108 may include one or more of a variety of different types of networks, including a wireless network, a wired network, or a combination of a wired and wireless network. Examples of suitable networks include the Internet, a personal area network, a local area network (LAN), a wide area network (WAN), or a wireless local area network (WLAN). A wireless network may include a wireless interface or combination of wireless interfaces. As an example, a network in the one or more networks 108 may include a short-range communication channel, such as a Bluetooth or a Bluetooth Low Energy channel. A wired network may include a wired interface. The wired or wireless networks may be implemented using routers, access points, bridges, gateways, or the like, to connect devices in the network 108. The networks 108 can be incorporated entirely within or can include an intranet, an extranet, or a combination thereof. In one example, communications between two or more systems or devices can be achieved by a secure communications protocol, such as secure sockets layer (SSL) or transport layer security (TLS). In addition, data or transactional details may be encrypted.

Some aspects may utilize the Internet of Things (IoT), where things (e.g., machines, devices, phones, sensors) can be connected to networks and the data from these things can be collected and processed within the things or external to the things. For example, the IoT can include sensors in many different devices, and high value analytics can be applied to identify hidden relationships and drive increased efficiencies. This can apply to both big data analytics and real-time (e.g., ESP) analytics.

As noted, computing environment 114 may include a communications grid 120 and a transmission network database system 118. Communications grid 120 may be a grid-based computing system for processing large amounts of data. The transmission network database system 118 may be for managing, storing, and retrieving large amounts of data that are distributed to and stored in the one or more network-attached data stores 110 or other data stores that reside at different locations within the transmission network database system 118. The computing nodes in the communications grid 120 and the transmission network database system 118 may share the same processor hardware, such as processors that are located within computing environment 114.

In some examples, the computing environment 114, a network device 102, or both can implement one or more processes for visualizing deep neural networks. For example, the computing environment 114, a network device 102, or both can implement one or more versions of the processes discussed with respect to FIGS. 22-24.

Figure 2:
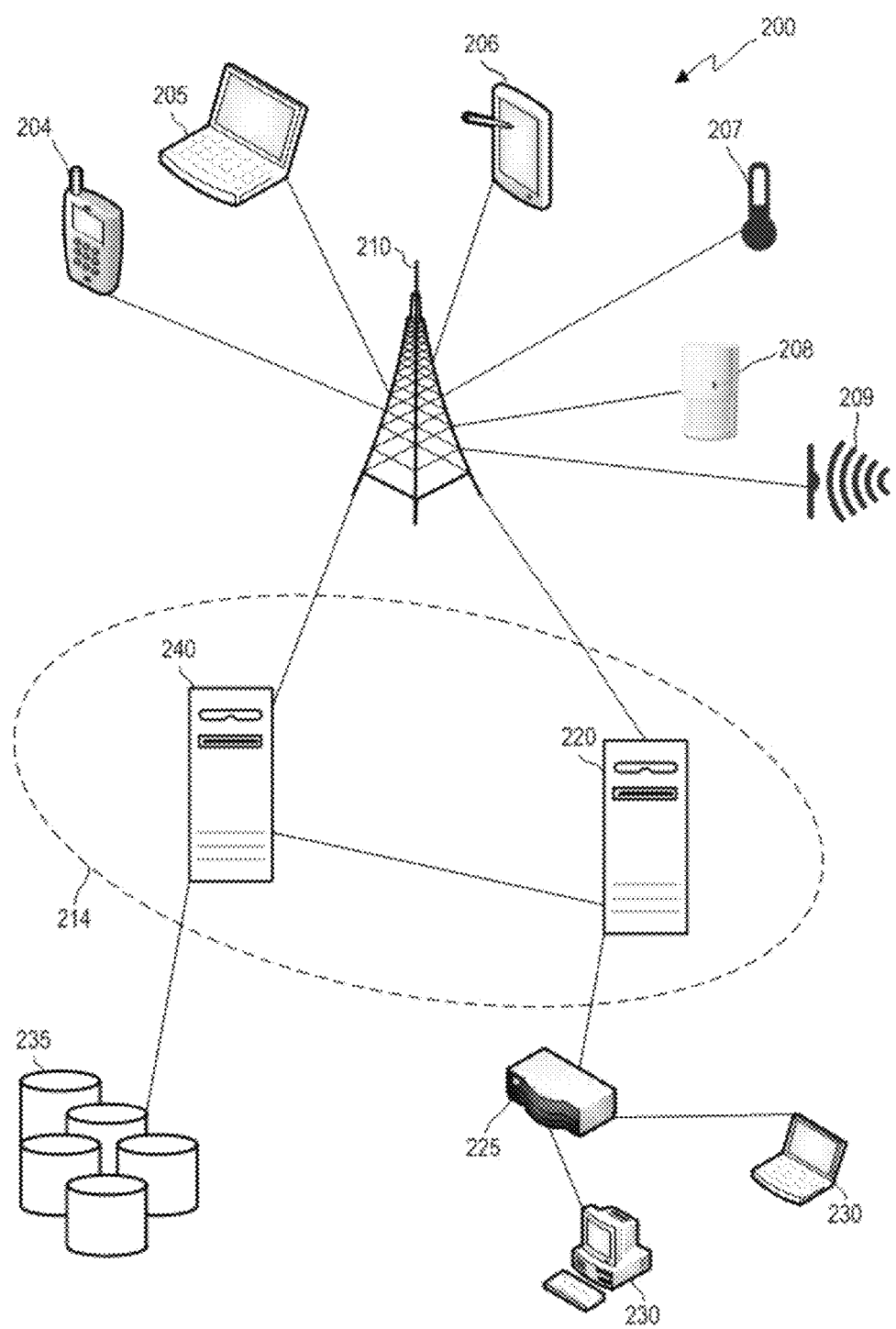
FIG. 2 is an example of devices that can communicate with each other over an exchange system and via a network according to some aspects.

FIG. 2 is an example of devices that can communicate with each other over an exchange system and via a network according to some aspects. As noted, each communication within data transmission network 100 may occur over one or more networks. System 200 includes a network device 204 configured to communicate with a variety of types of client devices, for example client devices 230, over a variety of types of communication channels.

As shown in FIG. 2, network device 204 can transmit a communication over a network (e.g., a cellular network via a base station 210). In some examples, the communication can include times series data. The communication can be routed to another network device, such as network devices 205-209, via base station 210. The communication can also be routed to computing environment 214 via base station 210. In some examples, the network device 204 may collect data either from its surrounding environment or from other network devices (such as network devices 205-209) and transmit that data to computing environment 214.

Although network devices 204-209 are shown in FIG. 2 as a mobile phone, laptop computer, tablet computer, temperature sensor, motion sensor, and audio sensor respectively, the network devices may be or include sensors that are sensitive to detecting aspects of their environment. For example, the network devices may include sensors such as water sensors, power sensors, electrical current sensors, chemical sensors, optical sensors, pressure sensors, geographic or position sensors (e.g., GPS), velocity sensors, acceleration sensors, flow rate sensors, among others. Examples of characteristics that may be sensed include force, torque, load, strain, position, temperature, air pressure, fluid flow, chemical properties, resistance, electromagnetic fields, radiation, irradiance, proximity, acoustics, moisture, distance, speed, vibrations, acceleration, electrical potential, and electrical current, among others. The sensors may be mounted to various components used as part of a variety of different types of systems. The network devices may detect and record data related to the environment that it monitors, and transmit that data to computing environment 214.

The network devices 204-209 may also perform processing on data it collects before transmitting the data to the computing environment 214, or before deciding whether to transmit data to the computing environment 214. For example, network devices 204-209 may determine whether data collected meets certain rules, for example by comparing data or values calculated from the data and comparing that data to one or more thresholds. The network devices 204-209 may use this data or comparisons to determine if the data is to be transmitted to the computing environment 214 for further use or processing. In some examples, the network devices 204-209 can pre-process the data prior to transmitting the data to the computing environment 214. For example, the network devices 204-209 can reformat the data before transmitting the data to the computing environment 214 for further processing (e.g., analyzing the data to generate a GUI for visualizing deep neural networks).

Computing environment 214 may include machines 220, 240. Although computing environment 214 is shown in FIG. 2 as having two machines 220, 240, computing environment 214 may have only one machine or may have more than two machines. The machines 220, 240 that make up computing environment 214 may include specialized computers, servers, or other machines that are configured to individually or collectively process large amounts of data. The computing environment 214 may also include storage devices that include one or more databases of structured data, such as data organized in one or more hierarchies, or unstructured data. The databases may communicate with the processing devices within computing environment 214 to distribute data to them. Since network devices may transmit data to computing environment 214, that data may be received by the computing environment 214 and subsequently stored within those storage devices. Data used by computing environment 214 may also be stored in data stores 235, which may also be a part of or connected to computing environment 214.

Computing environment 214 can communicate with various devices via one or more routers 225 or other inter-network or intra-network connection components. For example, computing environment 214 may communicate with client devices 230 via one or more routers 225. Computing environment 214 may collect, analyze or store data from or pertaining to communications, client device operations, client rules, or user-associated actions stored at one or more data stores 235. Such data may influence communication routing to the devices within computing environment 214, how data is stored or processed within computing environment 214, among other actions.

Notably, various other devices can further be used to influence communication routing or processing between devices within computing environment 214 and with devices outside of computing environment 214. For example, as shown in FIG. 2, computing environment 214 may include a machine 240 that is a web server. Computing environment 214 can retrieve data of interest, such as client information (e.g., product information, client rules, etc.), technical product details, news, blog posts, e-mails, forum posts, electronic documents, social media posts (e.g., Twitter™ posts or Facebook™ posts), time series data, and so on.

In addition to computing environment 214 collecting data (e.g., as received from network devices, such as sensors, and client devices or other sources) to be processed as part of a big data analytics project, it may also receive data in real time as part of a streaming analytics environment. As noted, data may be collected using a variety of sources as communicated via different kinds of networks or locally. Such data may be received on a real-time streaming basis. For example, network devices 204-209 may receive data periodically and in real time from a web server or other source. Devices within computing environment 214 may also perform pre-analysis on data it receives to determine if the data received should be processed as part of an ongoing project. For example, as part of a project in which a visualization of a deep neural network is generated from data, the computing environment 214 can perform a pre-analysis of the data. The pre-analysis can include determining whether the data is in a correct format for the visualization and, if not, reformatting the data into the correct format.

Figure 3:
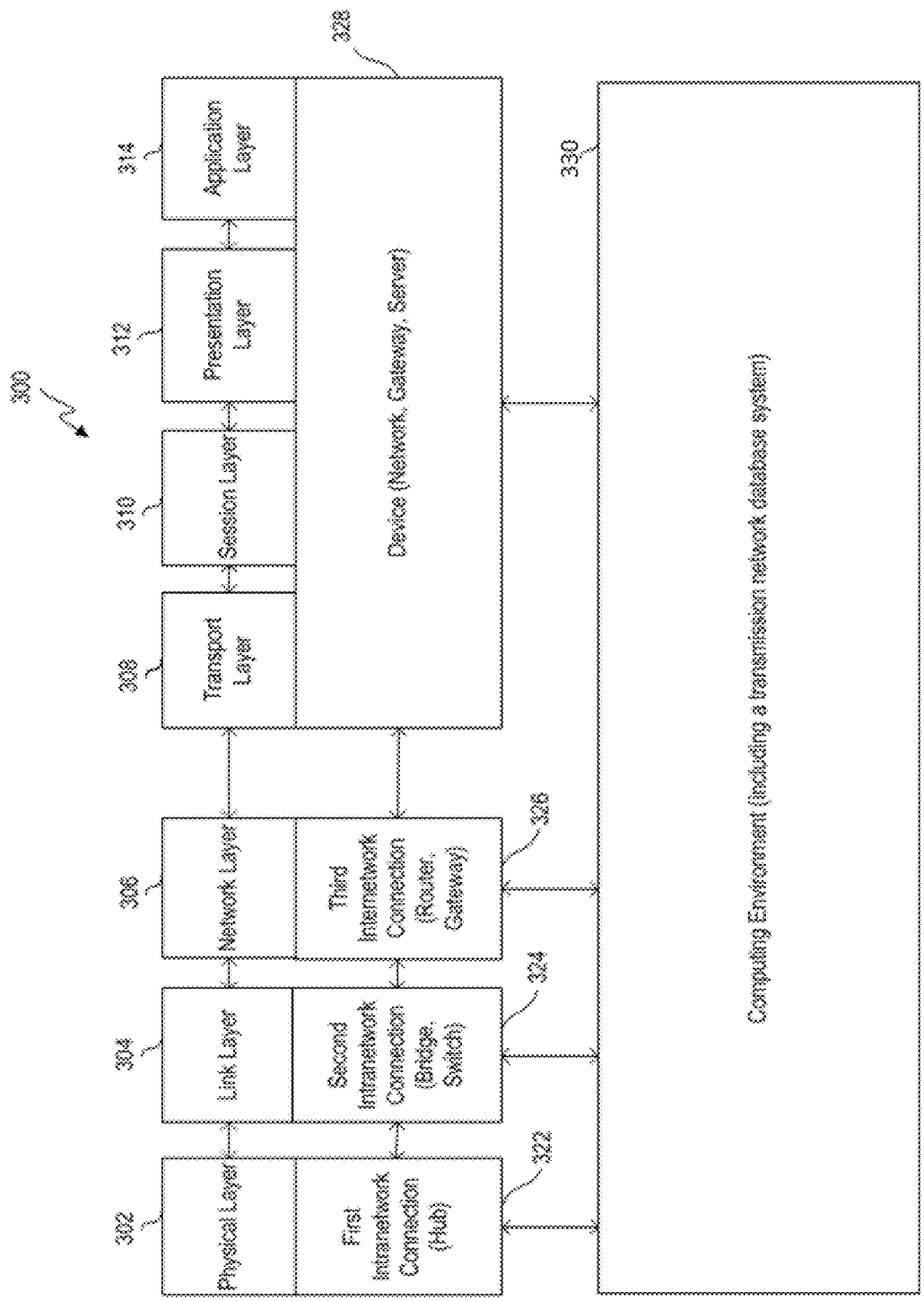
FIG. 3 is a block diagram of a model of an example of a communications protocol system according to some aspects.

FIG. 3 is a block diagram of a model of an example of a communications protocol system according to some aspects. More specifically, FIG. 3 identifies operation of a computing environment in an Open Systems Interaction model that corresponds to various connection components. The model 300 shows, for example, how a computing environment, such as computing environment (or computing environment 214 in FIG. 2) may communicate with other devices in its network, and control how communications between the computing environment and other devices are executed and under what conditions.

The model 300 can include layers 302-314. The layers 302-314 are arranged in a stack. Each layer in the stack serves the layer one level higher than it (except for the application layer, which is the highest layer), and is served by the layer one level below it (except for the physical layer 302, which is the lowest layer). The physical layer 302 is the lowest layer because it receives and transmits raw bites of data, and is the farthest layer from the user in a communications system. On the other hand, the application layer is the highest layer because it interacts directly with a software application.

As noted, the model 300 includes a physical layer 302. Physical layer 302 represents physical communication, and can define parameters of that physical communication. For example, such physical communication may come in the form of electrical, optical, or electromagnetic communications. Physical layer 302 also defines protocols that may control communications within a data transmission network.

Link layer 304 defines links and mechanisms used to transmit (e.g., move) data across a network. The link layer manages node-to-node communications, such as within a grid-computing environment. Link layer 304 can detect and correct errors (e.g., transmission errors in the physical layer 302). Link layer 304 can also include a media access control (MAC) layer and logical link control (LLC) layer.

Network layer 306 can define the protocol for routing within a network. In other words, the network layer coordinates transferring data across nodes in a same network (e.g., such as a grid-computing environment). Network layer 306 can also define the processes used to structure local addressing within the network.

Transport layer 308 can manage the transmission of data and the quality of the transmission or receipt of that data. Transport layer 308 can provide a protocol for transferring data, such as, for example, a Transmission Control Protocol (TCP). Transport layer 308 can assemble and disassemble data frames for transmission. The transport layer can also detect transmission errors occurring in the layers below it.

Session layer 310 can establish, maintain, and manage communication connections between devices on a network. In other words, the session layer controls the dialogues or nature of communications between network devices on the network. The session layer may also establish checkpointing, adjournment, termination, and restart procedures.

Presentation layer 312 can provide translation for communications between the application and network layers. In other words, this layer may encrypt, decrypt or format data based on data types known to be accepted by an application or network layer.

Application layer 314 interacts directly with software applications and end users, and manages communications between them. Application layer 314 can identify destinations, local resource states or availability or communication content or formatting using the applications.

For example, a communication link can be established between two devices on a network. One device can transmit an analog or digital representation of an electronic message that includes a data set to the other device. The other device can receive the analog or digital representation at the physical layer 302. The other device can transmit the data associated with the electronic message through the remaining layers 304-314. The application layer 314 can receive data associated with the electronic message. The application layer 314 can identify one or more applications, such as an application for visualizing deep neural networks, to which to transmit data associated with the electronic message. The application layer 314 can transmit the data to the identified application.

Intra-network connection components 322, 324 can operate in lower levels, such as physical layer 302 and link layer 304, respectively. For example, a hub can operate in the physical layer, a switch can operate in the physical layer, and a router can operate in the network layer. Inter-network connection components 326, 328 are shown to operate on higher levels, such as layers 306-314. For example, routers can operate in the network layer and network devices can operate in the transport, session, presentation, and application layers.

A computing environment 330 can interact with or operate on, in various examples, one, more, all or any of the various layers. For example, computing environment 330 can interact with a hub (e.g., via the link layer) to adjust which devices the hub communicates with. The physical layer 302 may be served by the link layer 304, so it may implement such data from the link layer 304. For example, the computing environment 330 may control which devices from which it can receive data. For example, if the computing environment 330 knows that a certain network device has turned off, broken, or otherwise become unavailable or unreliable, the computing environment 330 may instruct the hub to prevent any data from being transmitted to the computing environment 330 from that network device. Such a process may be beneficial to avoid receiving data that is inaccurate or that has been influenced by an uncontrolled environment. As another example, computing environment 330 can communicate with a bridge, switch, router or gateway and influence which device within the system (e.g., system 200) the component selects as a destination. In some examples, computing environment 330 can interact with various layers by exchanging communications with equipment operating on a particular layer by routing or modifying existing communications. In another example, such as in a grid-computing environment, a node may determine how data within the environment should be routed (e.g., which node should receive certain data) based on certain parameters or information provided by other layers within the model.

The computing environment 330 may be a part of a communications grid environment, the communications of which may be implemented as shown in the protocol of FIG. 3. For example, referring back to FIG. 2, one or more of machines 220 and 240 may be part of a communications grid-computing environment. A gridded computing environment may be employed in a distributed system with non-interactive workloads where data resides in memory on the machines, or compute nodes. In such an environment, analytic code, instead of a database management system, can control the processing performed by the nodes. Data is co-located by pre-distributing it to the grid nodes, and the analytic code on each node loads the local data into memory. Each node may be assigned a particular task, such as a portion of a processing project, or to organize or control other nodes within the grid. For example, each node may be assigned a portion of a processing task for generating a GUI for visualizing deep neural networks.

Figure 4:
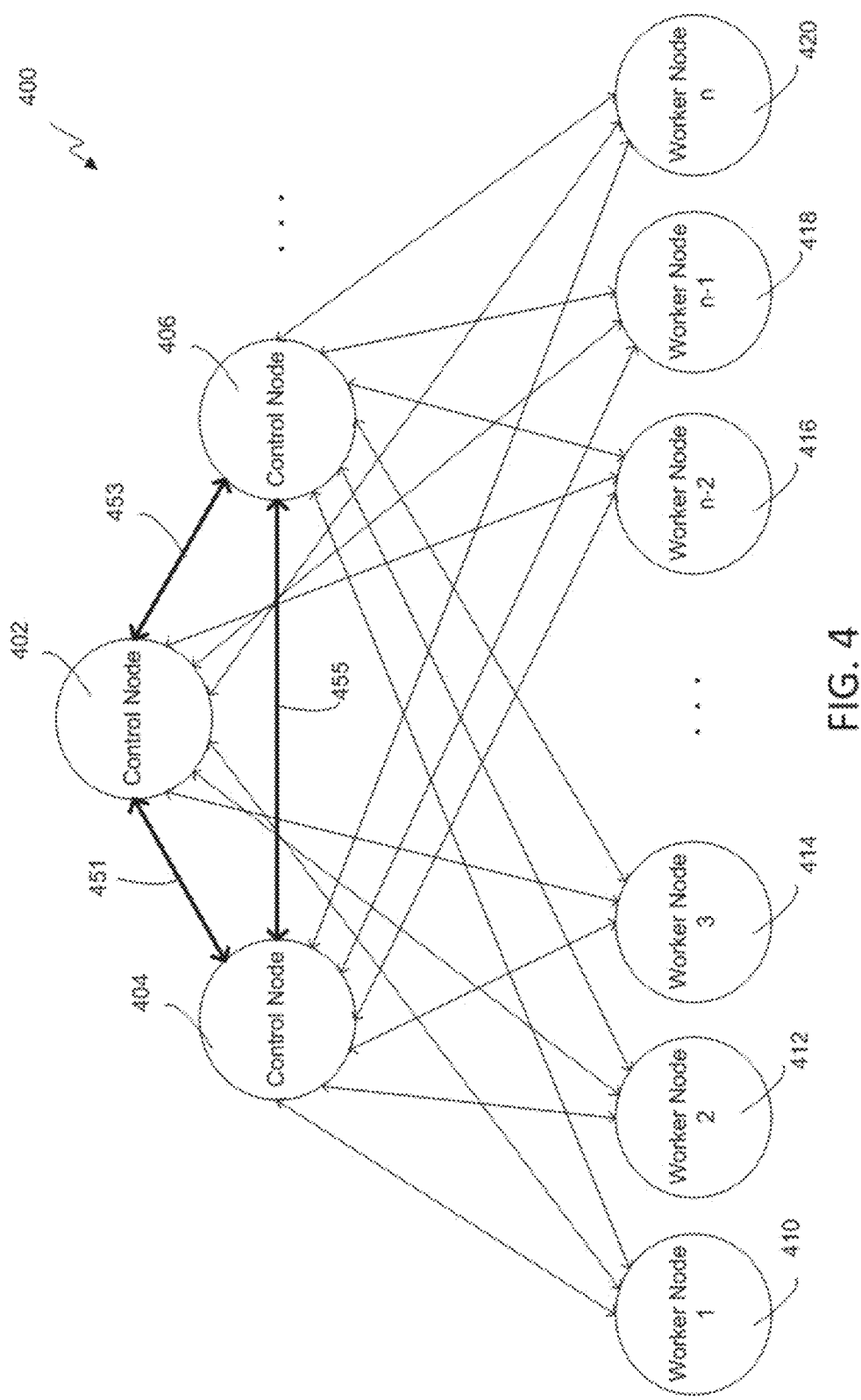
FIG. 4 is a hierarchical diagram of an example of a communications grid computing system including a variety of control and worker nodes according to some aspects.

FIG. 4 is a hierarchical diagram of an example of a communications grid computing system 400 including a variety of control and worker nodes according to some aspects. Communications grid computing system 400 includes three control nodes and one or more worker nodes. Communications grid computing system 400 includes control nodes 402, 404, and 406. The control nodes are communicatively connected via communication paths 451, 453, and 455. The control nodes 402-406 may transmit information (e.g., related to the communications grid or notifications) to and receive information from each other. Although communications grid computing system 400 is shown in FIG. 4 as including three control nodes, the communications grid may include more or less than three control nodes.

Communications grid computing system 400 (which can be referred to as a "communications grid") also includes one or more worker nodes. Shown in FIG. 4 are six worker nodes 410-420. Although FIG. 4 shows six worker nodes, a communications grid can include more or less than six worker nodes. The number of worker nodes included in a communications grid may be dependent upon how large the project or data set is being processed by the communications grid, the capacity of each worker node, the time designated for the communications grid to complete the project, among others. Each worker node within the communications grid computing system 400 may be connected (wired or wirelessly, and directly or indirectly) to control nodes 402-406. Each worker node may receive information from the control nodes (e.g., an instruction to perform work on a project) and may transmit information to the control nodes (e.g., a result from work performed on a project). Furthermore, worker nodes may communicate with each other directly or indirectly. For example, worker nodes may transmit data between each other related to a job being performed or an individual task within a job being performed by that worker node. In some examples, worker nodes may not be connected (communicatively or otherwise) to certain other worker nodes. For example, a worker node 410 may only be able to communicate with a particular control node 402. The worker node 410 may be unable to communicate with other worker nodes 412-420 in the communications grid, even if the other worker nodes 412-420 are controlled by the same control node 402.

A control node 402-406 may connect with an external device with which the control node 402-406 may communicate (e.g., a communications grid user, such as a server or computer, may connect to a controller of the grid). For example, a server or computer may connect to control nodes 402-406 and may transmit a project or job to the node, such as a project or job related to visualizing deep neural networks. The project may include the data set. Once the control node 402-406 receives such a project including a large data set, the control node may distribute the data set or projects related to the data set to be performed by worker nodes. Alternatively, for a project including a large data set, the data set may be receive or stored by a machine other than a control node 402-406 (e.g., a Hadoop data node).

Control nodes 402-406 can maintain knowledge of the status of the nodes in the grid (e.g., grid status information), accept work requests from clients, subdivide the work across worker nodes, and coordinate the worker nodes, among other responsibilities. Worker nodes 412-420 may accept work requests from a control node 402-406 and provide the control node with results of the work performed by the worker node. A grid may be started from a single node (e.g., a machine, computer, server, etc.). This first node may be assigned or may start as the primary control node 402 that will control any additional nodes that enter the grid.

When a project is submitted for execution (e.g., by a client or a controller of the grid) it may be assigned to a set of nodes. After the nodes are assigned to a project, a data structure (e.g., a communicator) may be created. The communicator may be used by the project for information to be shared between the project code running on each node. A communication handle may be created on each node. A handle, for example, is a reference to the communicator that is valid within a single process on a single node, and the handle may be used when requesting communications between nodes.

A control node, such as control node 402, may be designated as the primary control node. A server, computer or other external device may connect to the primary control node. Once the control node 402 receives a project, the primary control node may distribute portions of the project to its worker nodes for execution. For example, a project for visualizing a deep neural network can be initiated on communications grid computing system 400. A primary control node can control the work to be performed for the project in order to complete the project as requested or instructed. The primary control node may distribute work to the worker nodes 412-420 based on various factors, such as which subsets or portions of projects may be completed most efficiently and in the correct amount of time. For example, a worker node 412 may generation a visualization using at least a portion of data that is already local (e.g., stored on) the worker node. The primary control node also coordinates and processes the results of the work performed by each worker node 412-420 after each worker node 412-420 executes and completes its job. For example, the primary control node may receive a result from one or more worker nodes 412-420, and the primary control node may organize (e.g., collect and assemble) the results received and compile them to produce a complete result for the project received from the end user.

Any remaining control nodes, such as control nodes 404, 406, may be assigned as backup control nodes for the project. In an example, backup control nodes may not control any portion of the project. Instead, backup control nodes may serve as a backup for the primary control node and take over as primary control node if the primary control node were to fail. If a communications grid were to include only a single control node 402, and the control node 402 were to fail (e.g., the control node is shut off or breaks) then the communications grid as a whole may fail and any project or job being run on the communications grid may fail and may not complete. While the project may be run again, such a failure may cause a delay (severe delay in some cases, such as overnight delay) in completion of the project. Therefore, a grid with multiple control nodes 402-406, including a backup control node, may be beneficial.

In some examples, the primary control node may open a pair of listening sockets to add another node or machine to the grid. A socket may be used to accept work requests from clients, and the second socket may be used to accept connections from other grid nodes. The primary control node may be provided with a list of other nodes (e.g., other machines, computers, servers, etc.) that can participate in the grid, and the role that each node can fill in the grid. Upon startup of the primary control node (e.g., the first node on the grid), the primary control node may use a network protocol to start the server process on every other node in the grid. Command line parameters, for example, may inform each node of one or more pieces of information, such as: the role that the node will have in the grid, the host name of the primary control node, the port number on which the primary control node is accepting connections from peer nodes, among others. The information may also be provided in a configuration file, transmitted over a secure shell tunnel, recovered from a configuration server, among others. While the other machines in the grid may not initially know about the configuration of the grid, that information may also be sent to each other node by the primary control node. Updates of the grid information may also be subsequently sent to those nodes.

For any control node other than the primary control node added to the grid, the control node may open three sockets. The first socket may accept work requests from clients, the second socket may accept connections from other grid members, and the third socket may connect (e.g., permanently) to the primary control node. When a control node (e.g., primary control node) receives a connection from another control node, it first checks to see if the peer node is in the list of configured nodes in the grid. If it is not on the list, the control node may clear the connection. If it is on the list, it may then attempt to authenticate the connection. If authentication is successful, the authenticating node may transmit information to its peer, such as the port number on which a node is listening for connections, the host name of the node, information about how to authenticate the node, among other information. When a node, such as the new control node, receives information about another active node, it can check to see if it already has a connection to that other node. If it does not have a connection to that node, it may then establish a connection to that control node.

Any worker node added to the grid may establish a connection to the primary control node and any other control nodes on the grid. After establishing the connection, it may authenticate itself to the grid (e.g., any control nodes, including both primary and backup, or a server or user controlling the grid). After successful authentication, the worker node may accept configuration information from the control node.

When a node joins a communications grid (e.g., when the node is powered on or connected to an existing node on the grid or both), the node is assigned (e.g., by an operating system of the grid) a universally unique identifier (UUID). This unique identifier may help other nodes and external entities (devices, users, etc.) to identify the node and distinguish it from other nodes. When a node is connected to the grid, the node may share its unique identifier with the other nodes in the grid. Since each node may share its unique identifier, each node may know the unique identifier of every other node on the grid. Unique identifiers may also designate a hierarchy of each of the nodes (e.g., backup control nodes) within the grid. For example, the unique identifiers of each of the backup control nodes may be stored in a list of backup control nodes to indicate an order in which the backup control nodes will take over for a failed primary control node to become a new primary control node. But, a hierarchy of nodes may also be determined using methods other than using the unique identifiers of the nodes. For example, the hierarchy may be predetermined, or may be assigned based on other predetermined factors.

The grid may add new machines at any time (e.g., initiated from any control node). Upon adding a new node to the grid, the control node may first add the new node to its table of grid nodes. The control node may also then notify every other control node about the new node. The nodes receiving the notification may acknowledge that they have updated their configuration information.

Primary control node 402 may, for example, transmit one or more communications to backup control nodes 404, 406 (and, for example, to other control or worker nodes 412-420 within the communications grid). Such communications may be sent periodically, at fixed time intervals, between known fixed stages of the project's execution, among other protocols. The communications transmitted by primary control node 402 may be of varied types and may include a variety of types of information. For example, primary control node 402 may transmit snapshots (e.g., status information) of the communications grid so that backup control node 404 always has a recent snapshot of the communications grid. The snapshot or grid status may include, for example, the structure of the grid (including, for example, the worker nodes 410-420 in the communications grid, unique identifiers of the worker nodes 410-420, or their relationships with the primary control node 402) and the status of a project (including, for example, the status of each worker node's portion of the project). The snapshot may also include analysis or results received from worker nodes 410-420 in the communications grid. The backup control nodes 404, 406 may receive and store the backup data received from the primary control node 402. The backup control nodes 404, 406 may transmit a request for such a snapshot (or other information) from the primary control node 402, or the primary control node 402 may send such information periodically to the backup control nodes 404, 406.

As noted, the backup data may allow a backup control node 404, 406 to take over as primary control node if the primary control node 402 fails without requiring the communications grid to start the project over from scratch. If the primary control node 402 fails, the backup control node 404, 406 that will take over as primary control node may retrieve the most recent version of the snapshot received from the primary control node 402 and use the snapshot to continue the project from the stage of the project indicated by the backup data. This may prevent failure of the project as a whole.

A backup control node 404, 406 may use various methods to determine that the primary control node 402 has failed. In one example of such a method, the primary control node 402 may transmit (e.g., periodically) a communication to the backup control node 404, 406 that indicates that the primary control node 402 is working and has not failed, such as a heartbeat communication. The backup control node 404, 406 may determine that the primary control node 402 has failed if the backup control node has not received a heartbeat communication for a certain predetermined period of time. Alternatively, a backup control node 404, 406 may also receive a communication from the primary control node 402 itself (before it failed) or from a worker node 410-420 that the primary control node 402 has failed, for example because the primary control node 402 has failed to communicate with the worker node 410-420.

Different methods may be performed to determine which backup control node of a set of backup control nodes (e.g., backup control nodes 404, 406) can take over for failed primary control node 402 and become the new primary control node. For example, the new primary control node may be chosen based on a ranking or "hierarchy" of backup control nodes based on their unique identifiers. In an alternative example, a backup control node may be assigned to be the new primary control node by another device in the communications grid or from an external device (e.g., a system infrastructure or an end user, such as a server or computer, controlling the communications grid). In another alternative example, the backup control node that takes over as the new primary control node may be designated based on bandwidth or other statistics about the communications grid.

A worker node within the communications grid may also fail. If a worker node fails, work being performed by the failed worker node may be redistributed amongst the operational worker nodes. In an alternative example, the primary control node may transmit a communication to each of the operable worker nodes still on the communications grid that each of the worker nodes should purposefully fail also. After each of the worker nodes fail, they may each retrieve their most recent saved checkpoint of their status and re-start the project from that checkpoint to minimize lost progress on the project being executed. In some examples, a communications grid computing system 400 can be used to generate a visualization related to a deep neural network.

Figure 5:
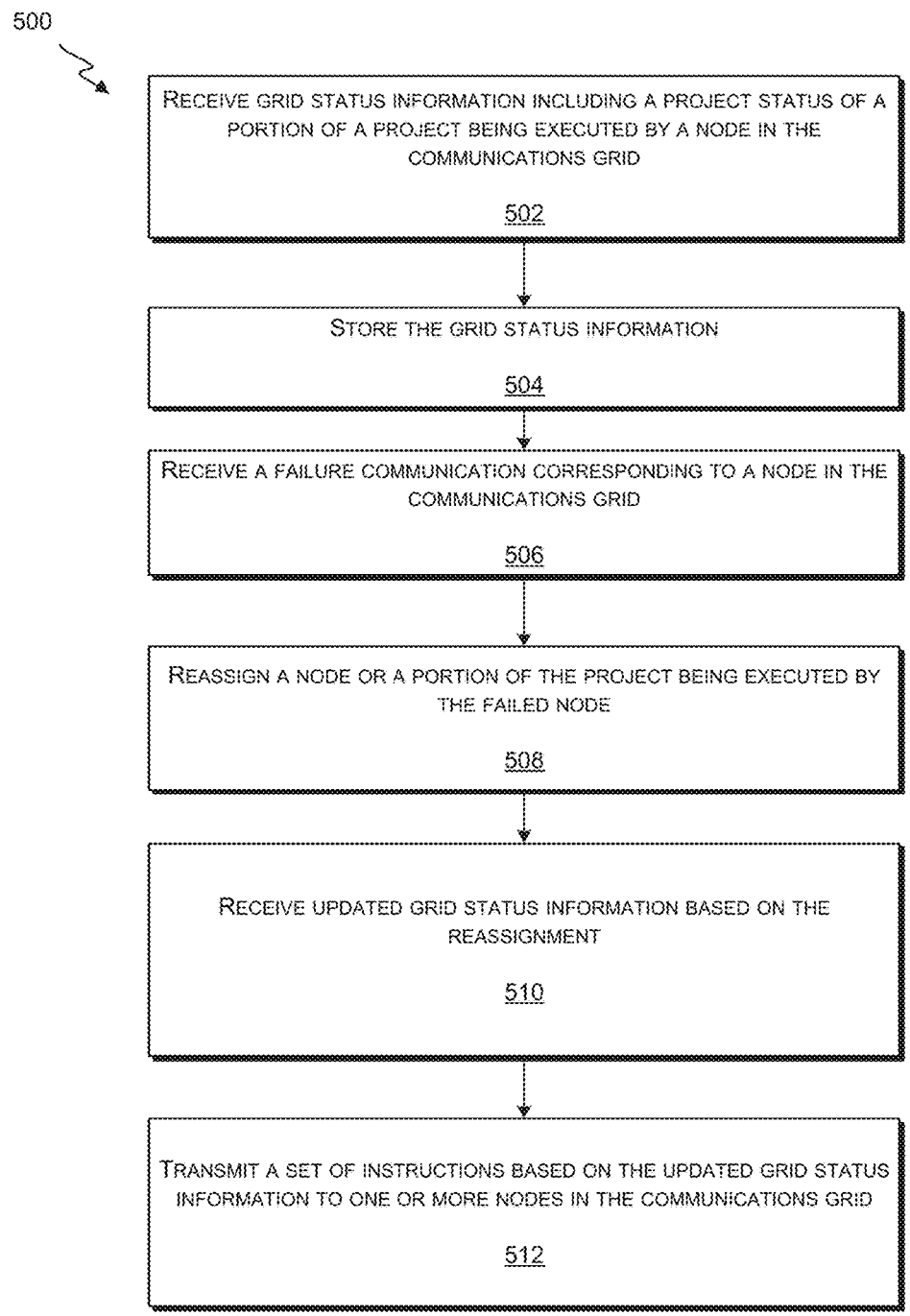
FIG. 5 is a flow chart of an example of a process for adjusting a communications grid or a work project in a communications grid after a failure of a node according to some aspects.

FIG. 5 is a flow chart of an example of a process for adjusting a communications grid or a work project in a communications grid after a failure of a node according to some aspects. The process may include, for example, receiving grid status information including a project status of a portion of a project being executed by a node in the communications grid, as described in operation 502. For example, a control node (e.g., a backup control node connected to a primary control node and a worker node on a communications grid) may receive grid status information, where the grid status information includes a project status of the primary control node or a project status of the worker node. The project status of the primary control node and the project status of the worker node may include a status of one or more portions of a project being executed by the primary and worker nodes in the communications grid. The process may also include storing the grid status information, as described in operation 504. For example, a control node (e.g., a backup control node) may store the received grid status information locally within the control node. Alternatively, the grid status information may be sent to another device for storage where the control node may have access to the information.

The process may also include receiving a failure communication corresponding to a node in the communications grid in operation 506. For example, a node may receive a failure communication including an indication that the primary control node has failed, prompting a backup control node to take over for the primary control node. In an alternative embodiment, a node may receive a failure that a worker node has failed, prompting a control node to reassign the work being performed by the worker node. The process may also include reassigning a node or a portion of the project being executed by the failed node, as described in operation 508. For example, a control node may designate the backup control node as a new primary control node based on the failure communication upon receiving the failure communication. If the failed node is a worker node, a control node may identify a project status of the failed worker node using the snapshot of the communications grid, where the project status of the failed worker node includes a status of a portion of the project being executed by the failed worker node at the failure time.

The process may also include receiving updated grid status information based on the reassignment, as described in operation 510, and transmitting a set of instructions based on the updated grid status information to one or more nodes in the communications grid, as described in operation 512. The updated grid status information may include an updated project status of the primary control node or an updated project status of the worker node. The updated information may be transmitted to the other nodes in the grid to update their stale stored information.

Figure 6:
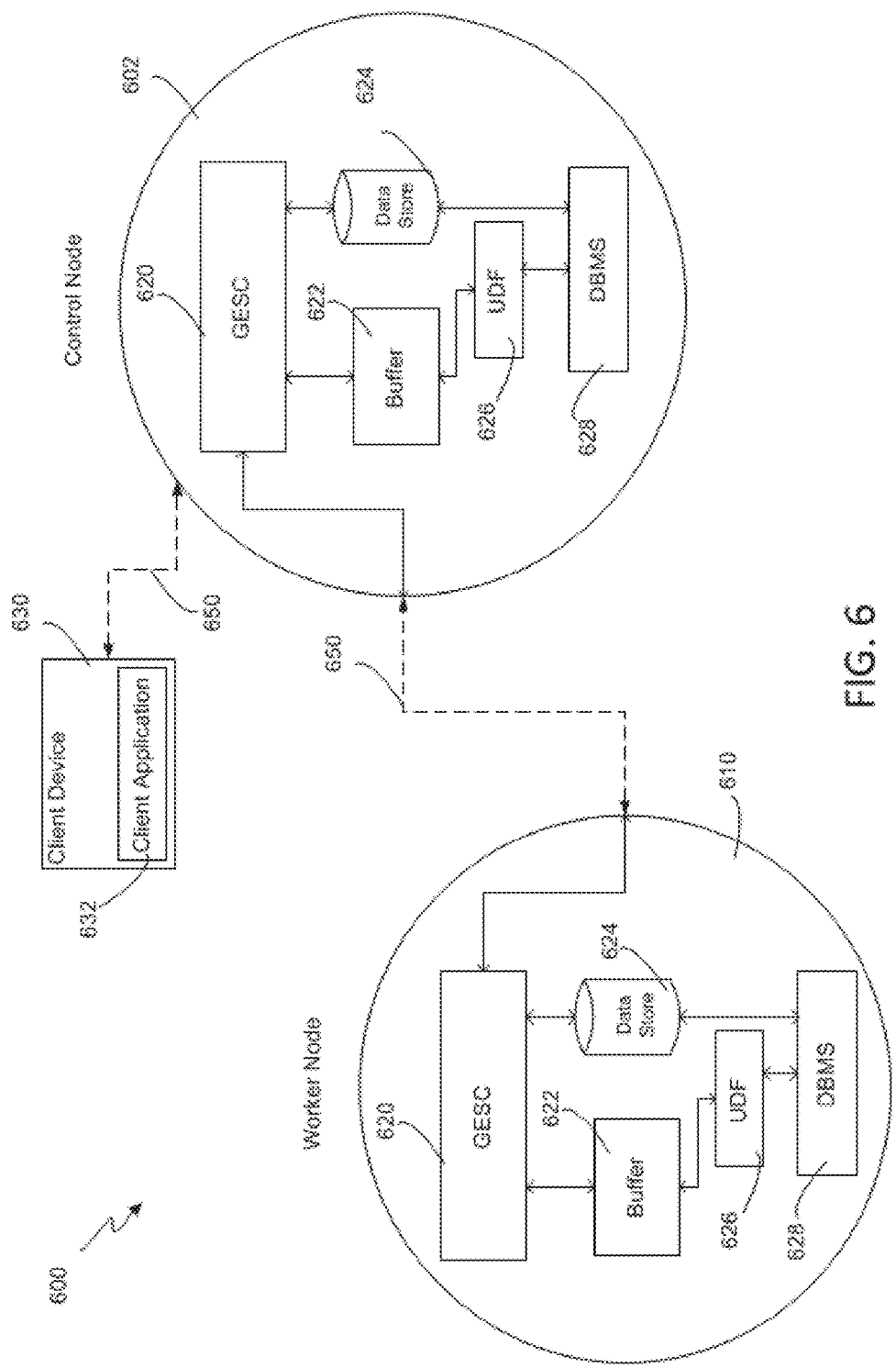
FIG. 6 is a block diagram of a portion of a communications grid computing system including a control node and a worker node according to some aspects.

FIG. 6 is a block diagram of a portion of a communications grid computing system 600 including a control node and a worker node according to some aspects. Communications grid 600 computing system includes one control node (control node 602) and one worker node (worker node 610) for purposes of illustration, but may include more worker and/or control nodes. The control node 602 is communicatively connected to worker node 610 via communication path 650. Therefore, control node 602 may transmit information (e.g., related to the communications grid or notifications), to and receive information from worker node 610 via communication path 650.

Similar to in FIG. 4, communications grid computing system (or just "communications grid") 600 includes data processing nodes (control node 602 and worker node 610). Nodes 602 and 610 comprise multi-core data processors. Each node 602 and 610 includes a grid-enabled software component (GESC) 620 that executes on the data processor associated with that node and interfaces with buffer memory 622 also associated with that node. Each node 602 and 610 includes database management software (DBMS) 628 that executes on a database server (not shown) at control node 602 and on a database server (not shown) at worker node 610.

Each node also includes a data store 624. Data stores 624, similar to network-attached data stores 110 in FIG. 1 and data stores 235 in FIG. 2, are used to store data to be processed by the nodes in the computing environment. Data stores 624 may also store any intermediate or final data generated by the computing system after being processed, for example in non-volatile memory. However in certain examples, the configuration of the grid computing environment allows its operations to be performed such that intermediate and final data results can be stored solely in volatile memory (e.g., RAM), without a requirement that intermediate or final data results be stored to non-volatile types of memory. Storing such data in volatile memory may be useful in certain situations, such as when the grid receives queries (e.g., ad hoc) from a client and when responses, which are generated by processing large amounts of data, need to be generated quickly or on-the-fly. In such a situation, the grid may be configured to retain the data within memory so that responses can be generated at different levels of detail and so that a client may interactively query against this information.

Each node also includes a user-defined function (UDF) 626. The UDF provides a mechanism for the DMBS 628 to transfer data to or receive data from the database stored in the data stores 624 that are managed by the DBMS. For example, UDF 626 can be invoked by the DBMS to provide data to the GESC for processing. The UDF 626 may establish a socket connection (not shown) with the GESC to transfer the data. Alternatively, the UDF 626 can transfer data to the GESC by writing data to shared memory accessible by both the UDF and the GESC.

The GESC 620 at the nodes 602 and 610 may be connected via a network, such as network 108 shown in FIG. 1. Therefore, nodes 602 and 610 can communicate with each other via the network using a predetermined communication protocol such as, for example, the Message Passing Interface (MPI). Each GESC 620 can engage in point-to-point communication with the GESC at another node or in collective communication with multiple GESCs via the network. The GESC 620 at each node may contain identical (or nearly identical) software instructions. Each node may be capable of operating as either a control node or a worker node. The GESC at the control node 602 can communicate, over a communication path 652, with a client device 630. More specifically, control node 602 may communicate with client application 632 hosted by the client device 630 to receive queries and to respond to those queries after processing large amounts of data.

DMBS 628 may control the creation, maintenance, and use of database or data structure (not shown) within nodes 602 or 610. The database may organize data stored in data stores 624. The DMBS 628 at control node 602 may accept requests for data and transfer the appropriate data for the request. With such a process, collections of data may be distributed across multiple physical locations. In this example, each node 602 and 610 stores a portion of the total data managed by the management system in its associated data store 624.

Furthermore, the DBMS may be responsible for protecting against data loss using replication techniques. Replication includes providing a backup copy of data stored on one node on one or more other nodes. Therefore, if one node fails, the data from the failed node can be recovered from a replicated copy residing at another node. However, as described herein with respect to FIG. 4, data or status information for each node in the communications grid may also be shared with each node on the grid.

Figure 7:
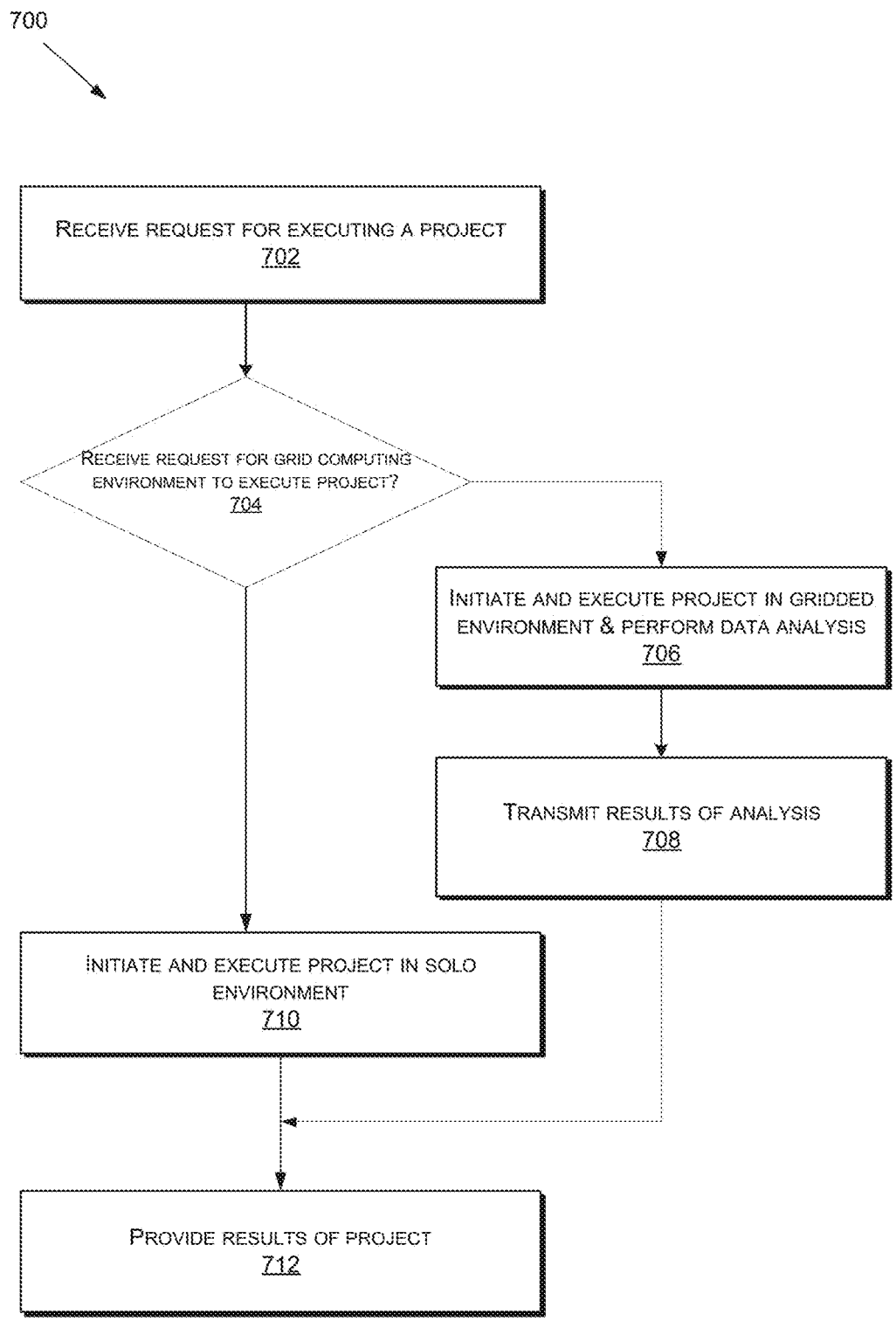
FIG. 7 is a flow chart of an example of a process for executing a data analysis or processing project according to some aspects.

FIG. 7 is a flow chart of an example of a process for executing a data analysis or a processing project according to some aspects. As described with respect to FIG. 6, the GESC at the control node may transmit data with a client device (e.g., client device 630) to receive queries for executing a project and to respond to those queries after large amounts of data have been processed. The query may be transmitted to the control node, where the query may include a request for executing a project, as described in operation 702. The query can contain instructions on the type of data analysis to be performed in the project and whether the project should be executed using the grid-based computing environment, as shown in operation 704.

To initiate the project, the control node may determine if the query requests use of the grid-based computing environment to execute the project. If the determination is no, then the control node initiates execution of the project in a solo environment (e.g., at the control node), as described in operation 710. If the determination is yes, the control node may initiate execution of the project in the grid-based computing environment, as described in operation 706. In such a situation, the request may include a requested configuration of the grid. For example, the request may include a number of control nodes and a number of worker nodes to be used in the grid when executing the project. After the project has been completed, the control node may transmit results of the analysis yielded by the grid, as described in operation 708. Whether the project is executed in a solo or grid-based environment, the control node provides the results of the project.

As noted with respect to FIG. 2, the computing environments described herein may collect data (e.g., as received from network devices, such as sensors, such as network devices 204-209 in FIG. 2, and client devices or other sources) to be processed as part of a data analytics project, and data may be received in real time as part of a streaming analytics environment (e.g., ESP). Data may be collected using a variety of sources as communicated via different kinds of networks or locally, such as on a real-time streaming basis. For example, network devices may receive data periodically from network device sensors as the sensors continuously sense, monitor and track changes in their environments. More specifically, an increasing number of distributed applications develop or produce continuously flowing data from distributed sources by applying queries to the data before distributing the data to geographically distributed recipients. An event stream processing engine (ESPE) may continuously apply the queries to the data as it is received and determines which entities should receive the data. Client or other devices may also subscribe to the ESPE or other devices processing ESP data so that they can receive data after processing, based on for example the entities determined by the processing engine. For example, client devices 230 in FIG. 2 may subscribe to the ESPE in computing environment 214. In another example, event subscription devices 1024a-c, described further with respect to FIG. 10, may also subscribe to the ESPE. The ESPE may determine or define how input data or event streams from network devices or other publishers (e.g., network devices 204-209 in FIG. 2) are transformed into meaningful output data to be consumed by subscribers, such as for example client devices 230 in FIG. 2.

Figure 8:
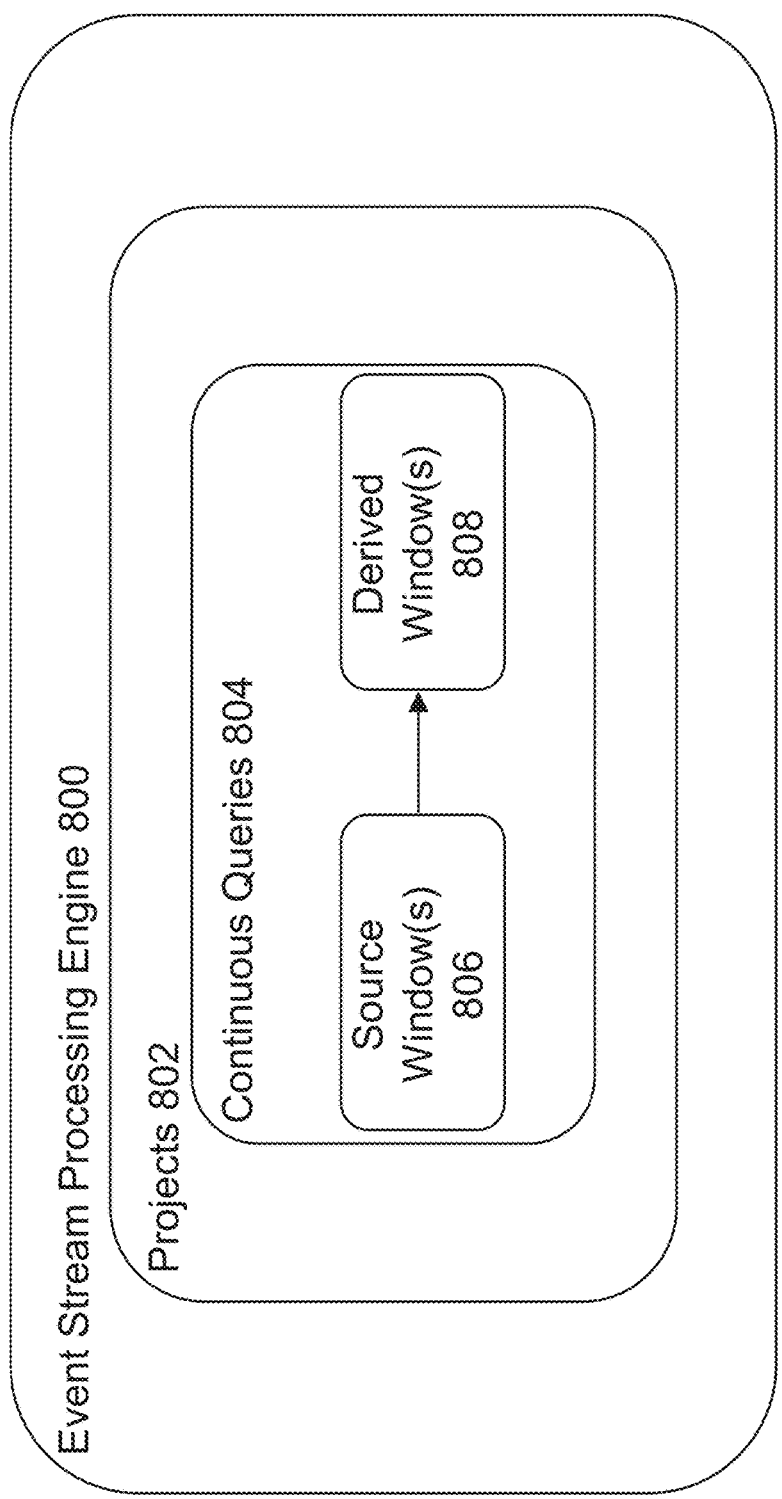
FIG. 8 is a block diagram including components of an Event Stream Processing Engine (ESPE) according to some aspects.

FIG. 8 is a block diagram including components of an Event Stream Processing Engine (ESPE) according to some aspects. ESPE 800 may include one or more projects 802. A project may be described as a second-level container in an engine model managed by ESPE 800 where a thread pool size for the project may be defined by a user. Each project of the one or more projects 802 may include one or more continuous queries 804 that contain data flows, which are data transformations of incoming event streams. The one or more continuous queries 804 may include one or more source windows 806 and one or more derived windows 808.

The ESPE may receive streaming data over a period of time related to certain events, such as events or other data sensed by one or more network devices. The ESPE may perform operations associated with processing data created by the one or more devices. For example, the ESPE may receive data from the one or more network devices 204-209 shown in FIG. 2. As noted, the network devices may include sensors that sense different aspects of their environments, and may collect data over time based on those sensed observations. For example, the ESPE may be implemented within one or more of machines 220 and 240 shown in FIG. 2. The ESPE may be implemented within such a machine by an ESP application. An ESP application may embed an ESPE with its own dedicated thread pool or pools into its application space where the main application thread can do application-specific work and the ESPE processes event streams at least by creating an instance of a model into processing objects.

The engine container is the top-level container in a model that manages the resources of the one or more projects 802. In an illustrative example, there may be only one ESPE 800 for each instance of the ESP application, and ESPE 800 may have a unique engine name. Additionally, the one or more projects 802 may each have unique project names, and each query may have a unique continuous query name and begin with a uniquely named source window of the one or more source windows 806. ESPE 800 may or may not be persistent.

Continuous query modeling involves defining directed graphs of windows for event stream manipulation and transformation. A window in the context of event stream manipulation and transformation is a processing node in an event stream processing model. A window in a continuous query can perform aggregations, computations, pattern-matching, and other operations on data flowing through the window. A continuous query may be described as a directed graph of source, relational, pattern matching, and procedural windows. The one or more source windows 806 and the one or more derived windows 808 represent continuously executing queries that generate updates to a query result set as new event blocks stream through ESPE 800. A directed graph, for example, is a set of nodes connected by edges, where the edges have a direction associated with them.

An event object may be described as a packet of data accessible as a collection of fields, with at least one of the fields defined as a key or unique identifier (ID). The event object may be created using a variety of formats including binary, alphanumeric, XML, etc. Each event object may include one or more fields designated as a primary identifier (ID) for the event so ESPE 800 can support operation codes (opcodes) for events including insert, update, upsert, and delete. Upsert opcodes update the event if the key field already exists; otherwise, the event is inserted. For illustration, an event object may be a packed binary representation of a set of field values and include both metadata and field data associated with an event. The metadata may include an opcode indicating if the event represents an insert, update, delete, or upsert, a set of flags indicating if the event is a normal, partial-update, or a retention generated event from retention policy management, and a set of microsecond timestamps that can be used for latency measurements.

An event block object may be described as a grouping or package of event objects. An event stream may be described as a flow of event block objects. A continuous query of the one or more continuous queries 804 transforms a source event stream made up of streaming event block objects published into ESPE 800 into one or more output event streams using the one or more source windows 806 and the one or more derived windows 808. A continuous query can also be thought of as data flow modeling.

The one or more source windows 806 are at the top of the directed graph and have no windows feeding into them. Event streams are published into the one or more source windows 806, and from there, the event streams may be directed to the next set of connected windows as defined by the directed graph. The one or more derived windows 808 are all instantiated windows that are not source windows and that have other windows streaming events into them. The one or more derived windows 808 may perform computations or transformations on the incoming event streams. The one or more derived windows 808 transform event streams based on the window type (that is operators such as join, filter, compute, aggregate, copy, pattern match, procedural, union, etc.) and window settings. As event streams are published into ESPE 800, they are continuously queried, and the resulting sets of derived windows in these queries are continuously updated.

Figure 9:
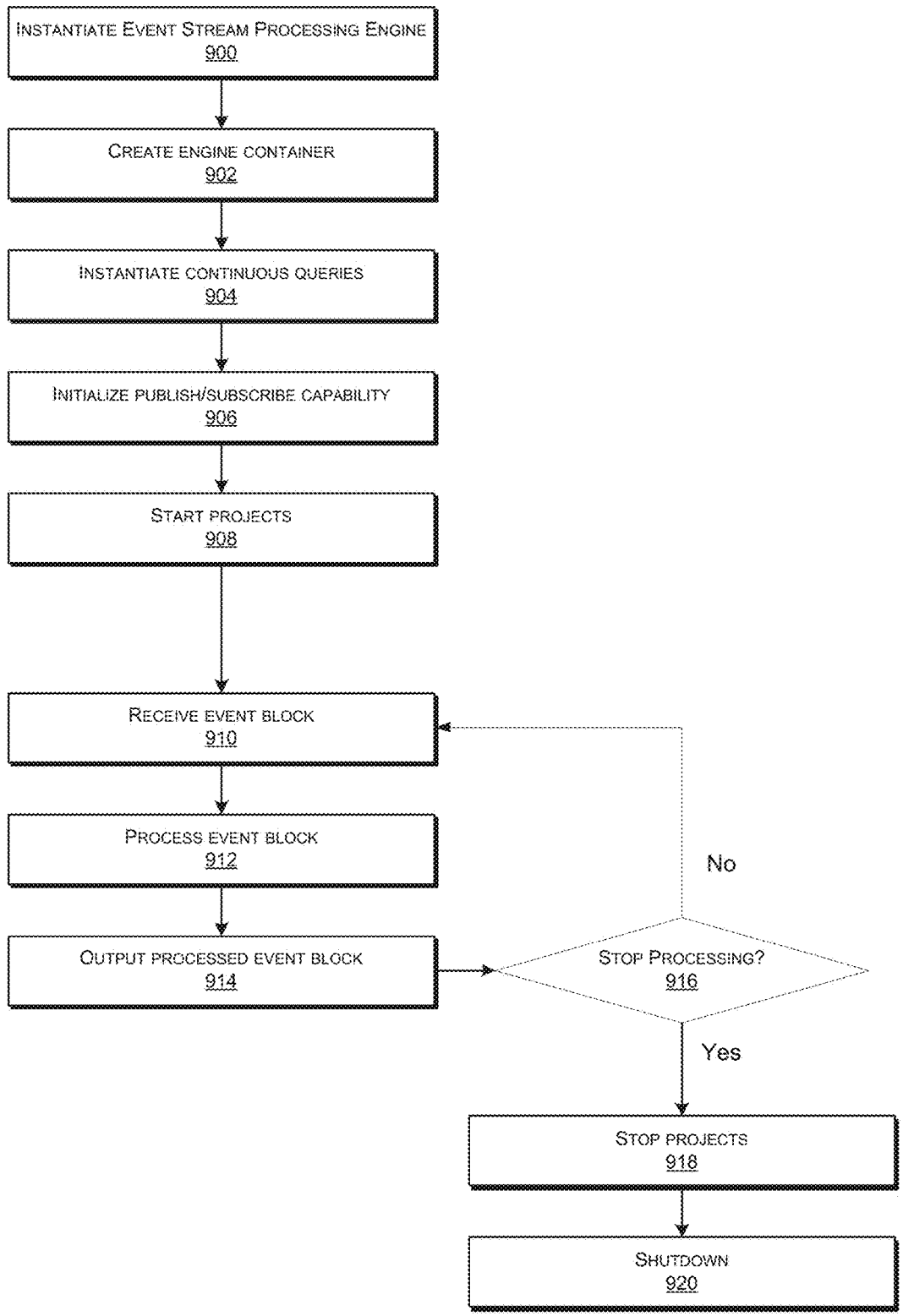
FIG. 9 is a flow chart of an example of a process including operations performed by an event stream processing engine according to some aspects.

FIG. 9 is a flow chart of an example of a process including operations performed by an event stream processing engine according to some aspects. As noted, the ESPE 800 (or an associated ESP application) defines how input event streams are transformed into meaningful output event streams. More specifically, the ESP application may define how input event streams from publishers (e.g., network devices providing sensed data) are transformed into meaningful output event streams consumed by subscribers (e.g., a data analytics project being executed by a machine or set of machines).

Within the application, a user may interact with one or more user interface windows presented to the user in a display under control of the ESPE independently or through a browser application in an order selectable by the user. For example, a user may execute an ESP application, which causes presentation of a first user interface window, which may include a plurality of menus and selectors such as drop down menus, buttons, text boxes, hyperlinks, etc. associated with the ESP application as understood by a person of skill in the art. Various operations may be performed in parallel, for example, using a plurality of threads.

At operation 900, an ESP application may define and start an ESPE, thereby instantiating an ESPE at a device, such as machine 220 and/or 240. In an operation 902, the engine container is created. For illustration, ESPE 800 may be instantiated using a function call that specifies the engine container as a manager for the model.

In an operation 904, the one or more continuous queries 804 are instantiated by ESPE 800 as a model. The one or more continuous queries 804 may be instantiated with a dedicated thread pool or pools that generate updates as new events stream through ESPE 800. For illustration, the one or more continuous queries 804 may be created to model business processing logic within ESPE 800, to predict events within ESPE 800, to model a physical system within ESPE 800, to predict the physical system state within ESPE 800, etc. For example, as noted, ESPE 800 may be used to support sensor data monitoring and management (e.g., sensing may include force, torque, load, strain, position, temperature, air pressure, fluid flow, chemical properties, resistance, electromagnetic fields, radiation, irradiance, proximity, acoustics, moisture, distance, speed, vibrations, acceleration, electrical potential, or electrical current, etc.).

ESPE 800 may analyze and process events in motion or "event streams." Instead of storing data and running queries against the stored data, ESPE 800 may store queries and stream data through them to allow continuous analysis of data as it is received. The one or more source windows 806 and the one or more derived windows 808 may be created based on the relational, pattern matching, and procedural algorithms that transform the input event streams into the output event streams to model, simulate, score, test, predict, etc. based on the continuous query model defined and application to the streamed data.

In an operation 906, a publish/subscribe (pub/sub) capability is initialized for ESPE 800. In an illustrative embodiment, a pub/sub capability is initialized for each project of the one or more projects 802. To initialize and enable pub/sub capability for ESPE 800, a port number may be provided. Pub/sub clients can use a host name of an ESP device running the ESPE and the port number to establish pub/sub connections to ESPE 800.

Figure 10:
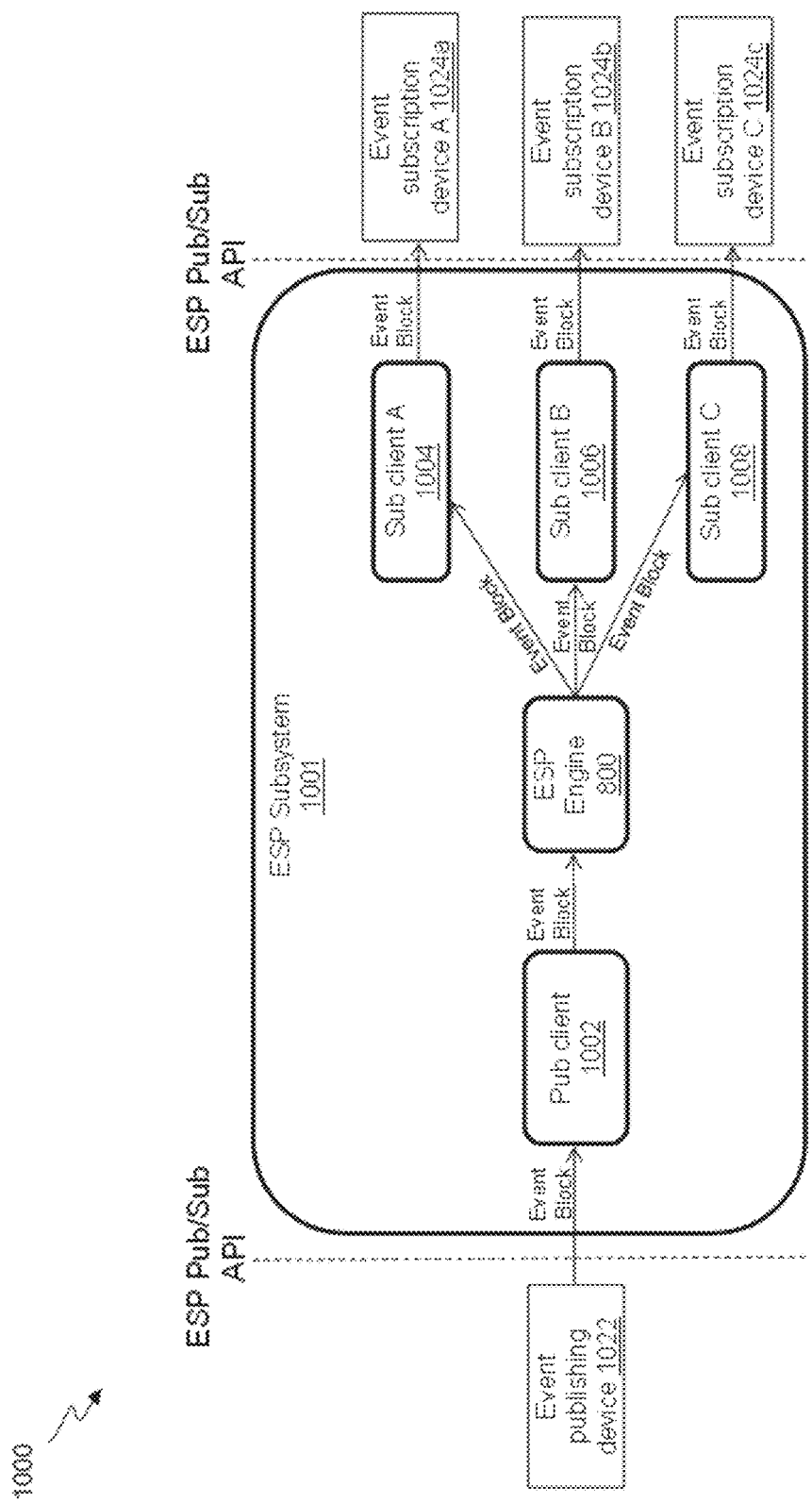
FIG. 10 is a block diagram of an ESP system interfacing between a publishing device and multiple event subscribing devices according to some aspects.

FIG. 10 is a block diagram of an ESP system 1000 interfacing between publishing device 1022 and event subscribing devices 1024a-c according to some aspects. ESP system 1000 may include ESP device or subsystem 1001, publishing device 1022, an event subscribing device A 1024a, an event subscribing device B 1024b, and an event subscribing device C 1024c. Input event streams are output to ESP device or subsystem 1001 by publishing device 1022. In alternative embodiments, the input event streams may be created by a plurality of publishing devices. The plurality of publishing devices further may publish event streams to other ESP devices. The one or more continuous queries instantiated by ESPE 800 may analyze and process the input event streams to form output event streams output to event subscribing device A 1024a, event subscribing device B 1024b, and event subscribing device C 1024c. ESP system 1000 may include a greater or a fewer number of event subscribing devices of event subscribing devices.

Publish-subscribe is a message-oriented interaction paradigm based on indirect addressing. Processed data recipients specify their interest in receiving information from ESPE 800 by subscribing to specific classes of events, while information sources publish events to ESPE 800 without directly addressing the receiving parties. ESPE 800 coordinates the interactions and processes the data. In some cases, the data source receives confirmation that the published information has been received by a data recipient.

A publish/subscribe API may be described as a library that enables an event publisher, such as publishing device 1022, to publish event streams into ESPE 800 or an event subscriber, such as event subscribing device A 1024a, event subscribing device B 1024b, and event subscribing device C 1024c, to subscribe to event streams from ESPE 800. For illustration, one or more publish/subscribe APIs may be defined. Using the publish/subscribe API, an event publishing application may publish event streams into a running event stream processor project source window of ESPE 800, and the event subscription application may subscribe to an event stream processor project source window of ESPE 800.

The publish/subscribe API provides cross-platform connectivity and endianness compatibility between ESP application and other networked applications, such as event publishing applications instantiated at publishing device 1022, and event subscription applications instantiated at one or more of event subscribing device A 1024a, event subscribing device B 1024b, and event subscribing device C 1024c.

Referring back to FIG. 9, operation 906 initializes the publish/subscribe capability of ESPE 800. In an operation 908, the one or more projects 802 are started. The one or more started projects may run in the background on an ESP device. In an operation 910, an event block object is received from one or more computing device of the publishing device 1022.

ESP subsystem 800 may include a publishing client 1002, ESPE 800, a subscribing client A 1004, a subscribing client B 1006, and a subscribing client C 1008. Publishing client 1002 may be started by an event publishing application executing at publishing device 1022 using the publish/subscribe API. Subscribing client A 1004 may be started by an event subscription application A, executing at event subscribing device A 1024a using the publish/subscribe API. Subscribing client B 1006 may be started by an event subscription application B executing at event subscribing device B 1024b using the publish/subscribe API. Subscribing client C 1008 may be started by an event subscription application C executing at event subscribing device C 1024c using the publish/subscribe API.

An event block object containing one or more event objects is injected into a source window of the one or more source windows 806 from an instance of an event publishing application on publishing device 1022. The event block object may be generated, for example, by the event publishing application and may be received by publishing client 1002. A unique ID may be maintained as the event block object is passed between the one or more source windows 806 and/or the one or more derived windows 808 of ESPE 800, and to subscribing client A 1004, subscribing client B 806, and subscribing client C 808 and to event subscription device A 1024a, event subscription device B 1024b, and event subscription device C 1024c. Publishing client 1002 may further generate and include a unique embedded transaction ID in the event block object as the event block object is processed by a continuous query, as well as the unique ID that publishing device 1022 assigned to the event block object.

In an operation 912, the event block object is processed through the one or more continuous queries 804. In an operation 914, the processed event block object is output to one or more computing devices of the event subscribing devices 1024a-c. For example, subscribing client A 1004, subscribing client B 1006, and subscribing client C 1008 may send the received event block object to event subscription device A 1024a, event subscription device B 1024b, and event subscription device C 1024c, respectively.

ESPE 800 maintains the event block containership aspect of the received event blocks from when the event block is published into a source window and works its way through the directed graph defined by the one or more continuous queries 804 with the various event translations before being output to subscribers. Subscribers can correlate a group of subscribed events back to a group of published events by comparing the unique ID of the event block object that a publisher, such as publishing device 1022, attached to the event block object with the event block ID received by the subscriber.

In an operation 916, a determination is made concerning whether or not processing is stopped. If processing is not stopped, processing continues in operation 910 to continue receiving the one or more event streams containing event block objects from the, for example, one or more network devices. If processing is stopped, processing continues in an operation 918. In operation 918, the started projects are stopped. In operation 920, the ESPE is shutdown.

As noted, in some examples, big data is processed for an analytics project after the data is received and stored. In other examples, distributed applications process continuously flowing data in real-time from distributed sources by applying queries to the data before distributing the data to geographically distributed recipients. As noted, an event stream processing engine (ESPE) may continuously apply the queries to the data as it is received and determines which entities receive the processed data. This allows for large amounts of data being received and/or collected in a variety of environments to be processed and distributed in real time. For example, as shown with respect to FIG. 2, data may be collected from network devices that may include devices within the internet of things, such as devices within a home automation network. However, such data may be collected from a variety of different resources in a variety of different environments. In any such situation, embodiments of the present technology allow for real-time processing of such data.

Aspects of the present disclosure provide technical solutions to technical problems, such as computing problems that arise when an ESP device fails which results in a complete service interruption and potentially significant data loss. The data loss can be catastrophic when the streamed data is supporting mission critical operations, such as those in support of an ongoing manufacturing or drilling operation. An example of an ESP system achieves a rapid and seamless failover of ESPE running at the plurality of ESP devices without service interruption or data loss, thus significantly improving the reliability of an operational system that relies on the live or real-time processing of the data streams. The event publishing systems, the event subscribing systems, and each ESPE not executing at a failed ESP device are not aware of or effected by the failed ESP device. The ESP system may include thousands of event publishing systems and event subscribing systems. The ESP system keeps the failover logic and awareness within the boundaries of out-messaging network connector and out-messaging network device.

In one example embodiment, a system is provided to support a failover when event stream processing (ESP) event blocks. The system includes, but is not limited to, an out-messaging network device and a computing device. The computing device includes, but is not limited to, one or more processors and one or more computer-readable mediums operably coupled to the one or more processor. The processor is configured to execute an ESP engine (ESPE). The computer-readable medium has instructions stored thereon that, when executed by the processor, cause the computing device to support the failover. An event block object is received from the ESPE that includes a unique identifier. A first status of the computing device as active or standby is determined. When the first status is active, a second status of the computing device as newly active or not newly active is determined. Newly active is determined when the computing device is switched from a standby status to an active status. When the second status is newly active, a last published event block object identifier that uniquely identifies a last published event block object is determined. A next event block object is selected from a non-transitory computer-readable medium accessible by the computing device. The next event block object has an event block object identifier that is greater than the determined last published event block object identifier. The selected next event block object is published to an out-messaging network device. When the second status of the computing device is not newly active, the received event block object is published to the out-messaging network device. When the first status of the computing device is standby, the received event block object is stored in the non-transitory computer-readable medium.

Figure 11:
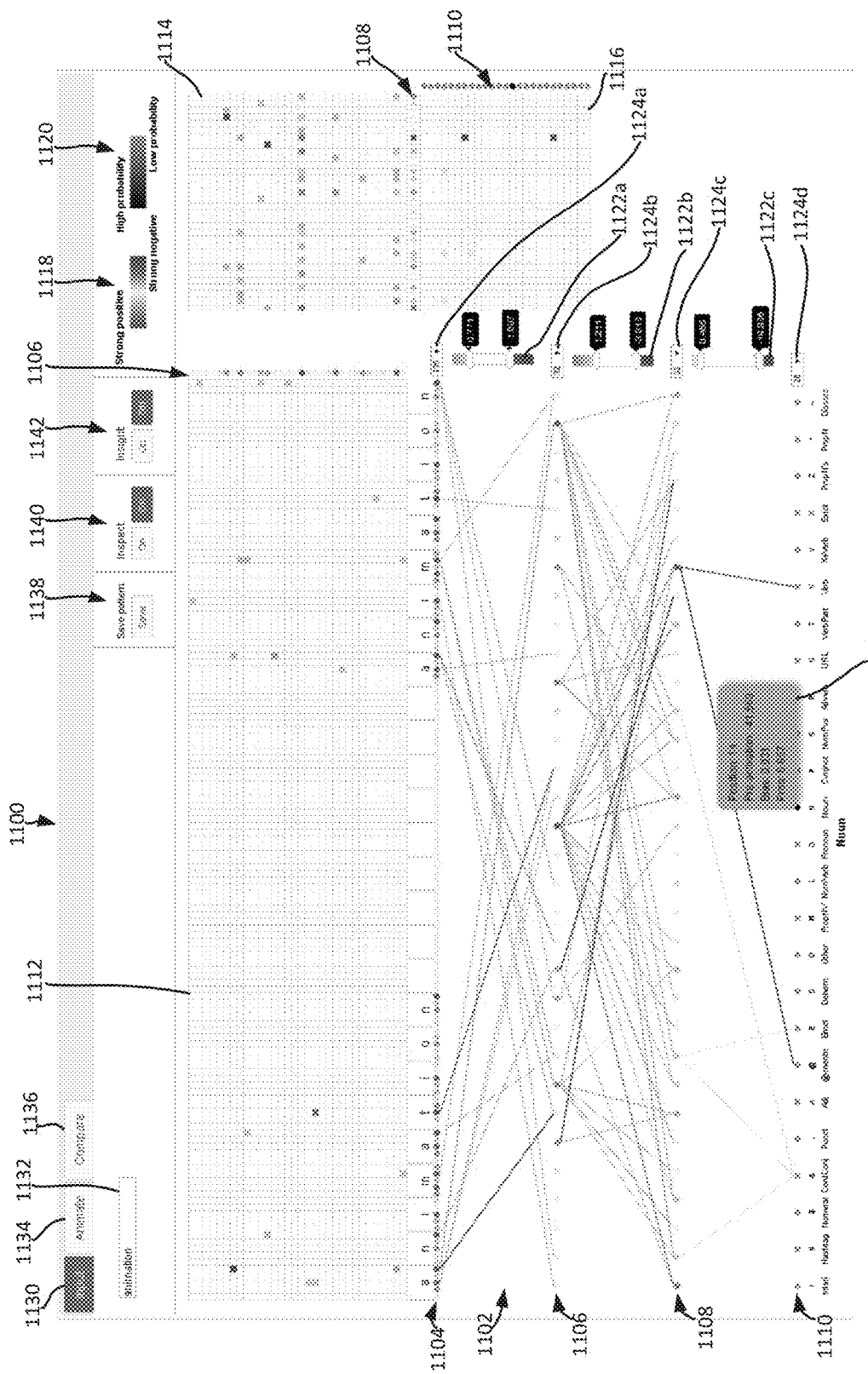
FIG. 11 is an example of a graphical user interface (GUI) for visualizing a deep neural network according to some aspects.

FIG. 11 is an example of a GUI 1100 for visualizing deep neural networks according to some aspects. The GUI 1100 can enable a user to (1) explore a deep neural network using one or more visualizations of the deep neural network; (2) quickly determine information about the deep neural network based on color coding; (3) flexibly control and focus on desired visual information with threshold, inspection, and tooltip operations; (4) explore, discover, and compare patterns associated with the deep neural network; or (5) any combination of these. A user may be able to analyze a deep neural network from new perspectives and uncover insights into how the deep neural network functions using the GUI 1100.

In the example shown in FIG. 11, the GUI 1100 includes a node-link diagram 1102 that visually represents nodes (neurons) in a deep neural network and connections (links) between the nodes. The nodes can be visually represented using circles or any other symbol. For example, the node-link diagram 1102 can visually represent an input layer 1104 of the deep neural network as one row of circles and an output layer 1110 of the deep neural network as another row of circles. The node-link diagram 1102 can visually represent hidden layers 1106, 1108 of the deep neural network as rows of circles between the input layer 1104 and the output layer 1110. The connections between the nodes in the deep neural network can be visually represented using lines or other symbols.

The node-link diagram 1102 can be color coded. In some examples, the symbols representing the nodes, the connections, or both can be colored coded to indicate values associated with the nodes, the connections, or both. For example, a circle representing a node can have a first color (e.g., blue) if a value associated with the node is negative and a second color (e.g., red) if the value associated with the node is positive. As another example, a line representing a connection between two nodes can have the first color if a value associated with the connection is negative and the second color if the value associated with the connection is positive. In either example, more saturated colors can represent larger absolute values. A legend 1118 can be provided to indicate the meaning behind the color coding to a user. The color coding may highlight the nodes and connections with high impact (e.g., that are highly influential) in the deep neural network, while reducing the visual influence of the nodes with lower impact.

In some examples, the GUI 1100 can have multiple color-coding schemes. For example, the nodes in the output layer 1110 can have a different color-coding, such as a grayscale color-coding, than the nodes in the rest of the layers 1104-1108. The grayscale color-coding can represent probabilities of the outputs associated with the nodes in the output layer 1110. Another legend 1120 can be provided to indicate the meaning behind the color scheme for the output layer 1110. Using separate color-coding schemes can allow more color differentiation among nodes and connections.

In the example shown in FIG. 11, the symbols in the node-link diagram 1102 are color coded to represent how the deep neural network responded to a user input (specifically, the word "animation"). A user may be able to provide any desired input via input box 1132. A computing device can receive the user input, feed the user input into the deep neural network, and update the color coding of the node-link diagram 1102 based on the results. For example, a representation of a node in the input layer 1104 can be color coded to indicate a weight of the node in the deep neural network (e.g., in response to user input). A representation of a connection between a node in the input layer 1104 and another node in the hidden layer 1106 can be color coded to indicate the result of multiplying a first weight of the connection (in the deep neural network) by a second weight of the node from the input layer 1104. A representation of a node in a hidden layer 1106, 1108 can be color coded to indicate a value determined by summing the weights of all of the connections to the node and passing the result through a rectified linear unit function. A representation of a connection between a node in the hidden layer 1108 and another node in the output layer 1110 can be color coded to indicate the result of multiplying a first weight of the connection by a second weight of the node from the hidden layer 1108. A representation of a node in the output layer 1110 can be color coded to indicate a value determined by summing the weights of all the connections coming into the node and then normalizing the result to represent the probability. The node-link diagram 1102 can be color coded to represent any number and combination of information, which can be generated in response to any number and combination of inputs to the deep neural network.

In some examples, visual clutter can accumulate when all the symbols representing nodes and connections are visible in the node-link diagram 1102, making it difficult to locate potentially useful information. To help reduce visual clutter, the GUI 1100 can include one or more threshold controls 1124a-d. The threshold controls 1124a-d can enable a user to select a number of nodes to color code for a particular layer of the deep neural network. For example, threshold control 1124a can enable a user to input a threshold number of nodes to color code for the input layer 1104 of the deep neural network. Threshold control 1124b can enable a user to input a threshold number of nodes to color code for the hidden layer 1106 of the deep neural network. Threshold control 1124c can enable a user to input a threshold number of nodes to color code for the hidden layer 1108 of the deep neural network. Threshold control 1124d can enable a user to input a threshold number of nodes to color code for the output layer 1110 of the deep neural network. In response to manipulating the threshold controls 1124a-d, in some examples, the threshold number of nodes can be randomly selected from the layer and color coded. The remaining nodes can be colored with a default color, such as light gray, or visually hidden to reduce their visual impact. In other examples, the nodes for the layer can be ranked by their associated values and then color-coded until the threshold number of nodes for that layer is reached. For example, the nodes in the input layer 1104 can be ordered from highest value to lowest value. The highest-value nodes from the ordered list can be color coded until the threshold number of nodes is reached. The remaining nodes can be colored with the default color or visually hidden. In some examples, the node-link diagram 1102 may also be updated in response to the thresholding to only display the connections between color-coded nodes (i.e., the nodes that are not the default color or visually hidden). This may decrease the number of lines in the node-link diagram 1102, reducing visual clutter.

In some examples, the GUI 1100 can include additional threshold controls 1122a-c for enabling a user to manipulate the number of connections visually displayed between layers in the node-link diagram 1102. For example, the threshold control 1122a can be used to apply one or more thresholds to the connections between the input layer 1104 and the hidden layer 1106. In FIG. 11, the user has selected an upper threshold of 0.771 and a lower threshold of −1.697 via threshold control 1122a. In response, connections having values above the upper threshold and below the lower threshold can be visually displayed in the node-link diagram 1102. Connections having values between the upper threshold and the lower threshold can be hidden from view. This may reduce visual clutter in the node-link diagram 1102. The threshold control 1122b can control the connections visually displayed between the hidden layers 1106, 1108, and threshold control 1122c can control the connections visually displayed between the hidden layer 1108 and the output layer 1110. The threshold controls 1122a-c may serve to reduce the visual clutter in the node-link diagram 1102.

Figure 12A:
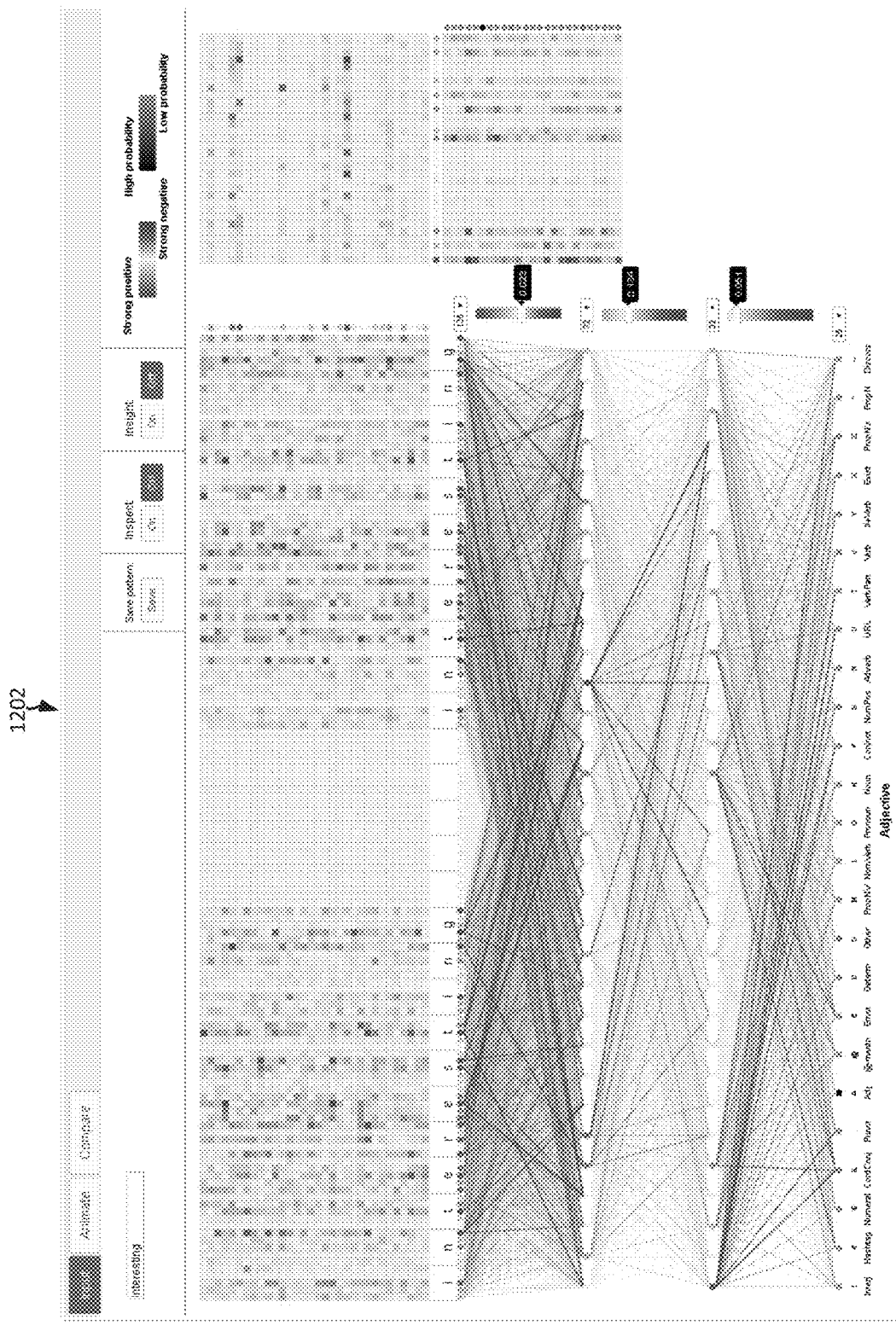
FIG. 12A is an example of a GUI having a node-link diagram to which minimal thresholding has been applied according to some aspects.
Figure 12B:
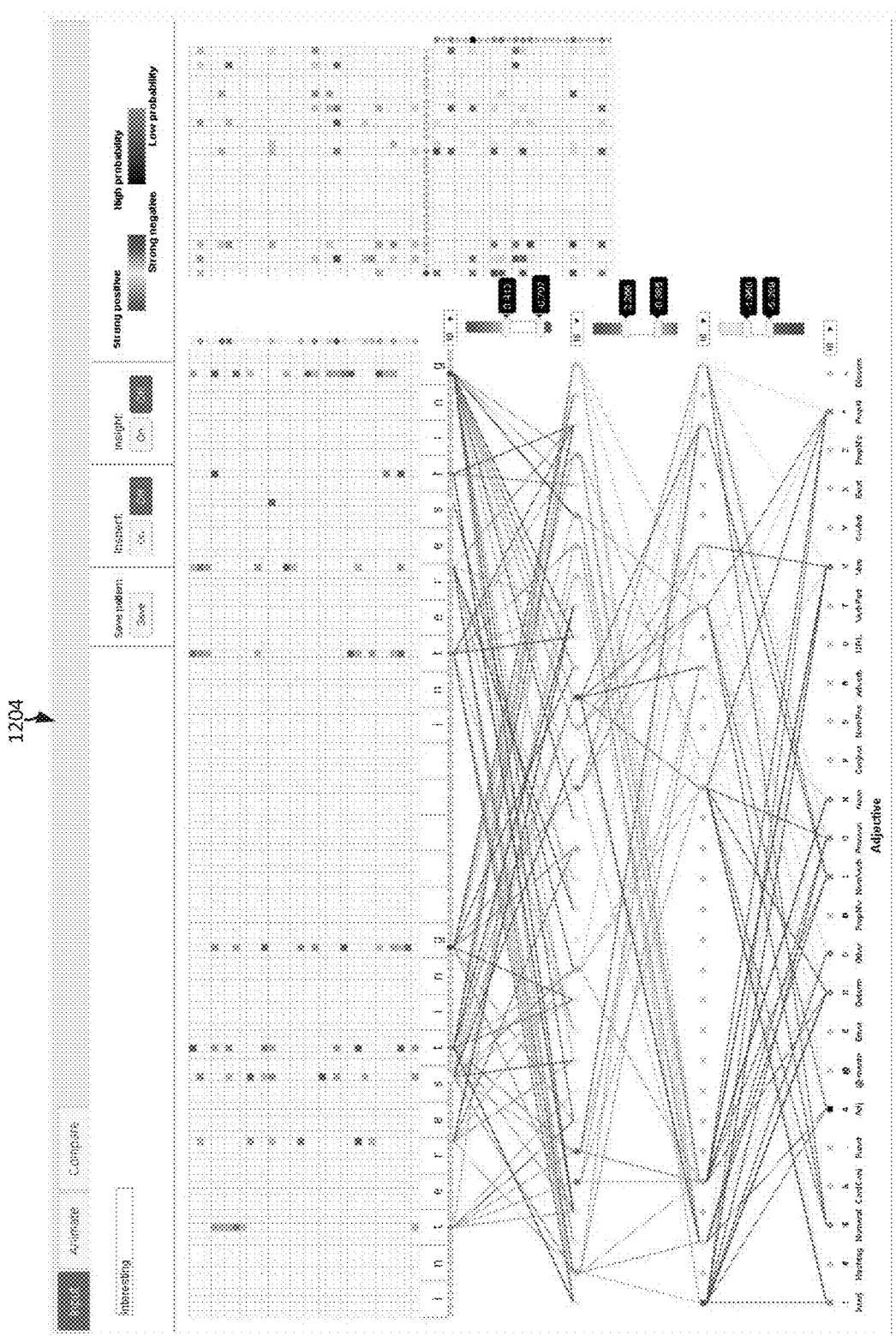
FIG. 12B is an example of a GUI having a node-link diagram to which thresholding has been applied according to some aspects.

A particular example of thresholding is shown in FIGS. 12A-B. The GUI 1202 of FIG. 12A includes a node-link diagram showing all of the connections (as lines) between nodes. Limited thresholding has been applied. The GUI 1204 of FIG. 12B shows the node-link diagram after more thresholding has been applied. The number of connections visually displayed in the node-link diagram is substantially reduced as a result of the thresholding. This can enable a user to selectively inspect features of interest in the deep neural network.

Node-link diagrams can provide an intuitive visualization of the structure of a deep neural network. But node-link diagrams may become large and confusing as the number of symbols representing nodes and connections increases for larger-sized deep neural networks (e.g., for deep neural networks with tens or hundreds of hidden layers and nodes). For examples, lines and circles may overlap, visually occluding important information. Some examples of the present disclosure can overcome this issue by additionally or alternatively including a quilt graph in the GUI 1100.

Figure 13:
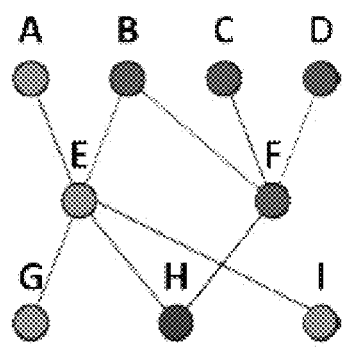
FIG. 13 is an example of a node-link diagram according to some aspects.
Figure 14:
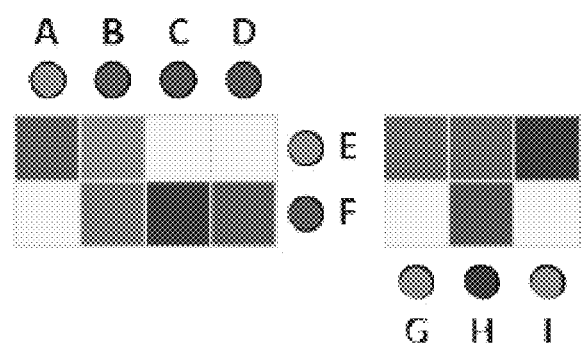
FIG. 14 is an example of a quilt graph according to some aspects.

A quilt graph can include a matrix of cells, where each cell in the matrix represents a potential connection between two nodes. Because each connection is represented in a separate cell in the matrix, quilt graphs may be expandable in size without becoming overly confusing. Quilt graphs may also visually emphasize connections between nodes and highlight patterns in the connections. For example, referring to FIG. 13, nine nodes are shown using a node-link diagram. The node-link diagram may provide an intuitive visualization of the structure of the nodes. The same nine nodes are represented as a quilt graph in FIG. 14. The quilt graph of FIG. 14 may more readily highlight features and patterns associated with the connections between the nodes, but may provide a less intuitive visualization of the structure of the nodes.

Returning to FIG. 11, the GUI 1100 includes a quilt graph 1112 representing nodes and connections in the deep neural network. The quilt graph 1112 has a horizontal axis and a vertical axis. Symbols (e.g., circles) representing the input layer 1104 of the deep neural network can be positioned adjacent to the horizontal axis. Symbols representing the hidden layer 1106 can be positioned adjacent to the vertical axis. Each cell (or "block") in the quilt graph 1112 can represent a potential connection between one node in the input layer 1104 and another node in the hidden layer 1106. Cells that are color coded can represent actual connections between nodes in the input layer 1104 and the hidden layer 1106. In some examples, the color coding of the quilt graph 1112 is the same as the color coding for the node-link diagram 1102. For example, a cell in the quilt graph 1112 can have a first color (e.g., blue) if the value associated with the cell is negative and a second color (e.g., red) if the value associated with the cell is positive. More saturated colors can represent larger absolute values.

In some examples, the GUI 1100 includes multiple quilt graphs 1112, 1114, 1116. Quilt graph 1114 can visually represent connections between the hidden layer 1106 and the hidden layer 1108. Quilt graph 1116 can visually represent connections between the hidden layer 1108 and the output layer 1110. These quilt graphs 1114, 1116 can use the same color coding or a different color coding as the node-link diagram 1102.

In some examples, the quilt graphs 1112-1116 can correspond to the node-link diagram 1102. For example, if the node-link diagram 1102 is manipulated, updated, or otherwise changed, the information in the quilt graphs 1112-1116 can correspondingly change (e.g., so that the information presented in the quilt graphs 1112-1116 matches the information in the node-link diagram 1102). As a specific example, if thresholding is applied to the node-link diagram 1102, similar thresholding can be applied to the quilt graphs 1112-1116, so that the thresholding acts on the node-link diagram 1102 and the quilt graphs 1112-1116 concurrently. Likewise, if the quilt graphs 1112-1116 are manipulated, updated, or otherwise changed, the information in the node-link diagram 1102 can correspondingly change (e.g., so that the information presented in node-link diagram 1102 matches the information in the quilt graphs 1112-1116).

Figure 15:
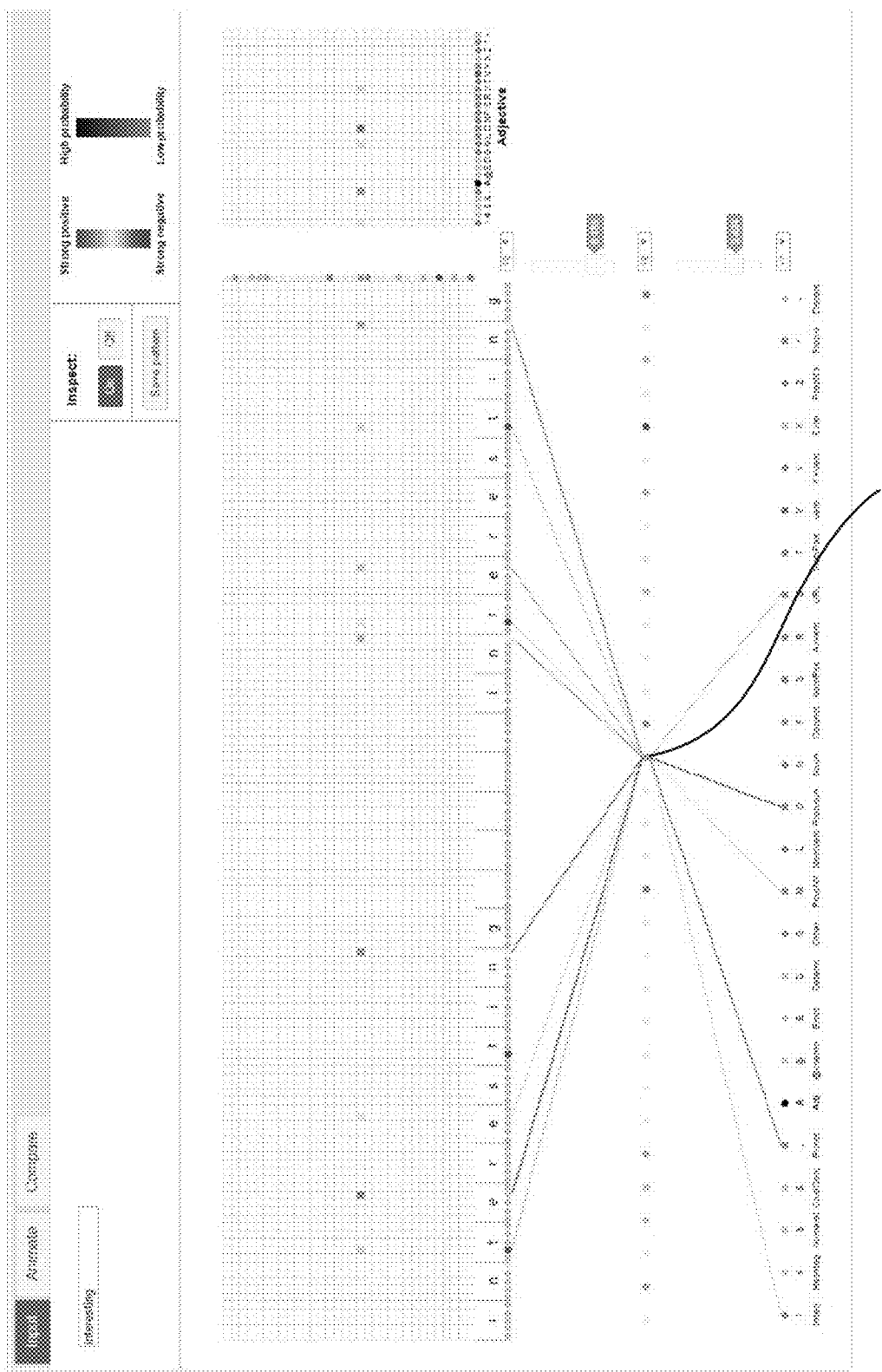
FIG. 15 is an example of a GUI having a node-link diagram in which a node has been selected according to some aspects.

While thresholding can be effective for filtering and selecting visual information, some examples also provide the ability to inspect each node separately. For example, a user may click on a node (e.g., in the node-link diagram 1102) to enter an inspection mode. In the inspection mode, the node-link diagram 1102 can be updated to only display the connections to and from the selected node, while hiding all the other connections. This may enable a user to focus on a single node. The quilt graphs 1112-1116 can be similarly updated. An example of a node 1502 being inspected is shown in FIG. 15. In some examples, inspecting a node can highlight differences between a node's incoming and outgoing connections by reducing visual interference. This can help a user determine the contribution of each incoming connection to the final output of a node, as well as the influence of the node on its outgoing connections. In some examples, thresholding can be disabled in the inspection mode. In such examples, thresholding can be re-enabled upon the GUI 1100 exiting the inspection mode. Inspection mode can be enabled or disabled via one or more options, such as option 1140.

Figure 16:
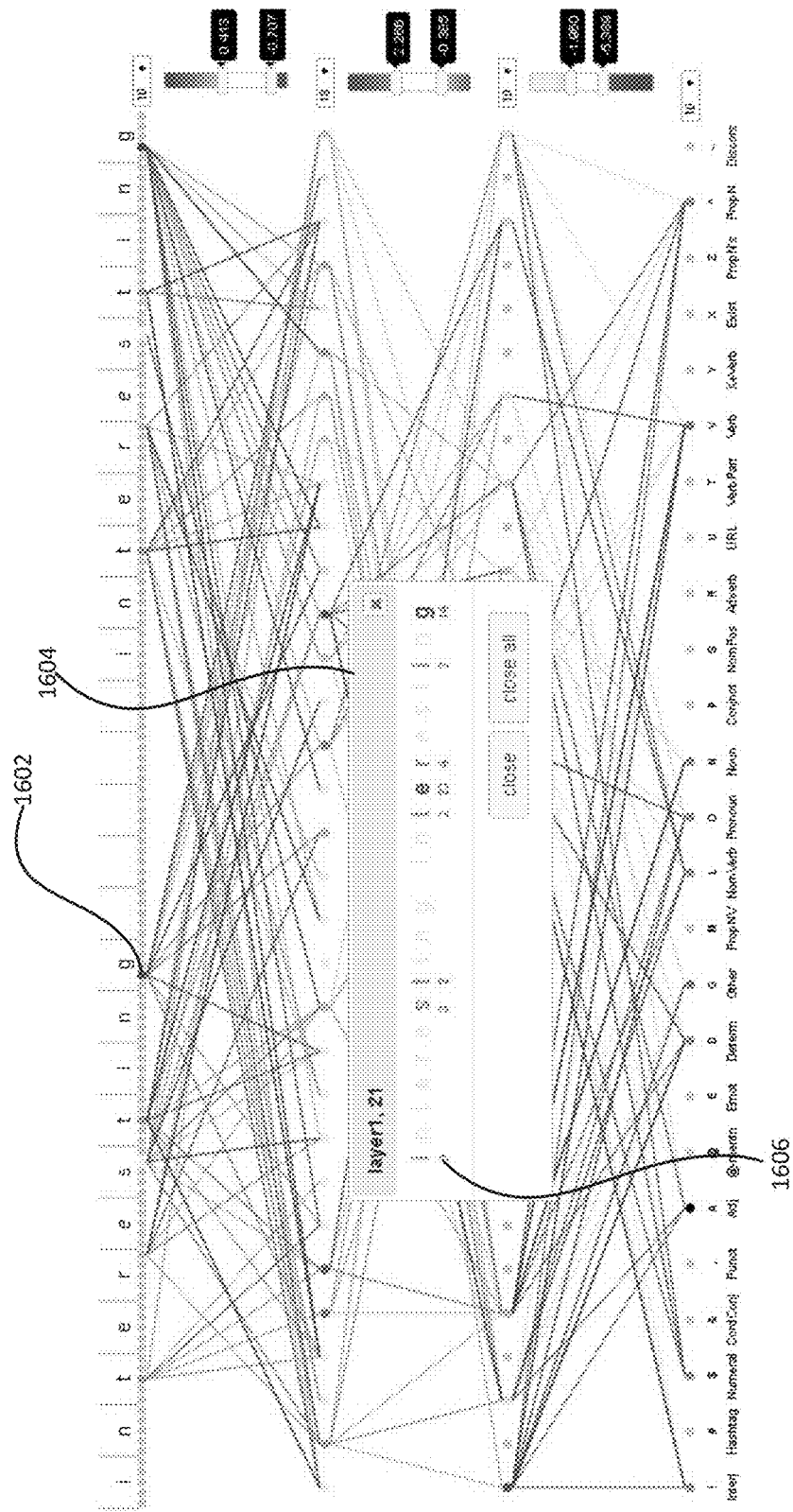
FIG. 16 is an example of a GUI having a dialog box that includes information associated with a selected node according to some aspects.

In some examples, the GUI 1100 can present a dialog box with insights about a node. This can be an insights dialog-box. The insights dialog-box can be presented in response to selection of the node. The insights dialog-box can indicate which input characters and corresponding embedded weights most strongly activate the selected node. An example of an insights dialog-box 1604 is shown in FIG. 16. In FIG. 16, the insights dialog-box 1604 is presented in response to a selection of node 1602. The insights dialog-box 1604 displays the input characters ("interesting interesting") into the deep neural network. The input characters that activate the selected node 1602 can be shown in a first color (e.g., red). These characters can be referred to as activating characters. In FIG. 16, the activating characters are "i", "s", and "t" in the left occurrence of "interesting," and "t", "e", "r", "i", and "g" in the right occurrence of "interesting." The remaining characters can be shown in a second, default color (e.g., light gray). The more strongly a character activates the node 1602, the more saturated the color of the character may be. In some examples, the insights dialog-box 1604 can also include numbers 1606 beneath the activating characters that identify the specific embedded-weights that produce the activation. For example, in FIG. 16, the specific embedded input-weights that drive the activation are in positions 0, 3, 2, 2, 2&3, 4, 2, and 1&4, respectively. The insights dialog-box 1604 may allow the user to determine which part(s) of an input that a node responds to, providing insight into the purpose of the node. The insights dialog-box 1604 can be enabled or disabled via one or more options, such as option 1142 of FIG.

In some examples, the GUI 1100 can provide tooltips to display detailed information about individual nodes and connections. For example, hovering over a node in the input layer 1104 can cause a tooltip to be displayed that includes the node's position, weight, or both of these. Hovering over a connection between a node in the input layer 1104 and another node in the hidden layer 1106 can cause a tooltip to be displayed that includes (i) an activation weight for the node in the input layer 1104, (ii) a weight for the connection, (iii) an output value determined by the multiplying these two weights, or (iv) any combination of these. Hovering over a node in the hidden layer 1106, 1108 can cause a tooltip to be displayed that includes (i) a sum of the incoming-connection weights, (ii) a bias value, (iii) an output value that can be determined by applying a function to the sum and bias, or (iv) any combination of these. Hovering over a connection between a node in the hidden layer 1108 and a node in the output layer 1110 can cause a tooltip to be displayed that includes (i) an activation weight for the node in the hidden layer 1108, (ii) a weight for the connection, (iii) an output value determined by multiplying these two weights, or (iv) any combination of these. Hovering over a node in the output layer 1110 can cause a tooltip to be displayed that includes (i) a sum of all of its incoming-connection weights, (ii) a bias value, (iii) a normalized output as a probability value, or (iv) any combination of these. An example of a tooltip 1128 generated by hovering over a node in the output layer 1110 is shown in FIG. 11. Tooltips may be useful to examine the exact values of the nodes and to understand the data flow between nodes and connections.

In some examples, a user may be able to save some or all of the information displayed in the GUI 1100 by manipulating a save button 1138. For example, the user can save information related to the nodes and connections displayed in the node-link diagram 1102 to a data file by selecting the save button 1138. This may enable the GUI 1100 to revert back to a previously saved state or display previously saved information. For example, the GUI 1100 may be able to retrieve the data file and display the information in the data file.

In some examples, the GUI 1100 can operate in one of several operational modes. A user can switch between operational modes by selecting one of the available tabs 1130, 1134, 1136. For example, in FIG. 11, the "Input" tab 1130 has been selected and, as a result, the GUI 1100 is in an input mode. In the input mode, a user can provide an input word to the deep neural network via the input box 1132. Based on the input, the weights of nodes and connections in the deep neural network are calculated (e.g., by executing the deep neural network) and the GUI 1100 is appropriately updated. A user can then explore the GUI 1100 using the abovementioned functions. The input mode can support examination of the deep neural network in response to arbitrary input. This may allow a user to obtain a general idea of how the network behaves for different classes of inputs.

Figure 17:
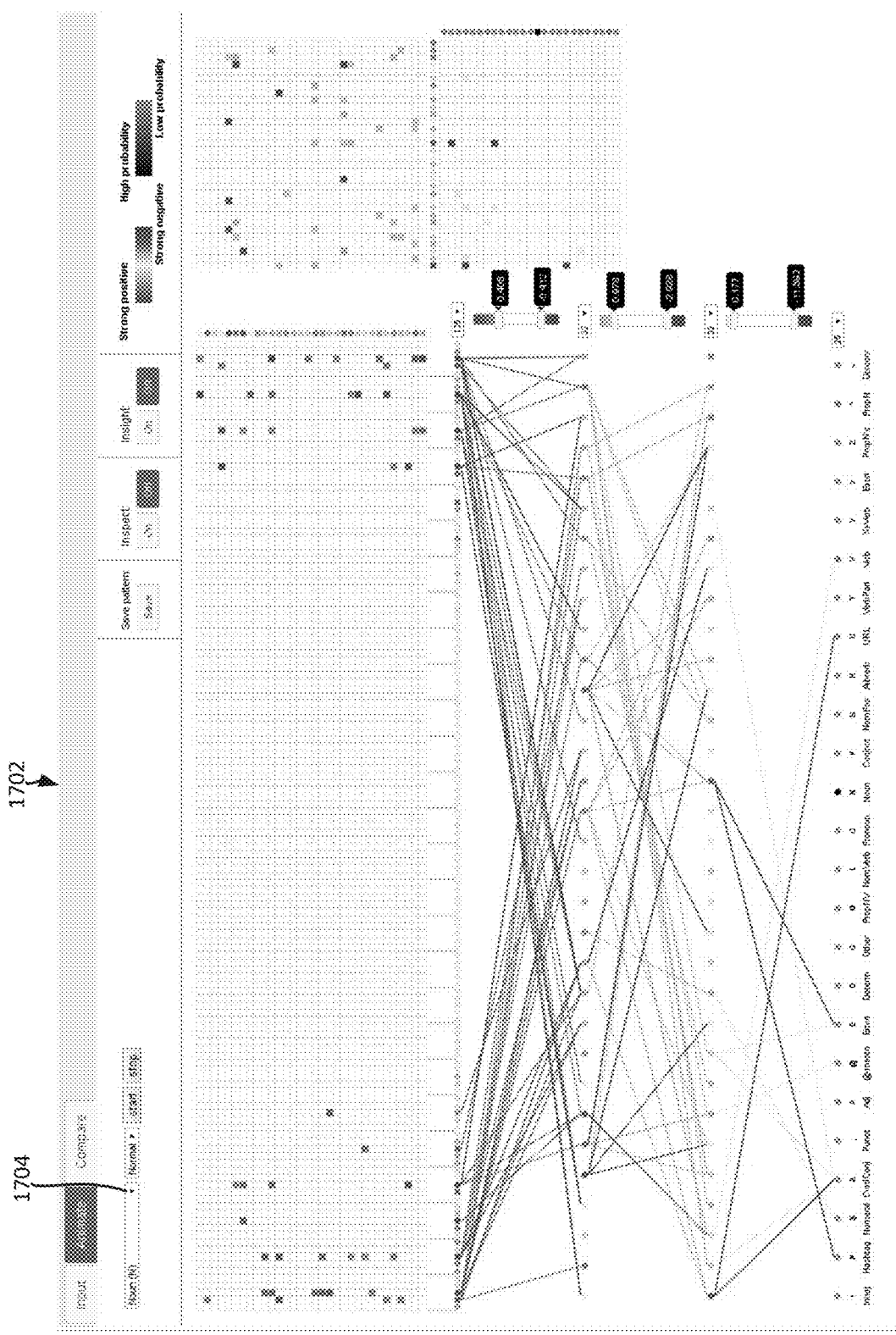
FIG. 17 is an example of a GUI in an animation mode according to some aspects.

In some examples, a user may be able to select the "Animate" tab 1134 to cause the GUI 1100 to enter an animation mode. An example of a GUI 1702 in animation mode is shown in FIG. 17. In animation mode, GUI 1702 can animate the visualization using aggregate values resulting from multiple inputs into the deep neural network. As a particular example, the deep neural network may be a part-of-speech tagger that determines a part of speech for an input word. The user may be able to select a part-of-speech from an input element, such as a dropdown menu 1704, and then press a start button. This can cause a predetermined number of words having the selected part-of-speech to be fed into the deep neural network (e.g., at a user-chosen animation speed). For example, one-hundred words that are nouns can be fed into the deep neural network. After each word is fed into the deep neural network, the GUI 1702 can be updated to reflect the average activation-values resulting from all of the input words thus far. For example, the color coding of the node-link diagram and the quilt graph(s) can be updated to reflect average activation-values generated based on all of the input words thus far. In some examples, the deep neural network can converge to a stable pattern of activation for a specific part-of-speech after a certain number of words having that part-of-speech are fed into the deep neural network. Stable patterns of activation can occur when the node and connection activation values remain relatively constant. Stable patterns of activation can emerge after a few inputs into the deep neural network, and persist thereafter. For example, a stable pattern of activation can emerge after fifteen nouns are fed into the deep neural network. An example of such a stable pattern of activation is shown in the node-link diagrams and quilt graphs of FIG. 17. The stable pattern of activation may be observable by and valuable for a user.

In some examples, the stable patterns of activation can indicate that, for inputs of a common type (e.g., words that are the same part-of-speech; words that have the same ending, such as -ly; images containing a common object; or text having a common sentiment), there are a shared set of nodes and connections that represent a signature in the deep neural network. The deep neural network has learned, through training, to use a certain pattern to process input of a given type, and we can see that pattern in the GUI 1702. The pattern can reveal important nodes and connections that activate most strongly for a given type of input. This can be used to further study the features, distributions, and correlations of the nodes and connections in the deep neural network. The pattern can also visually expose some of the underlying features of the deep neural network.

In some examples, a user may be able to select the "Compare" tab 1136 to cause the GUI 1100 to enter a comparison mode. An example of a GUI 1802 in comparison mode is shown in FIG. 18. In the comparison mode, a user may be able to select two files via file-selection components 1804*a-b*. The files may each have saved information associated with nodes and connections between the nodes in a deep neural network. For example, the file "gaga.json" selected using file-selection component 1804*a* can include information indicating how the deep neural network responded when the word "gaga" was input into the deep neural network. The file "Gaga.json" selected using file-selection component 1804*b* can include information indicating how the deep neural network responded when the word "Gaga" (with a capital G) was input into the deep neural network. In some examples, a user can select a button associated with one of the files to cause the GUI 1802 to display the information in the file. For example, the user can select the "vis" button adjacent to file-selection component 1804*a* to cause the GUI 1802 to display the information in the file "gaga.json." In other examples, the user can select a "compare" button to cause the GUI 1802 to determine and display differences between the information in the two files.

For example, the activation pattern (e.g., the activation values for every node and connection) in "gaga.json" can be compared to the activation pattern in "Gaga.json," and differences between the two activation-patterns can be calculated and displayed. The node-link diagram and the quilt graphs can be color coded to represent the differences between the two activation-patterns. This may enable a user to visualize how activation differences among nodes in the input layer propagate to nodes in the hidden layers and the output layer. For example, in the quilt graph, the columns representing the first character "G" (versus "g") in the input are most different in their activation values. This can indicate that the difference in the first character is responsible for the majority of the difference in the deep neural network's response to "Gaga" versus "gaga." In the node-link diagram, the outgoing connections from the nodes associated with the letter "G" are linked to every node in the first hidden layer. These differences further propagate to the output layer, affecting the different probabilities used to classify both inputs. This can intuitively illustrate that a difference concentrated in a small area in the input layer propagates and disseminates to a broader area in the following layers, influencing the behavior of the entire deep neural network.

In some examples, comparing information in multiple files may allow a user to determine how a deep neural network responds to different inputs, identify nodes and connections that activate most differently in response to different inputs, or compare an average activation-pattern resulting from multiple inputs (e.g., generated using the animation mode) to an activation pattern resulting from a single input. Further, local changes in the deep neural network have global consequences, which can be visualized via the GUI 1802. Applying the same analysis to other deep neural networks can reveal how local changes influence those deep neural networks.

Figure 18A:
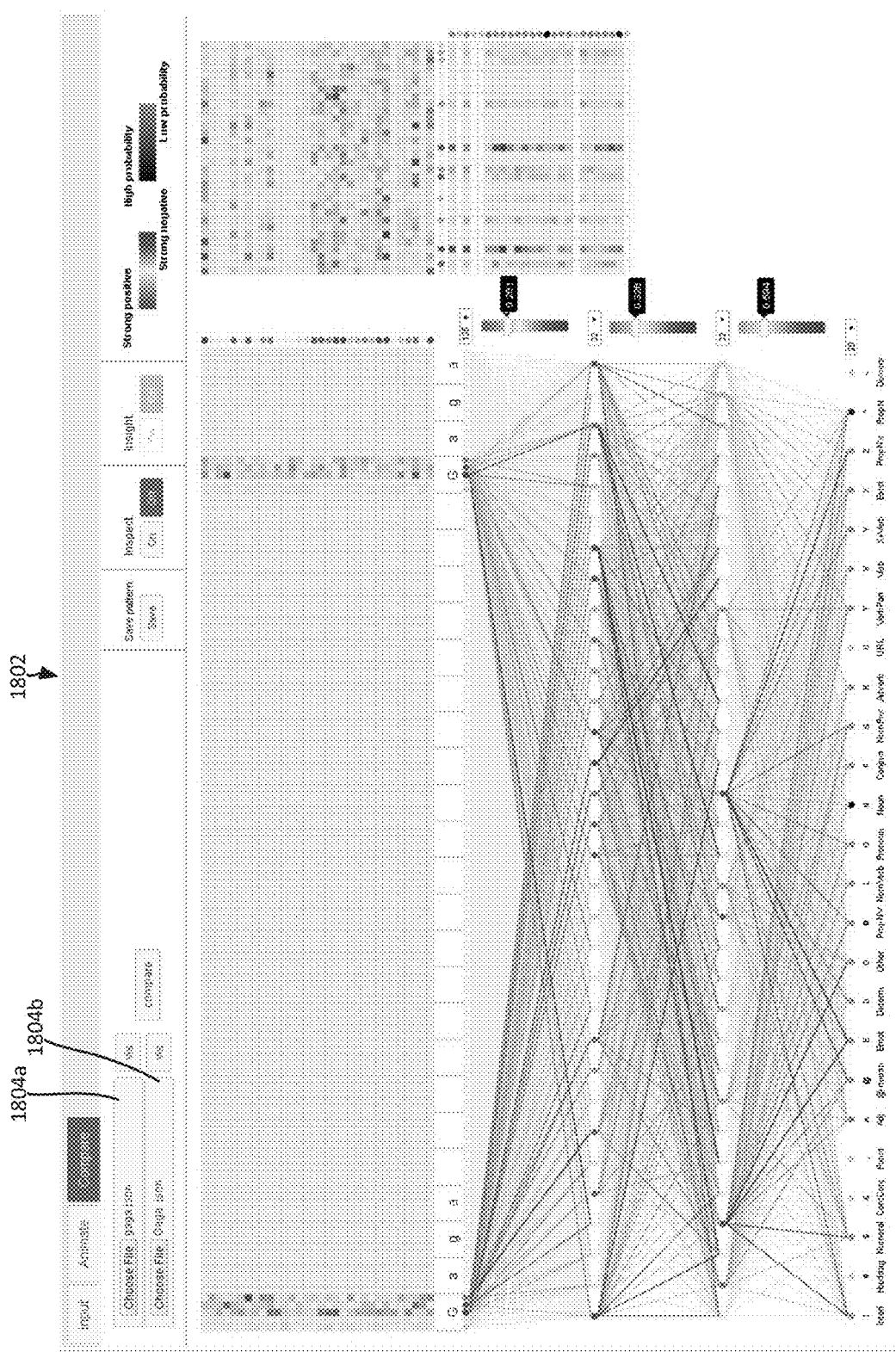
FIG. 18A is an example of a GUI in a comparison mode according to some aspects.
Figure 18B:
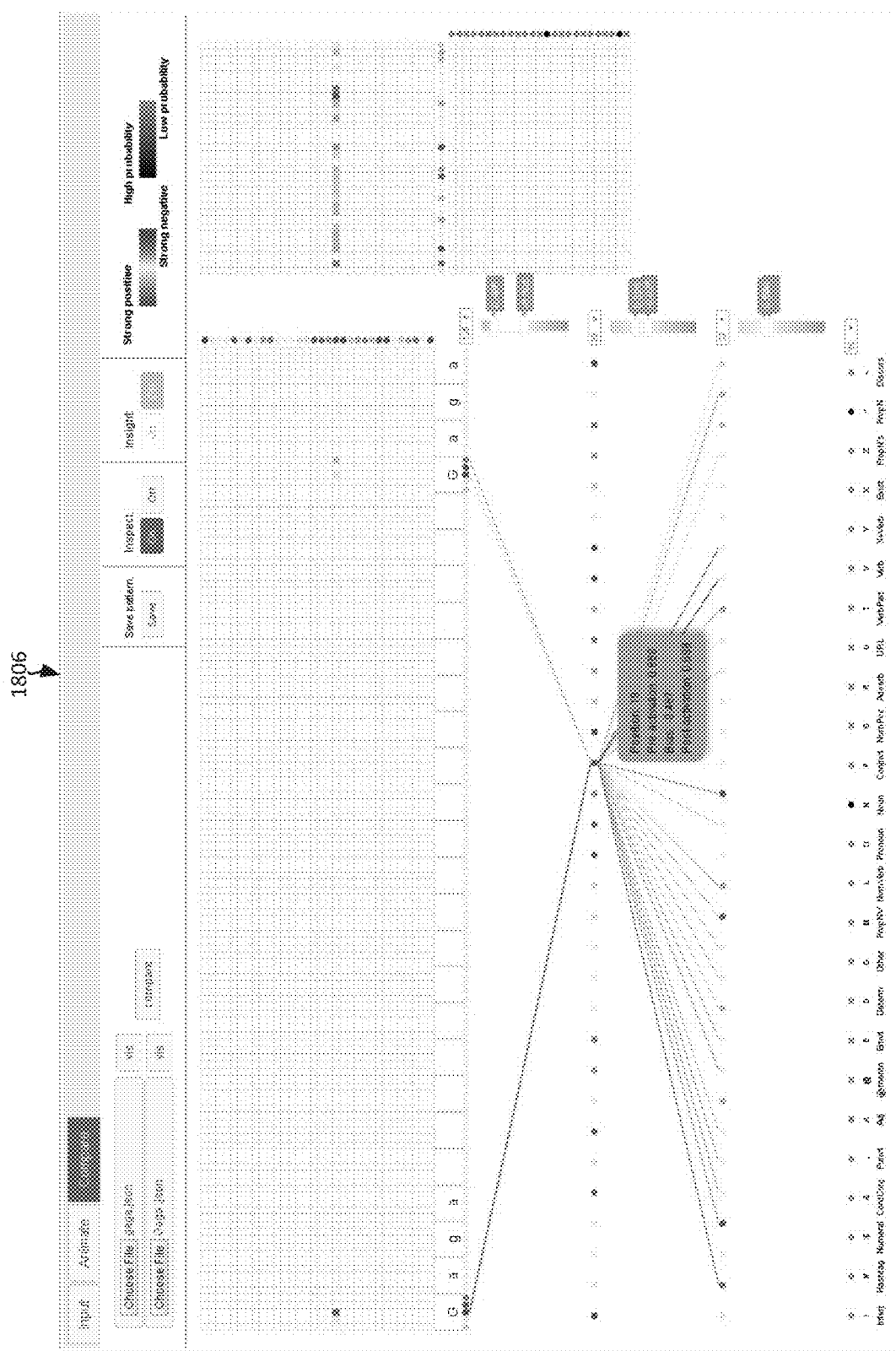
FIG. 18B is an example of the GUI in FIG. 18A in which thresholding has been applied and a node has been selected according to some aspects.

In some examples, thresholding can be applied and nodes can be selected, for example, as shown in FIG. 18B. This can allow a user to inspect nodes to see which differences in the input layer are contributing most to the activation of the selected node.

Scalability can be an important consideration for a GUI for visualizing deep neural networks. For example, the deep neural network depicted in the GUI 1100 of FIG. 11 includes four layers (an input layer 1104, hidden layers 1106-1108, and an output layer 1110). But other deep neural networks can include tens or hundreds of layers having hundreds or thousands of nodes each. Some examples can include features to enable the GUI 1100 to scale for different-sized deep neural networks.

Figure 19:
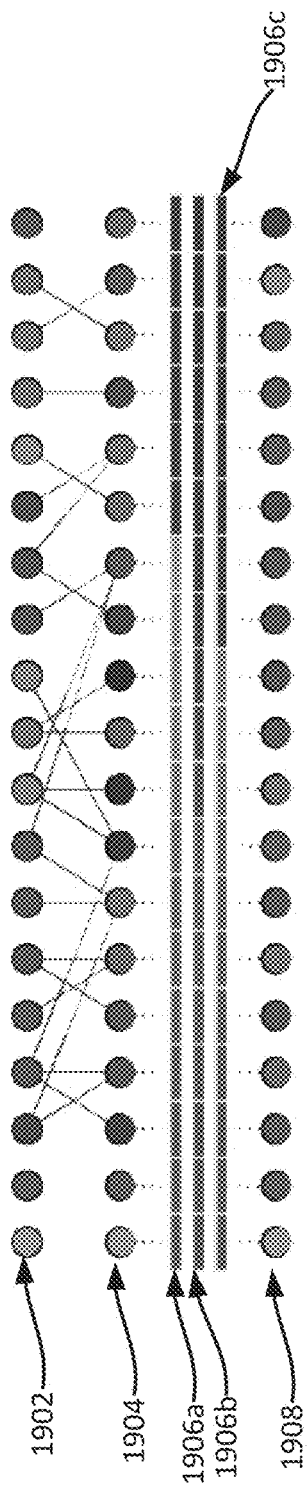
FIG. 19 is an example of activated and deactivated layers of a neural network according to some aspects.

For example, the GUI 1100 can provide the ability to interactively "activate" or "deactivate" individual layers or groups of layers. A specific example is shown in FIG. 19. In FIG. 19, layers 1902, 1904, and 1908 are "activated" such that the nodes and connections between the nodes in the layers 1902, 1904, and 1908 are visible. Layers 1906*a-c* are "deactivated" such that some or all of the connections between the nodes are hidden. These layers can be referred to as deactivated layers. But the nodes in the deactivated layers 1906*a-c* may still be visible and color coded to enable a user to visually determine information about the nodes quickly and easily. This can be referred to as layer summarization. This can allow a user to examine the activation values for the nodes in deactivated layers 1906*a-c*. For example, each deactivated layer 1906*a-c* can be divided into n sub-blocks, with one sub-block representing one node. Each sub-block is colored based on the activation value of the node it represents. In some examples, the order of the sub-blocks can be sorted based on the activation values of the nodes they represent. This may allow a user to better compare the activation patterns between adjacent, deactivated layers 1906*a-c*. Further, layers 1906*a-c* that have similar color-patterns for sub-blocks may be candidates for further examination, since they may identify hidden layers that perform similar functionality, and therefore may be compressed to reduce the size of the deep neural network.

In some examples, the connections between adjacent layers L1 and L2 can either be shown or hidden according to the following rules. If both L1 and L2 are activated, the connections between L1 and L2 can be displayed. If both L1 and L2 are deactivated, the connections between L1 and L2 can be hidden. If L1 is activated and L2 is deactivated, for each node in L1, a single connection can be displayed that represents the average weight of all the connections from the node in L1 to the nodes in L2.

Figure 20:
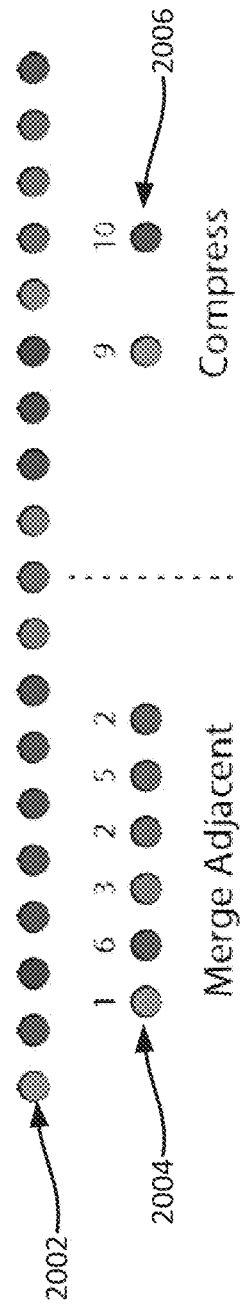
FIG. 20 is an example of merged and compressed nodes according to some aspects.

In some examples, the nodes in the node-link diagram 1102 can be compressed or merged to reduce the amount of information displayed in the node-link diagram. These can be referred to as node summarization. An example of node compression and node merging is shown in FIG. 20. FIG. 20 shows a row of nodes 2002. The row of nodes 2002 may represent, for example, a hidden layer 1106 of nodes in the in the node-link diagram 1102 of FIG. 11. The left-hand side of FIG. 20 shows an example of node merging. In node merging, nodes having the same activation-value can be merged together, thereby reducing the overall number of nodes. This can result in merged nodes 2004. In some such examples, prior to merging the nodes together, a threshold can be applied to the nodes such that only nodes having a high activation-value or a low activation-value are retained and used during the merging process. In other such examples, prior to merging the nodes together, nodes exhibiting high-variance patterns (e.g., positive, negative, positive, negative) can be reordered to remove the variance (e.g., positive, positive, negative, negative). The right-hand side of FIG. 20 shows an example of node compression. In node compression, nodes having the same sign (e.g., a positive activation-value or a negative activation-value) can be merged together into a single node, thereby reducing the overall number of nodes. This can result in compressed nodes 2006.

Figure 21:
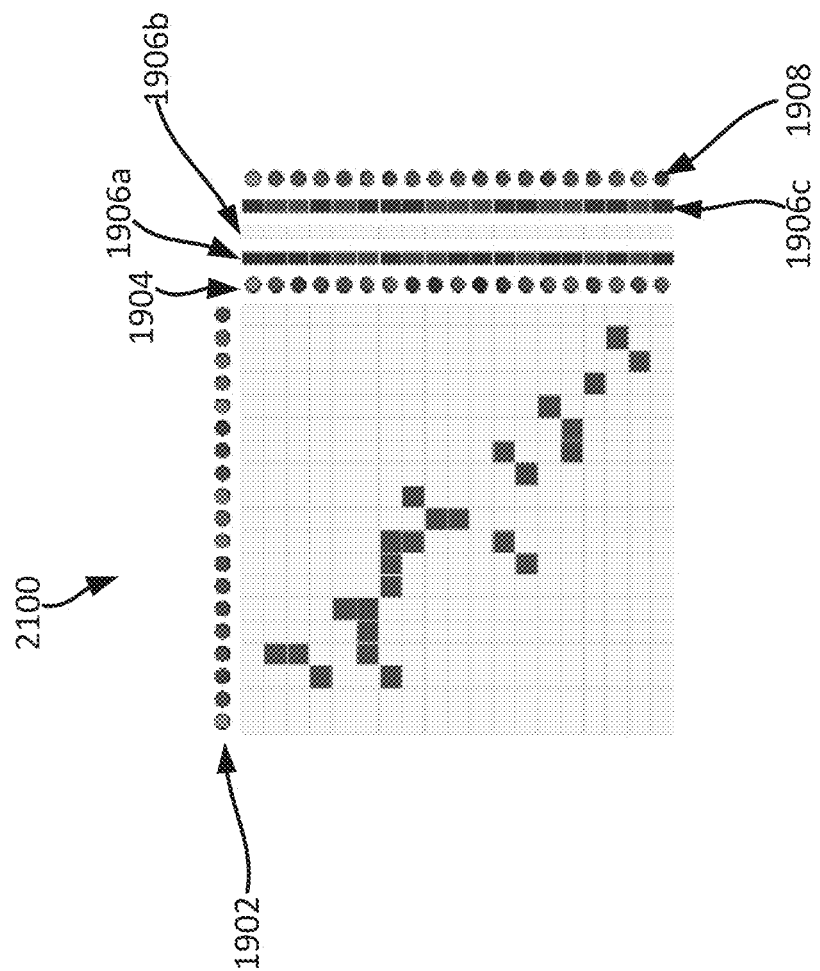
FIG. 21 is an example of a quilt graph that has been modified according to the activated and deactivated layers shown in FIG. 19 according to some aspects.

In some examples, changes to a node-link diagram 1102 affect the quilt graph(s) 1112-1116 in a corresponding manner. For example, deactivating one or both of the hidden layers 1106, 1108 can reduce the matrix of the quilt graph 1112 to a 1×n vector (or n×1 vector, depending on orientation). And merging or compressing n nodes into m representative nodes, wherein m≤n, can reduce the width (or height) of the corresponding quilt graph(s) 1112-1116 from n to m. One example of a quilt graph 2100 resulting from the layer deactivations shown in FIG. 19 is shown in FIG. 21.

Some or all of the abovementioned features may enable the GUI 1100 to scale for use with deep neural networks having varying numbers of layers and nodes. The GUI 1100 can work with any type of deep neural network, including but not limited to deep neural networks for determining parts-of-speech, image classification, and natural language processing. The GUI 1100 can work with convolutional neural networks, recurrent neural networks, etc.

Figure 22:
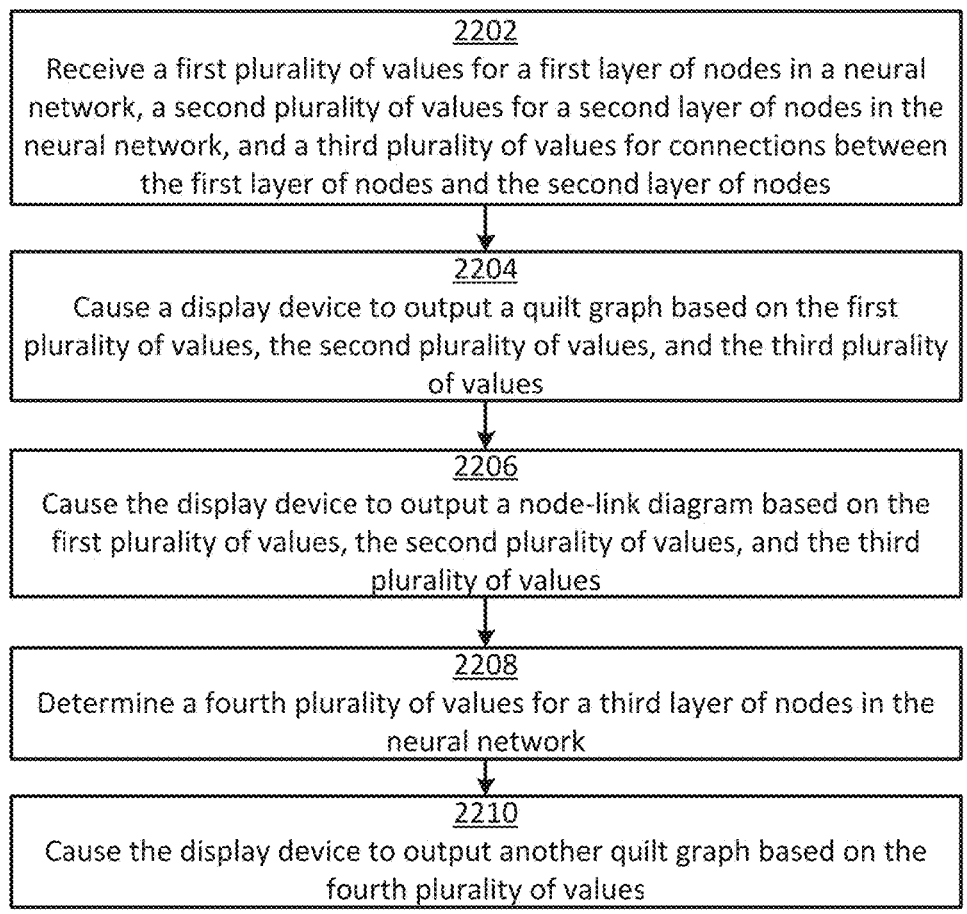
FIG. 22 is a flow chart of an example of a process for visualizing a deep neural network according to some aspects.

FIG. 22 is a flow chart of an example of a process for visualizing a deep neural network according to some aspects. Some examples can include more steps than, fewer steps than, different steps than, or a different order of the steps shown in FIG. 22. Some examples can be implemented using any of the systems and processes described with respect to FIGS. 1-10.

In block 2202, a processing device receives a first plurality of values for a first layer of nodes in a neural network, a second plurality of values for a second layer of nodes in the neural network, a third plurality of values for connections between the first layer of nodes and the second layer of nodes, or any combination of these. For example, the processing device can receive a first set of activation values associated with nodes in an input layer of a neural network, a second set of activation values associated with nodes in a hidden layer of the neural network, and a third set of activation values associated with connections between the nodes in the input layer and the hidden layer.

In some examples, the processing device can receive the first plurality of values, second plurality of values, and third plurality of values from local memory or from a remote device. For example, the processing device can access a local memory or a remote database (e.g., via the Internet) to obtain the first plurality of values, second plurality of values, and third plurality of values. In other examples, the processing device can generate the first plurality of values, second plurality of values, and third plurality of values by running the neural network. The processing device can provide input to the neural network, train the neural network, or otherwise execute the neural network and, thereafter, determine the activation values associated with the nodes and connections in the neural network. The processing device can use the activation values as the first plurality of values, second plurality of values, and third plurality of values.

Figure 23:
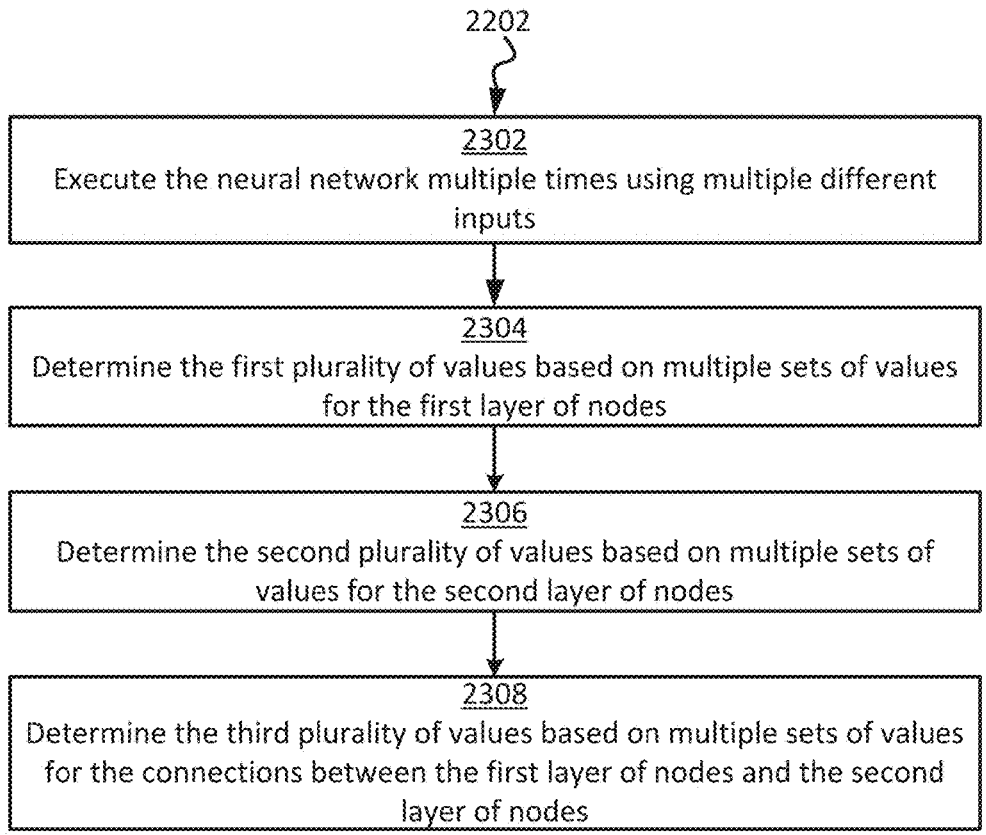
FIG. 23 is a flow chart of an example of a process for receiving a plurality of values according to some aspects.
Figure 24:
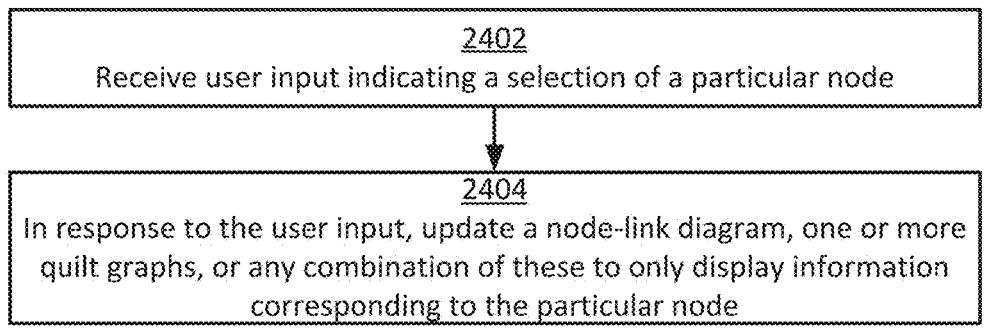
FIG. 24 is a flow chart of an example of a process for updating a GUI based on user input according to some aspects.

In some examples, the processing device can perform some or all of the steps shown in FIG. 23 to determine the first plurality of values, second plurality of values, and third plurality of values. For example, in block 2302, the processing device can execute the neural network multiple times using multiple different inputs. This may be similar to the animation mode or comparison mode discussed above. In block 2304, the processing device determines the first plurality of values based on multiple sets of values for the first layer of nodes generated by executing the neural network multiple times. For example, the processing device can determine the first plurality of values by calculating the difference between (e.g., if in comparison mode) or average of (e.g., if in animation mode) the multiple sets of values for the first layer of nodes. In block 2306, the processing device determines the second plurality of values based on multiple sets of values for the second layer of nodes. For example, the processing device can determine the second plurality of values by calculating the difference between or average of the multiple sets of values for the second layer of nodes. In block 2308, the processing device determines the third plurality of values based on multiple sets of values for the connections between the first layer of nodes and the second layer of nodes. For example, the processing device can determine the third plurality of values by calculating the difference between or average of the multiple sets of values for the connections between the first layer of nodes and the second layer of nodes.

Returning to FIG. 22, in block 2204, the processing device causes a display device to output a quilt graph based on the first plurality of values, second plurality of values, third plurality of values, or any combination of these. For example, the processing device can generate the quilt graph 1112 shown in FIG. 11 to represent at least a portion of the first plurality of values, second plurality of values, and third plurality of values.

In block 2206, the processing device causes the display device to output a node-link diagram based on the first plurality of values, second plurality of values, third plurality of values, or any combination of these. For example, the processing device can generate the node-link diagram 1102 shown in FIG. 11 to represent at least a portion of the first plurality of values, second plurality of values, and third plurality of values.

In block 2208, the processing device determines a fourth plurality of values for a third layer of nodes in the neural network. For example, the processing device can determine a third set of activation values associated with another hidden layer in the neural network or an output layer of the neural network. The processing device can receive or determine the third set of activation values using any of the methods described with respect to block 2202.

In block 2210, the processing device causes the display device to output another quilt graph 1114-1116 based on the fourth plurality of values. For example, the processing device can generate quilt graph 1114, quilt graph 1116, or both (shown in FIG. 11) to represent at least a portion of the fourth plurality of values.

In some examples, the processing device can update the node-link diagram, the quilt graph(s), or any combination of these based on user input. For example, referring now to FIG. 24, in block 2402 the processing device receives a user input indicating a selection of (a visual representation of) a particular node in the node-link diagram or the quilt graph. The processing device can receive the user input via a mouse, keyboard, touch-screen display, touch-pad, etc. In block 2404, the processing device updates a node-link diagram, one or more quilt graph(s), or any combination of these to only display information corresponding to the particular node in response to the user input. For example, the processing device can update the node-link diagram 1102 and the quilt graph(s) 1112-1116 to only display connections to and from the particular node. An example of this is shown in FIG. 18B. Additionally or alternatively, the processing device can update the node-link diagram to display a dialog box with information related to the particular node (e.g., as shown in FIG. 18B).

Figure 25:
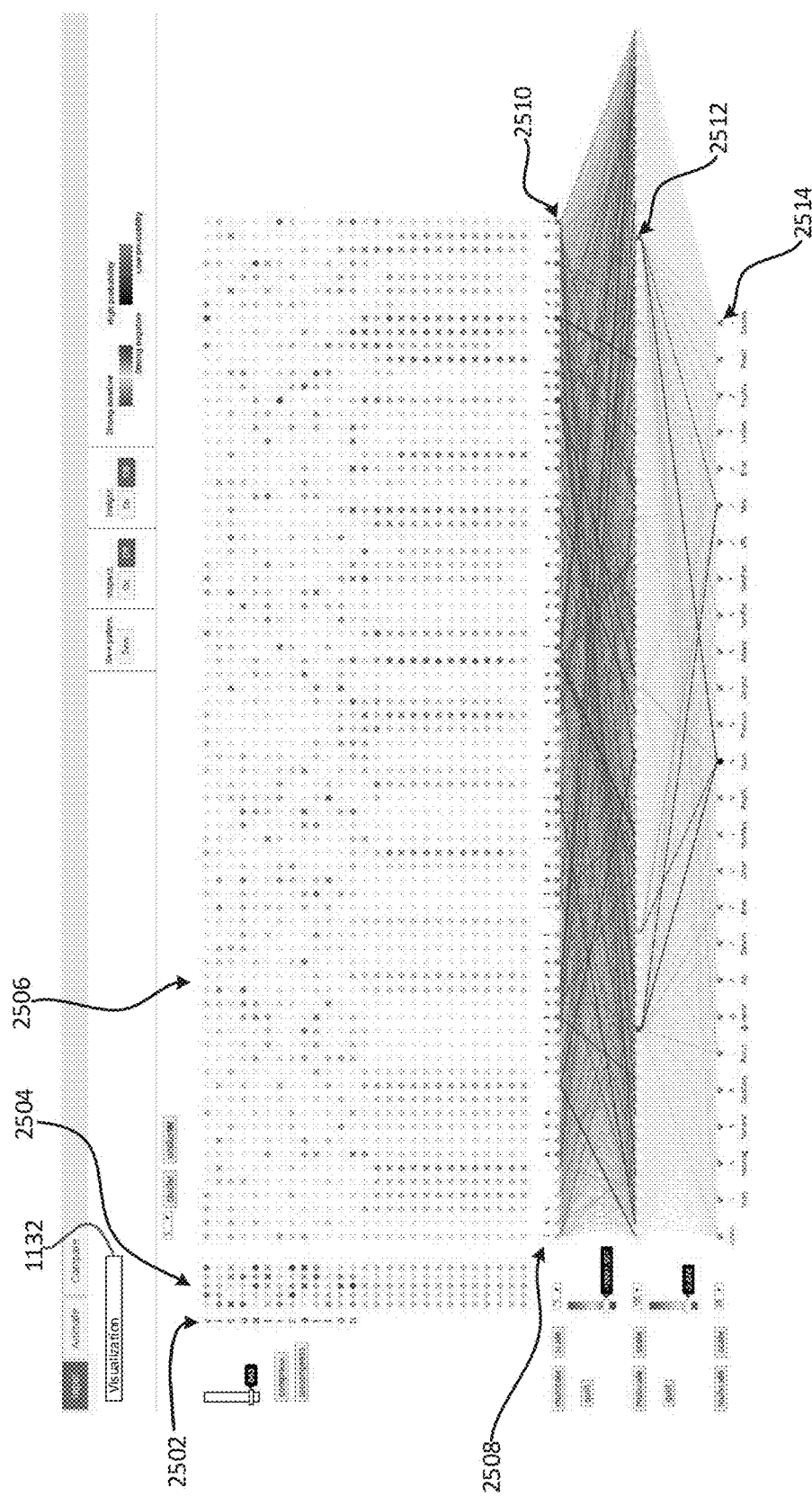
FIG. 25 is an example of a GUI for visualizing a convolutional neural network according to some aspects.

FIG. 25 is an example of a GUI for visualizing a convolutional neural network according to some aspects. The GUI can incorporate some or all of the features discussed above. In the example shown in FIG. 25, the GUI includes a visual representation of an input word 2502 to the convolutional neural network. Adjacent to the visual representation of the input word 2502 is a matrix of cells 2504 that visually represents an input layer of the convolutional neural network. Each cell in the matrix of cells 2504 can visually represent a node in the input layer. And the matrix of cells 2504 can be color coded to represent the embeddings of the input word 2502. The convolutional neural network can learn the embeddings during a training.

Adjacent to the matrix of cells 2504 can be another matrix of cells 2506 that visually represents a convolutional layer of the convolutional neural network. Each column in the matrix of cells 2506 can indicate activation values (also known as "feature-map values") in a feature map corresponding to a particular filter (implemented by the convolutional layer). Each cell can correspond to a node in the convolutional layer. The cell can be color coded to represent an activation value in the feature map corresponding to the node. In some examples, the activation value for a node can be determined by applying a rectified linear unit to the sum of the node's convolution matrix entries plus a bias associated with the node.

The GUI can also include a node-link diagram 2508. The node-link diagram 2508 can visually represent a pooling layer (e.g., in 2510 of the convolutional neural network, a hidden layer 2512 of the convolutional neural network, an output layer 2514 of the convolutional neural network, or any combination of these. An example of the pooling layer 2510 can be a maxpooling layer that determines the maximum activation value in each column in the matrix of cells 2506. The pooling layer 2510, hidden layer 2512, and output layer 2514 may collectively form a fully-connected region of the convolutional neural network. In some examples, an activation value for connection that is visually represented in the node-link diagram 2508 can be the product of its source node's weight and the connection's weight. An activation value for a node in the hidden layer 2512 can be the sum of all incoming connection activations, passed through a rectified linear unit. An activation value for a node in the output layer 2514 can be the sum of all incoming connection activations, normalized to represent the probability of the given output. The node-link diagram 2508 can be color coded or have any of the other features as discussed above. For example, each node in the node-link diagram 2508 can be color coded to express its activation value.

A user can interact with the GUI to obtain additional information related to the convolutional neural network. For example, referring to FIG. 26, a user may select a cell in the matrix of cells 2506 and the GUI can responsively display a tooltip 2602 that can include (i) a size of the filter related to the cell, (ii) a number of the filter related to the cell, (iii) a position in the input value to which the cell relates, (iv) a bias value; (v) a pre-activation value; (vi) a post-activation value; or (vii) any combination of these. Additionally or alternatively, a user can select a cell and the GUI can responsively display an insights dialog-box, which can be similar to insights dialog-box 1604. The insights dialog-box can display the input characters and corresponding embedding weights that most strongly activate a target node. For example, if a user selects a node in the hidden layer 2512, the GUI can display an insights dialog-box indicating which input characters and embedding weights most strongly activate that node. In some examples, the input characters and embedding weights that most strongly activate a node in the hidden layer 2512 can be determined by first assigning an input character to each node in the pooling layer 2510. This can be achieved by, for each node in the pooling layer 2510, (i) determining the most highly activated node in the column of cells (in the matrix of cells 2506) above the node, and (b) assigning, to the node in the pooling layer 2510, the input character that is centered over the filter for the most highly activated node. After each node in the pooling layer 2510 is assigned an input character, if the user selects a node in the hidden layer 2512 or the output layer 2514, the GUI can identify highly activated connections between the selected node and nodes in the pooling layer 2510. The GUI can then display an insights dialog-box that indicates the input characters associated with the nodes in the pooling layer 2510.

The user may also be able to hover (e.g., a mouse) over the cell and the GUI can responsively display additional matrices 2604. One matrix (e.g., the top matrix) of the additional matrices 2604 can visually represent the weights of the filter. Another matrix (e.g., the bottom matrix) of the additional matrices 2604 can visually represent the convolution matrix of filter weights multiplied by the embedded weights for the current node. In some examples, the user can select a button 2606 to display a quilt graph 2608 that visually represents the edges between two layers in the node-link diagram 2508.

In some examples, the convolutional neural network can be relatively small. For example, the convolutional neural network can include 75 filters, one maxpooling layer, and two fully connected layers (e.g., with 100 nodes each). In other examples, the convolutional neural network can be relatively large. Some examples of the present disclosure can provide tools to accommodate convolutional neural networks of varying sizes.

Figure 27:
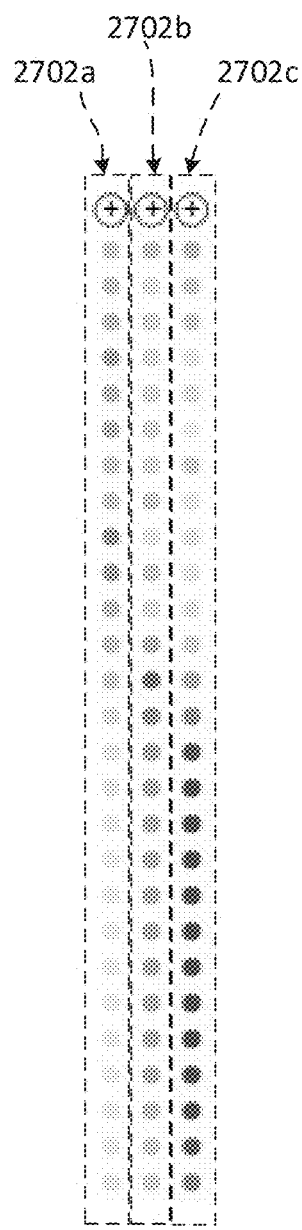
FIG. 27 is an example of columns in a matrix of cells in the GUI of FIG. 25 being grouped together into three clusters according to some aspects.
Figure 28:
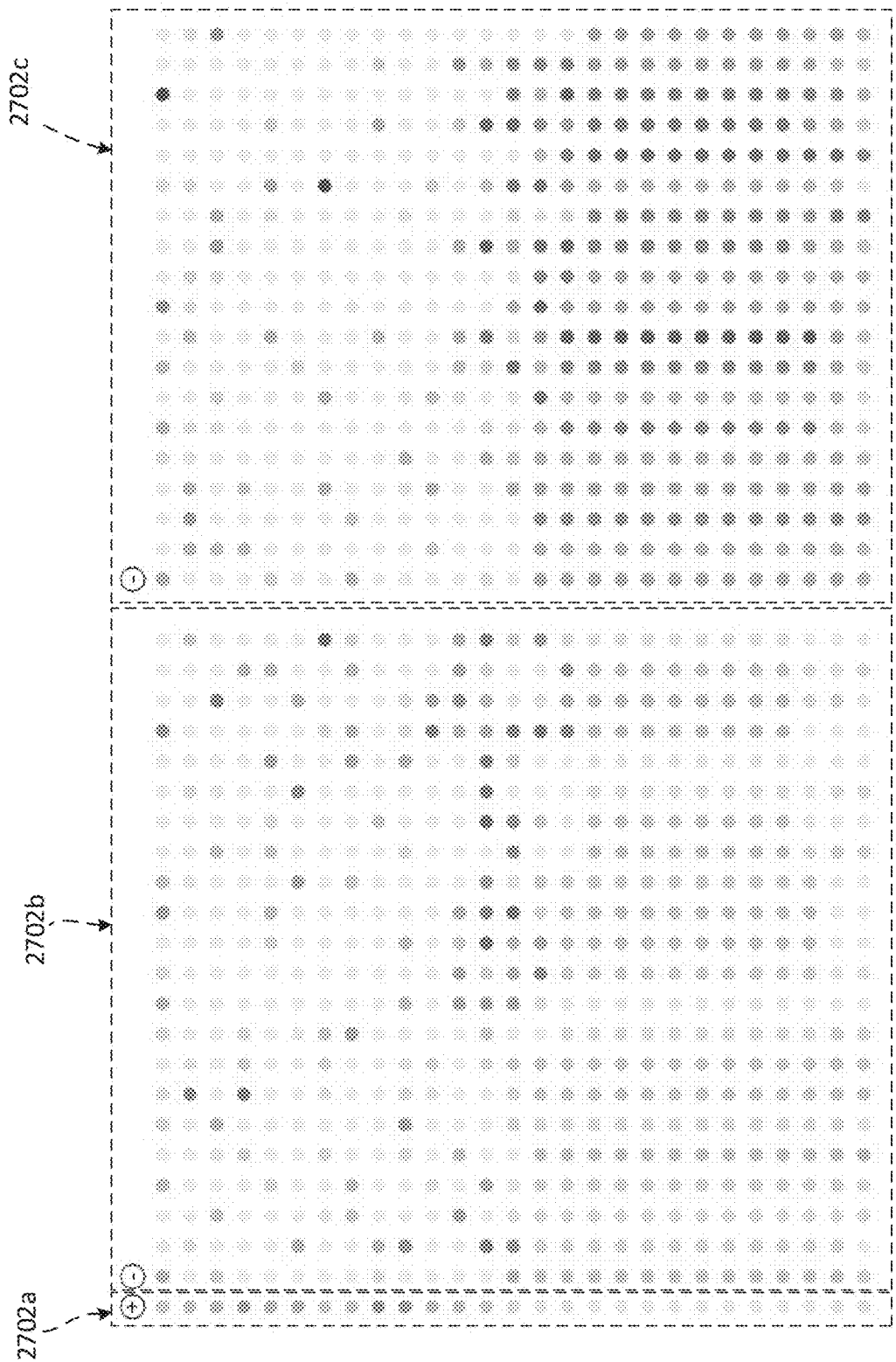
FIG. 28 is an example of an expanded version of two of the clusters in FIG. 27 according to some aspects.

For example, the GUI can enable columns in the matrix of cells 2506 to be clustered together, which can be referred to as horizontal clustering. In horizontal cluster, a user may provide a number of groups into which the columns in the matrix of cells 2506 are to be clustered. The GUI can then use k-means clustering or another clustering technique to group the columns in the matrix of cells 2506 into clusters. This can result in similar feature maps being grouped together. After grouping several columns into a cluster, the GUI can visually represent the cluster as a single column. FIG. 27 shows an example of columns in the matrix of cells 2506 grouped into three clusters 2702a-c. Each column 2702a-c visually represents a cluster formed from multiple columns in the matrix of cells 2506. The cells in a column, such as column 2702a, can be color coded to indicate the centroids of the cluster. The clustered view can provide a summary of the feature maps and reduce the size of the visualization in the horizontal direction. A user can select an expand icon for a cluster (e.g., the plus icon above a column) to visually expand the cluster, which can enable the user to see which feature maps belong to the cluster. An example of two expanded clusters is shown in FIG. 28. The user may select a compress icon for a cluster (e.g., the minus icon above clusters 2702b-c) to visually re-compress the cluster back into a single column. In some examples, a user can select an uncluster button 2610 and the GUI can responsively return to the original view, in which columns in the matrix of cells 2506 are not grouped into clusters.

Figure 29:
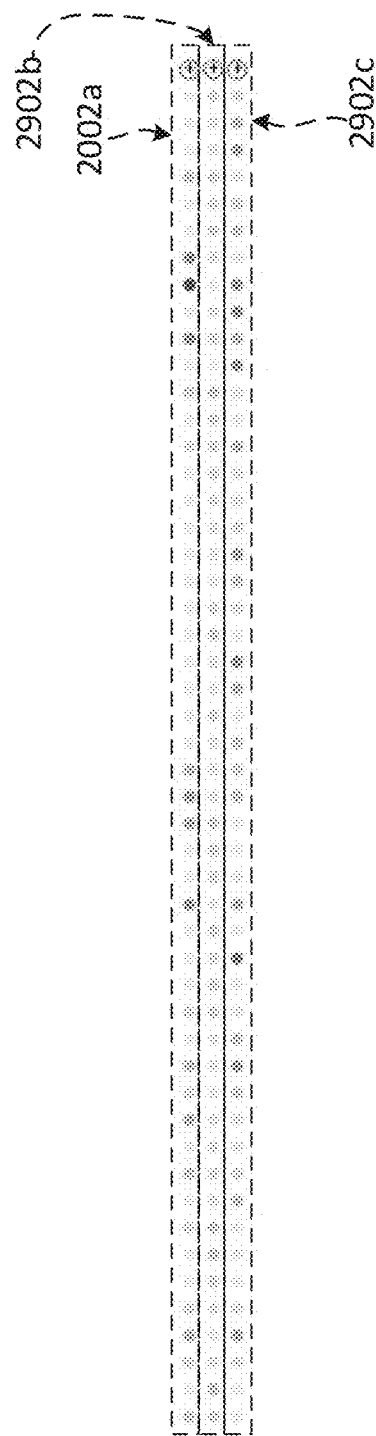
FIG. 29 is an example of rows in a matrix of cells merged into three groups according to some aspects.
Figure 30:
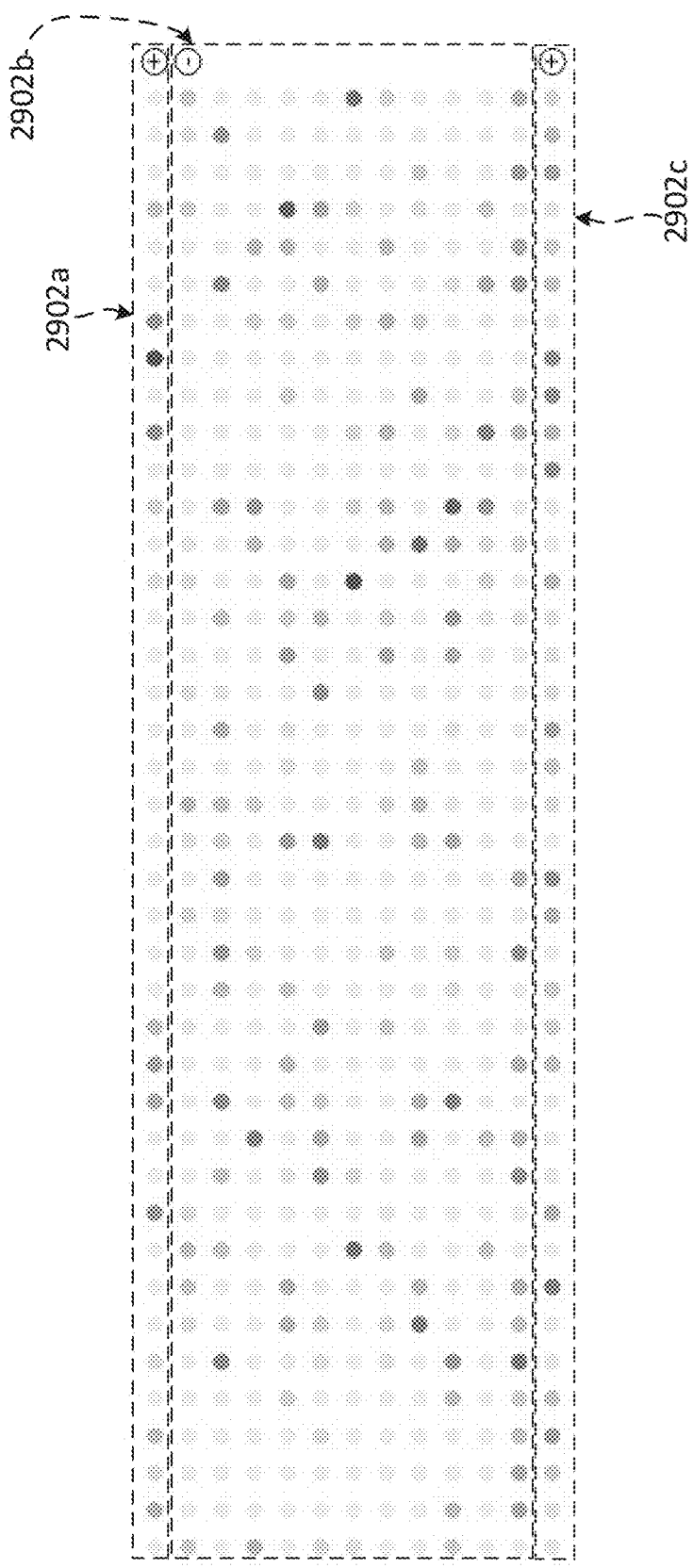
FIG. 30 is an example of an expanded version of a group of rows in FIG. 29 according to some aspects.

Additionally or alternatively, the GUI can enable adjacent rows in the matrix of cells 2504 to be merged together, which can be referred to as vertical compression. In some examples, the GUI can merge adjacent rows in the matrix of cells 2504, as long as a Euclidian distance between the adjacent rows is below a threshold (e.g., which can be provided by a user). FIG. 29 shows an example of rows in the matrix of cells 2506 merged into three groups 2902a-c. Each row 2902a-c visually represents a group formed from multiple rows in the matrix of cells 2506. The cells in a row, such as row 2902a, can be color coded to indicate the average values of the merged cells. In some examples, a user can input a compression threshold that controls the number of rows that are merged together. In some examples, the compressed view can provide reduce the size of the visualization in the vertical direction. A user can select an expand icon for a group of rows (e.g., the plus icon adjacent to a row) to visually expand the group of rows, which can enable the user to see the rows belong to the group. An example of an expanded group is shown in FIG. 30. The user may select a compress icon for a group of rows (e.g., the minus icon adjacent to row 2902b) to visually re-compress the group of rows back into a single row. In some examples, a user can select an uncompress button 2612 and the GUI can responsively return to the original view, in which rows in the matrix of cells 2506 are not merged into groups.

Horizontal clustering and vertical compression can be used together to summarize in both the horizontal and vertical directions. For example, horizontal clustering can be applied to the matrix of cells 2506, and then vertical compression can be applied to the matrix of cells 2506. Or vice-versa. In examples that include more than one convolutional layer (e.g., more than one matrix of cells visually representing more than one convolutional layer), horizontal clustering and vertical compression can be independently applied to each convolutional layer.

Figure 31:
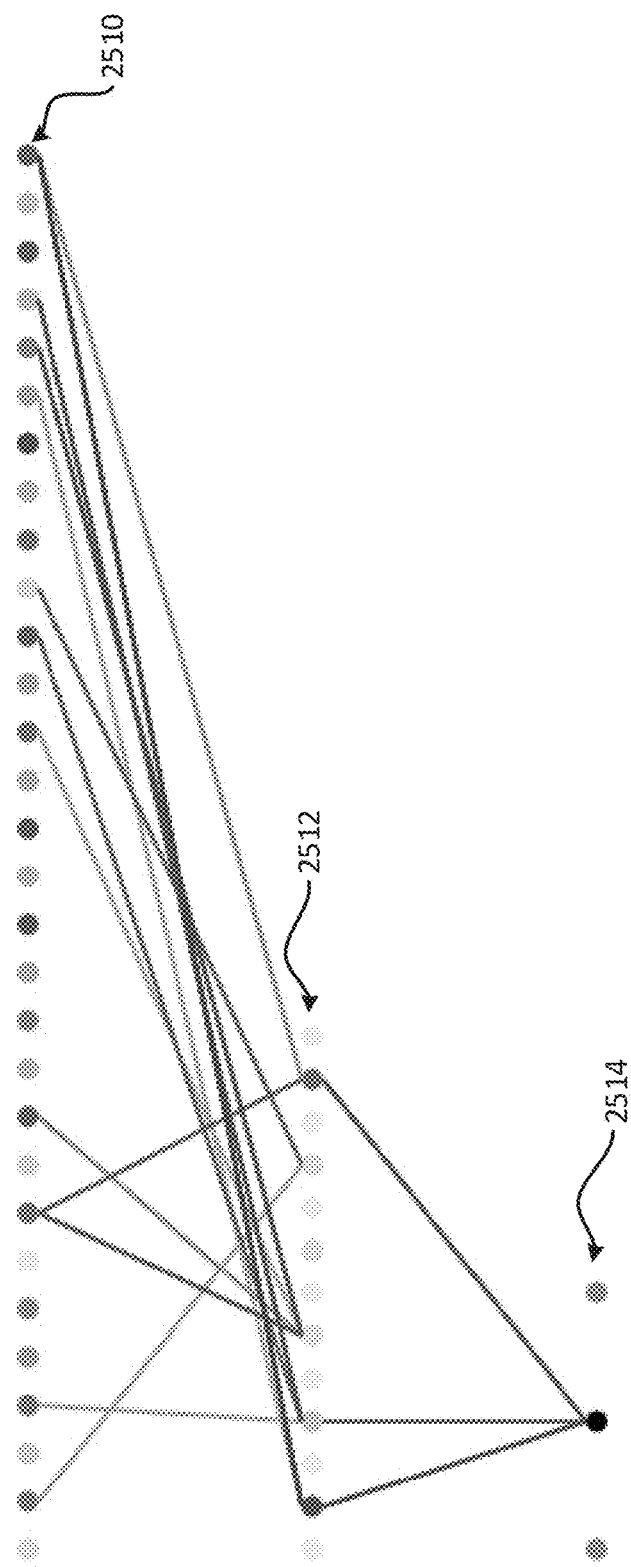
FIG. 31 is an example of merged or compressed nodes in a node-link diagram according to some aspects.

Additionally or alternatively, the GUI can provide for node summarization. With node summarization, adjacent nodes in a layer of the node-link diagram 2508 can be merged together into a single node, which can be referred to as a summarized node. In some examples, adjacent nodes may be merged together if the adjacent nodes have activation values that are all below or all above the average activation value of all the nodes in the layer. In other examples, the adjacent node can be merged together if the adjacent nodes have other similar characteristics (e.g., that are within a certain value-range from one another). A summarized node can be color coded to indicate the average aggregation of the original nodes' activation values. Incoming and outgoing connections for a summarized node can be color coded to indicate the average aggregations of the original nodes' connections. An example of node summarization for the pooling layer 2510, hidden layer 2512, and output layer 2514 of the convolutional neural network is shown in FIG. 31.

Figure 32:
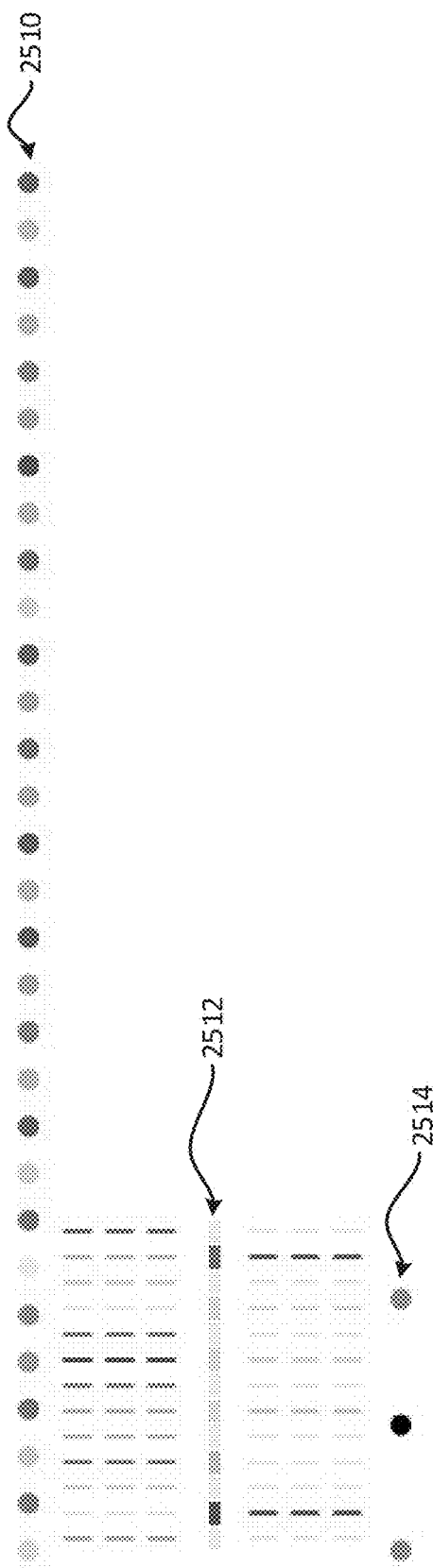
FIG. 32 is an example of activated and deactivated layers in a node-link diagram according to some aspects.

The GUI can also provide for layer summarization. With layer summarization, a user can activate or deactivate layers or groups of layers in the node-link diagram. Activated layers can retain full detail (e.g., all nodes will be visualized, and connections between adjacent layers can be shown). Deactivated layers can be reduced to a single line. The single line can be divided into n sub-blocks, with one sub-block representing one node. Each sub-block can be colored based on the activation value of the node it represents. The order of the sub-blocks may or may not be sorted based on the activation values of the nodes they represent. In some examples, all of the connections going into a node in a deactivated layer can be represented as a single line. The single line can be color coded, for example, to represent an average value of all of those incoming connections. Similarly, all of the connections going out from a node in a deactivated layer can be represented as a single line, which can be color coded (e.g., to represent an average value of all of those outgoing connections). An example of layer summarization for the pooling layer 2510, hidden layer 2512, and output layer 2514 of the convolutional neural network is shown in FIG. 32.

In some examples, the type of a deep neural network to be visualized can be detected and the GUI can be adjusted accordingly. For example, the GUI can detect that a deep neural network to be visualized is a feed forward neural network and include the quilt graph 1112 of FIG. 11. As another example, the GUI can detect that a deep neural network to be visualized is a convolutional neural network and include the matrix of cells 2506 of FIG. 25.

Figure 33:
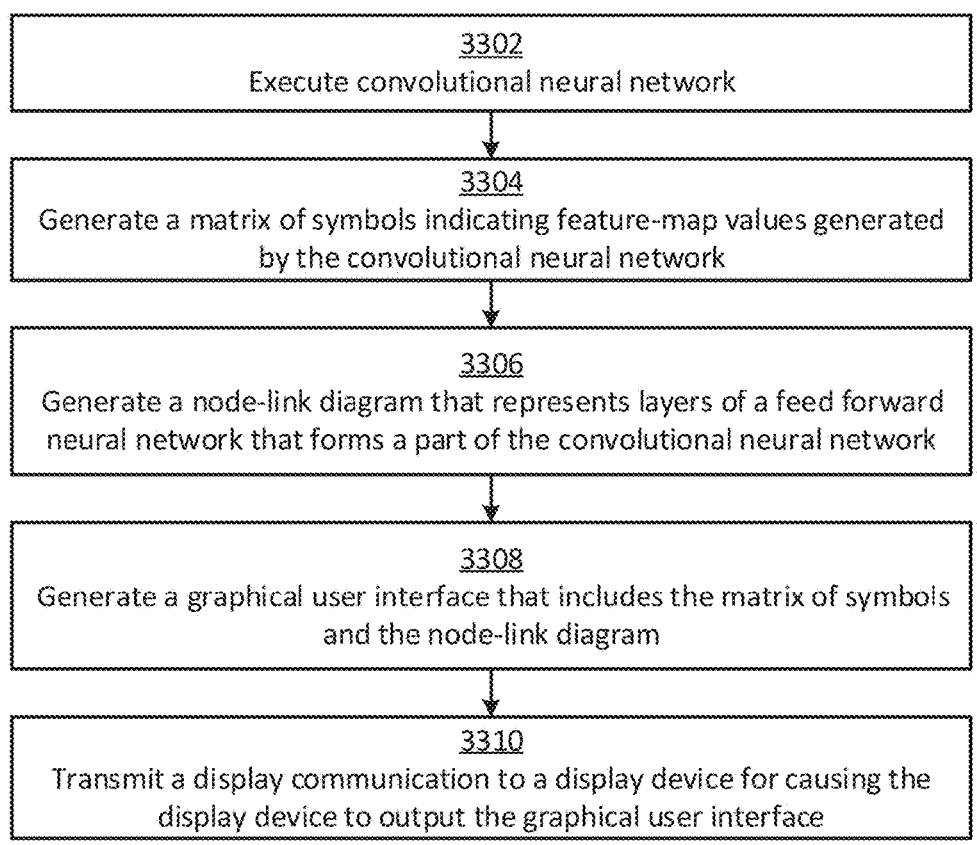
FIG. 33 is a flow chart of an example of a process for visualizing a convolutional neural network according to some aspects.

FIG. 33 is a flow chart of an example of a process for visualizing a deep neural network according to some aspects. Some examples can include more steps than, fewer steps than, different steps than, or a different order of the steps shown in FIG. 33. Some examples can be implemented using any of the systems and processes described with respect to FIGS. 1-10.

In block 3302, a processing device executes a convolutional neural network. In some examples, the processing device may train the convolutional neural network prior to executing the convolutional neural network.

Figure 34:
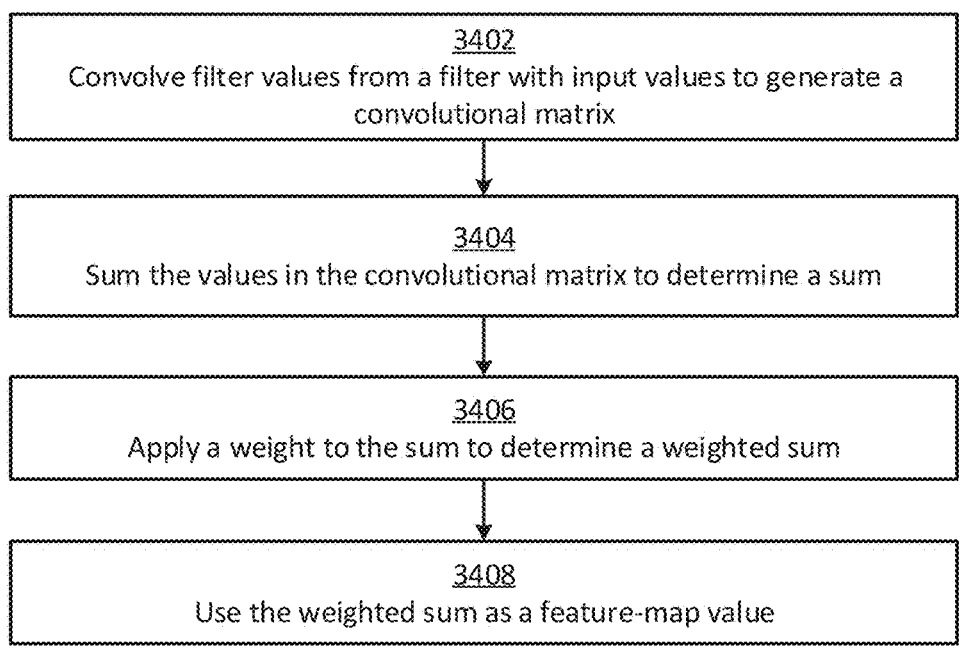
FIG. 34 is a flow chart of an example of a process for determining a feature-map value according to some aspects.

The convolutional neural network can include one or more filters for identifying features in an input. The filters can be convolved with the input to create feature maps having feature-map values. An example of a process for creating a feature-map value is shown in FIG. 34. In block 3402 of FIG. 34, the convolutional neural network can convolve filter values from a filter with input values to generate a convolutional matrix. The processing device can then sum the values in the convolutional matrix to determine a sum, as shown in block 3404. Thereafter, the convolutional neural network can apply a weight to the sum to determine a weighted sum, as shown in block 3406. The convolutional neural network may then use the weighted sum as a feature-map value, as shown in block 3408.

Returning to FIG. 33, in block 3304, the processing device generates a matrix of symbols (e.g., matrix of cells 2506 in FIG. 25) indicating feature-map values generated by the convolutional neural network. The symbols can form cells of the matrix and have any suitable shape, such as circles, squares, rectangles, triangles, or any combination of these. The symbols can be color coded to indicate the feature-map values.

In block 3306, the processing device generates a node-link diagram (e.g., node-link diagram 2508 of FIG. 25) that represents layers of a feed forward neural network (or a fully connected neural network), which can form part of the convolutional neural network. For example, the node-link diagram can visually represent a fully connected neural network that is positioned within the convolutional neural network after one or more convolutional layers in the convolutional neural network.

In block 3308, the processing device generates a graphical user interface that includes the matrix of symbols and the node-link diagram. The processing device can generate the graphical user interface at least in part by arranging graphical elements to form the graphical user interface. For example, the processing device can generate the graphical user interface by arranging the matrix of symbols above, below, or adjacent to the node-link diagram.

In block 3310, the processing device transmits a display communication to a display device (e.g., a television, computer monitor, touch-screen display, liquid crystal display, or any combination of these). The display communication can be an electrical signal configured to cause the display device to output the graphical user interface.

Figure 35:
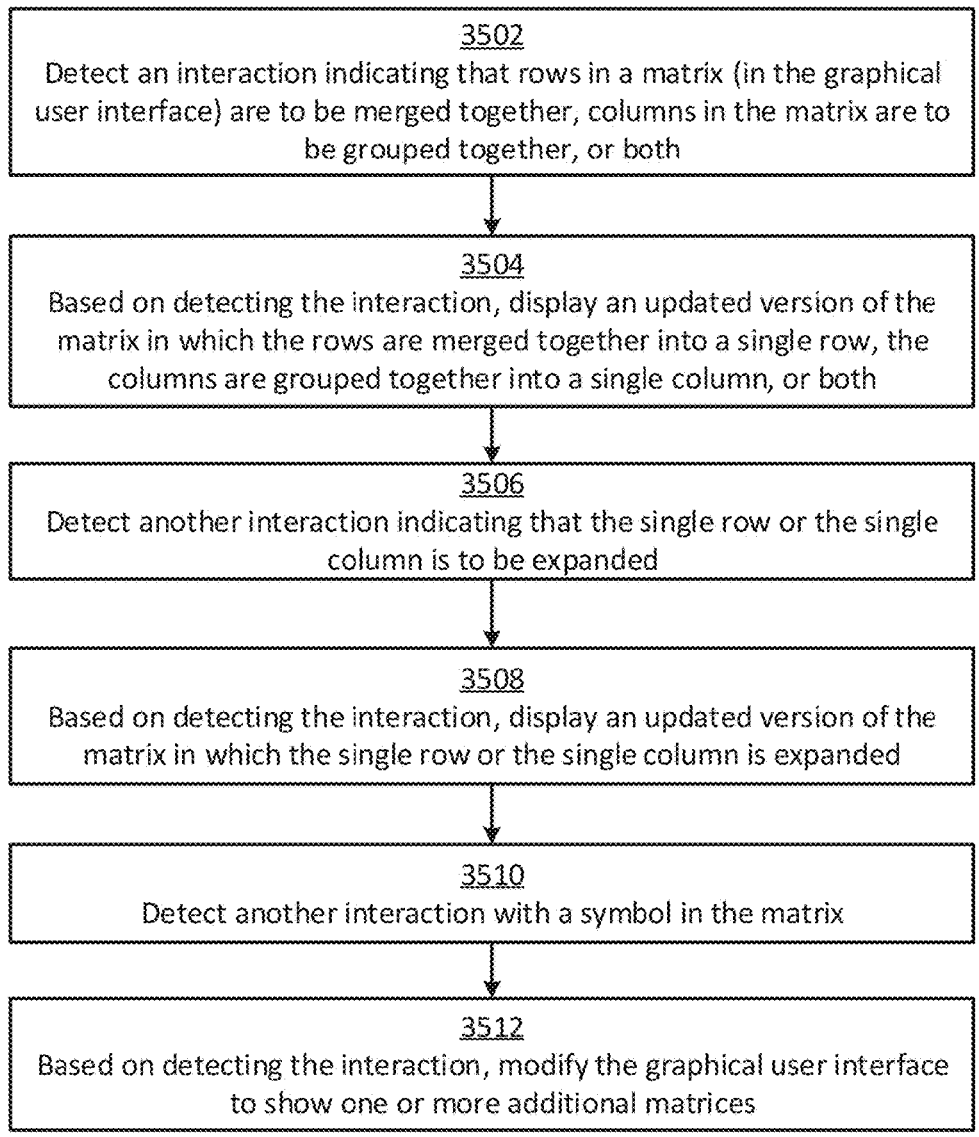
FIG. 35 is a flow chart of an example of a process for interacting with a visualization of a deep neural network according to some aspects.

FIG. 35 is a flow chart of an example of a process for interacting with a visualization of a deep neural network according to some aspects. Some examples can include more steps than, fewer steps than, different steps than, or a different order of the steps shown in FIG. 35. Some examples can be implemented using any of the systems and processes described with respect to FIGS. 1-10.

In block 3502, a processing device detects an interaction with the graphical user interface. The interaction can indicate that rows in a matrix (e.g., matrix of cells 2506) within the graphical user interface are to be merged together, columns in the matrix are to be grouped together, or both. Examples of the interaction can include selecting or hovering over a merge button or a grouping button. In some examples, the processing device can detect the interaction based on input signals from a user input device. For example, the processing device can receive the input signals from a mouse, keyboard, touch-screen, joystick, or any combination of these. The input signals can indicate that the rows in the matrix are to be merged together, columns in the matrix are to be grouped together, or both. The processing device can receive the input signals and detect the interaction based on the input signals.

In block 3504, the processing device causes a display device to display an updated version of the matrix in which the rows are merged together into a single row, the columns are grouped together into a single column, or both. The processing device can cause the display device to display the updated version of the matrix based on detecting the interaction in block 3504. An example of merged rows is shown in FIG. 29 and an example of grouped columns is shown in FIG. 27.

In block 3506, the processing device detects another interaction indicating the single row or the single column is to be expanded. Examples of the interaction can include a selecting or hovering over an expansion icon. The processing device can detect the interaction based on input signals from a user input device.

In block 3508, the processing device causes the display device to display an updated version of the matrix in which the single row or the single column is expanded. The processing device can cause the display device to display the updated version of the matrix based on detecting the interaction in block 3506. An example of an expanded row is shown in FIG. 30 and an example of expanded columns is shown in FIG. 28.

In block 3510, the processing device detects another interaction with a symbol in the matrix (e.g., a cell in the matrix of cells 2506). Examples of the interaction can include a selecting or hovering over the symbol. The processing device can detect the interaction based on input signals from a user input device.

Figure 26:
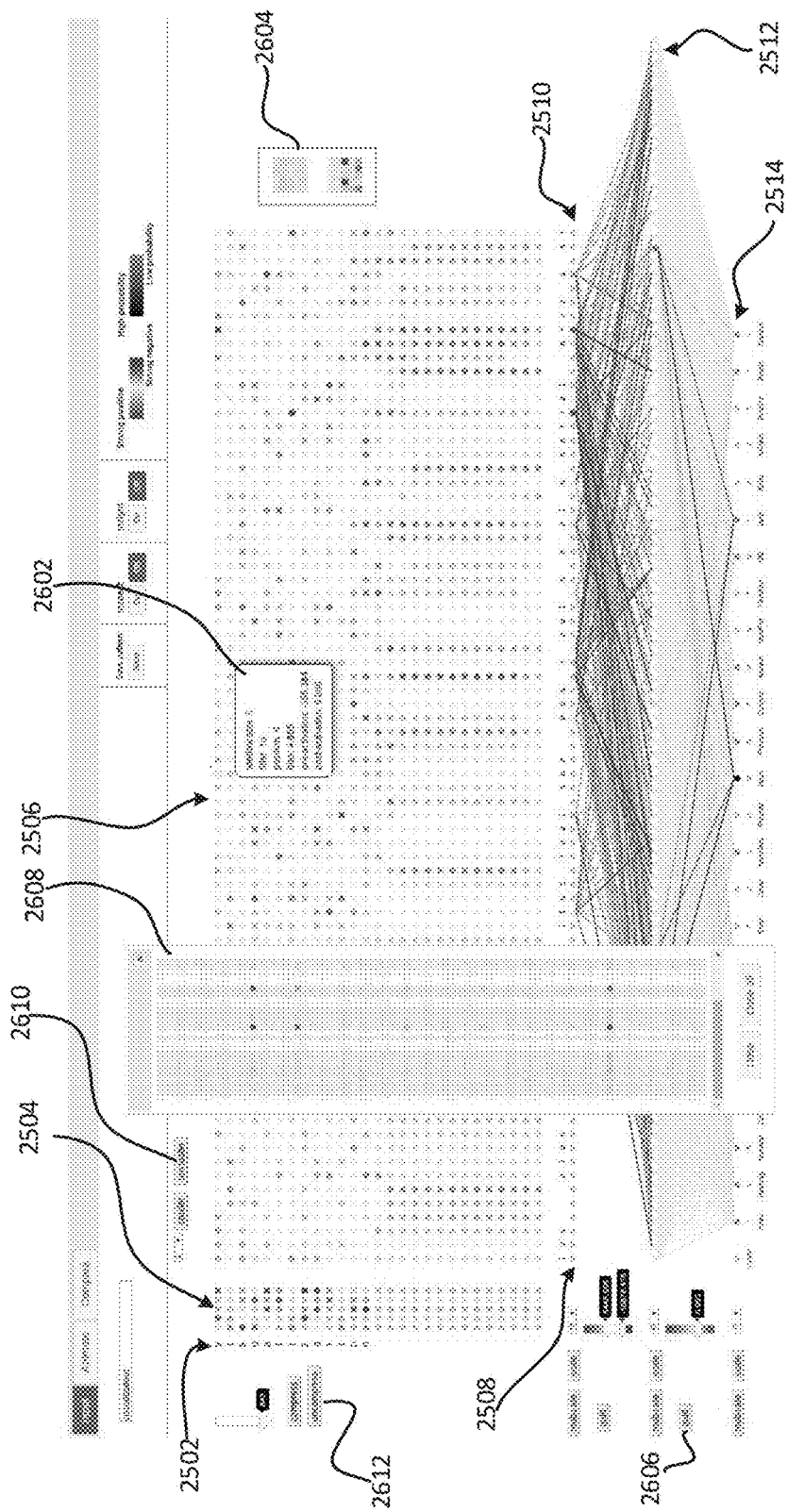
FIG. 26 is an example of the GUI of FIG. 25 after various user interactions according to some aspects.

In block 3512, the processing device modifies the graphical user interface to show one or more additional matrices (e.g., additional matrices 2604 of FIG. 26). The processing device can modify the graphical user interface based on detecting the interaction in block 3510.

Figure 36:
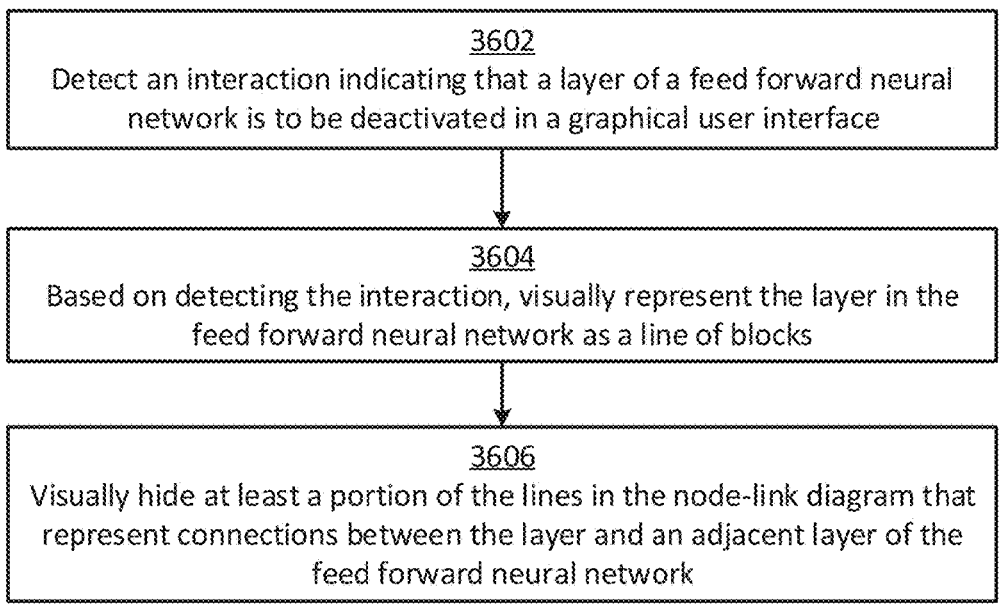
FIG. 36 is a flow chart of another example of a process for interacting with a visualization of a deep neural network according to some aspects.
Figure 11:
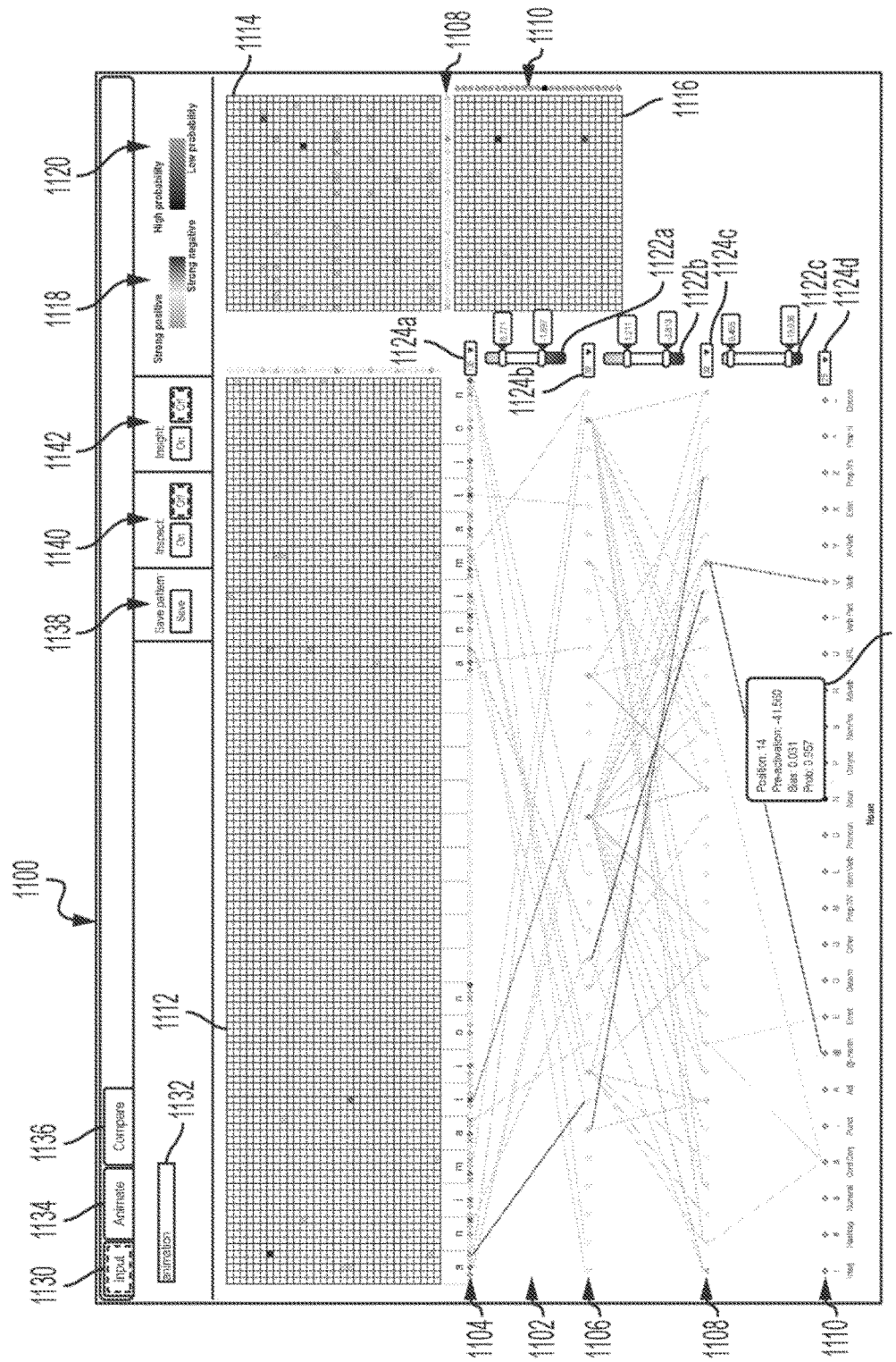
Figure 12A:
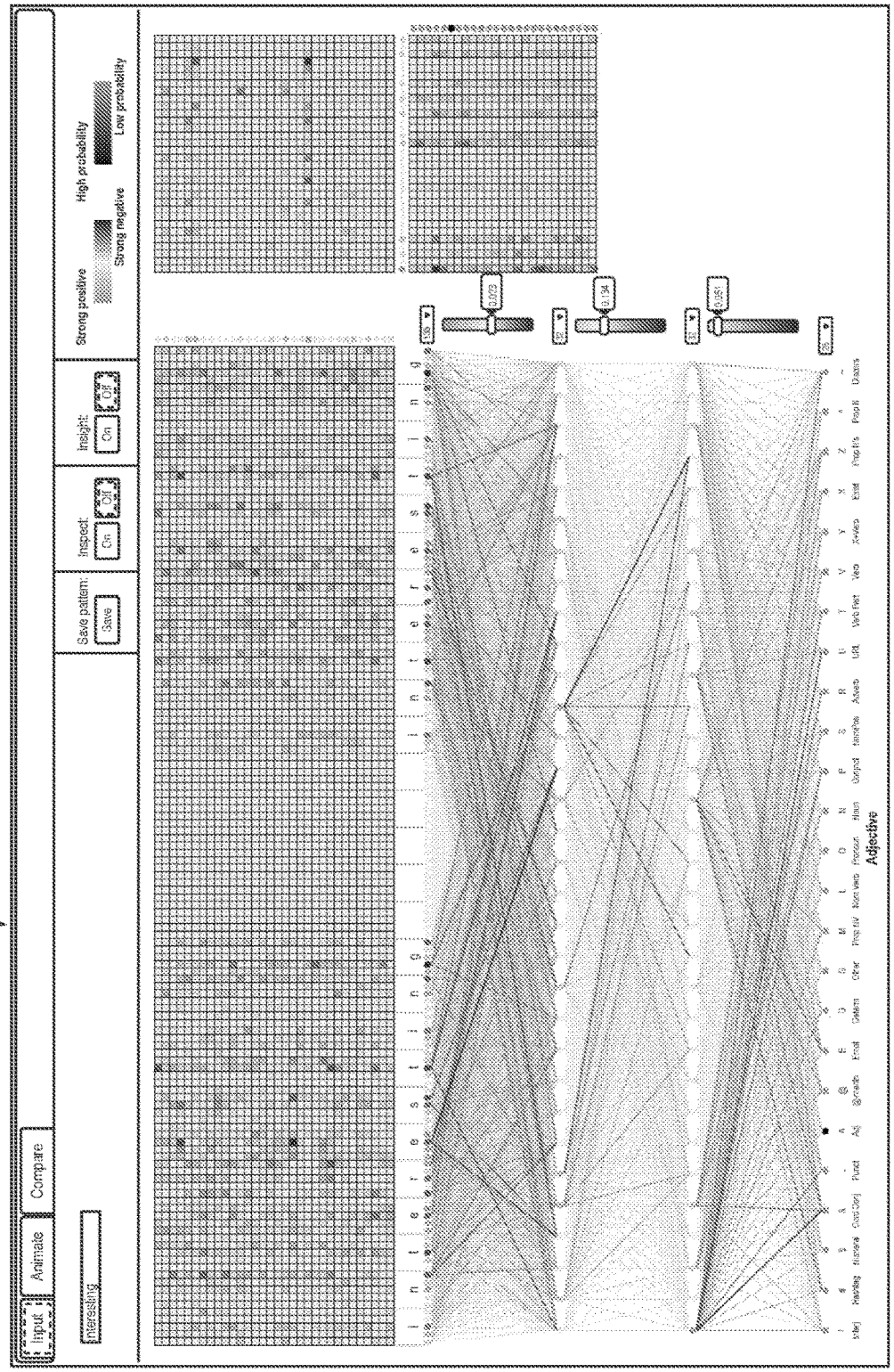
Figure 12B:
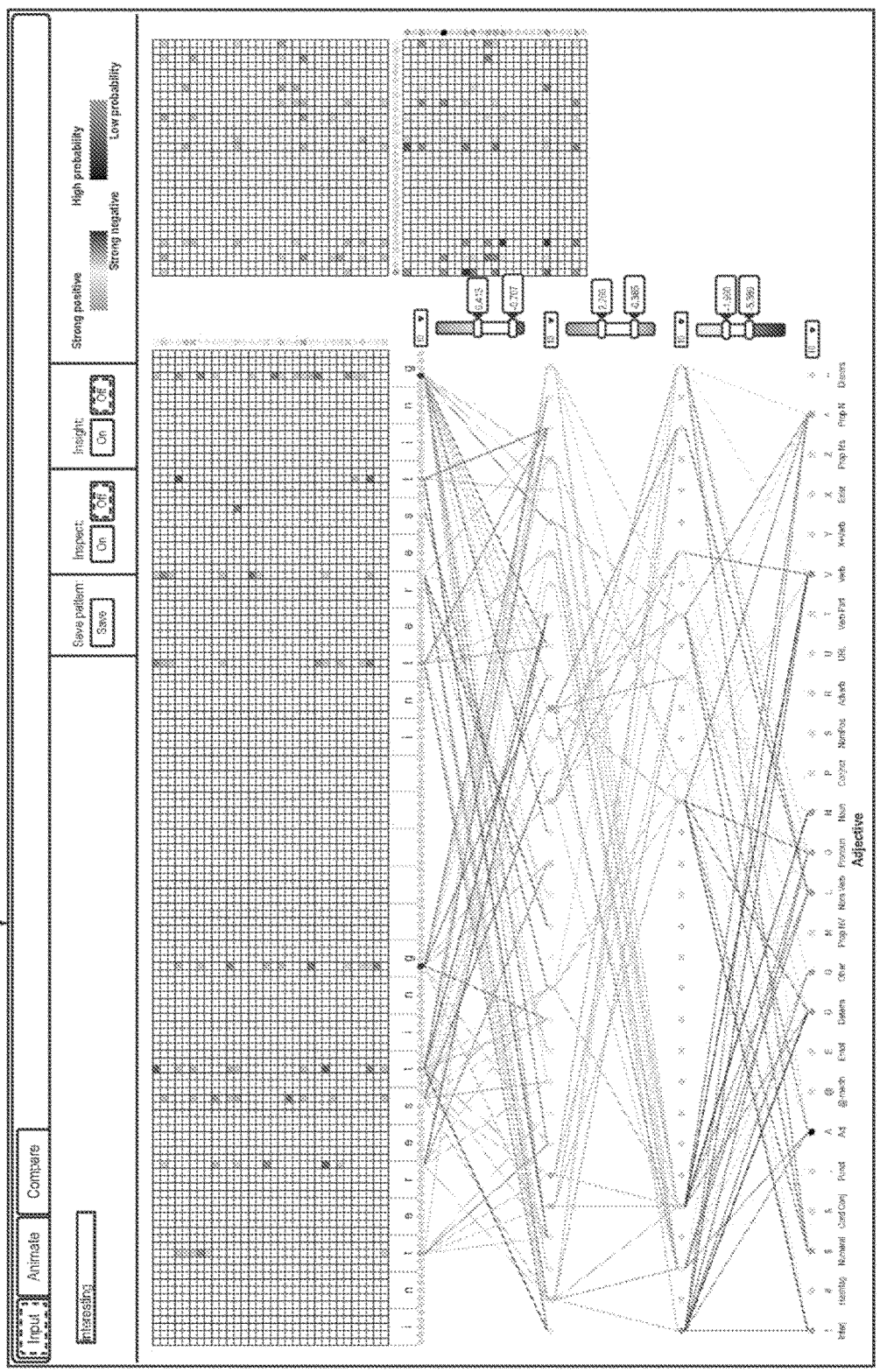
Figure 15:
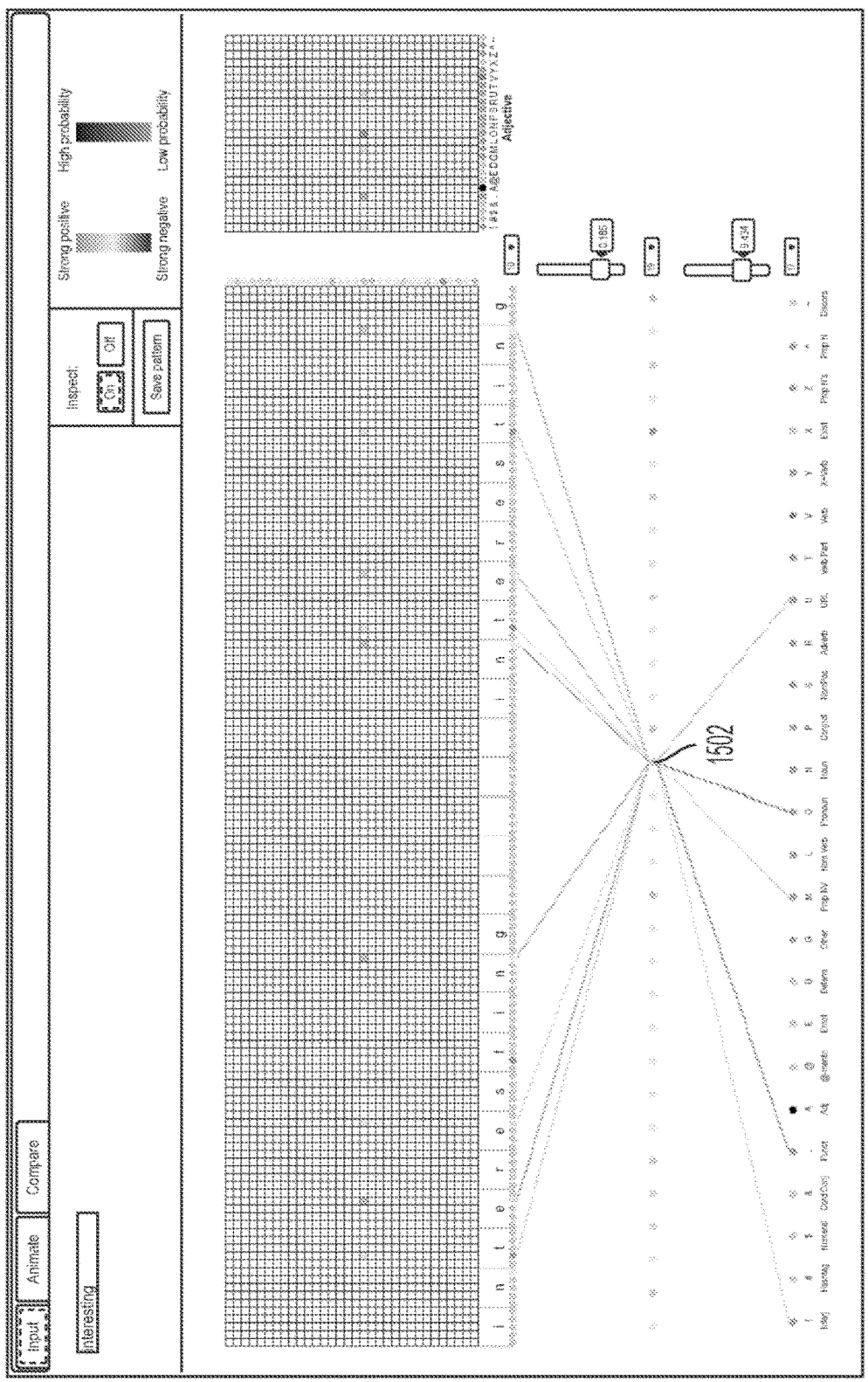
Figure 16:
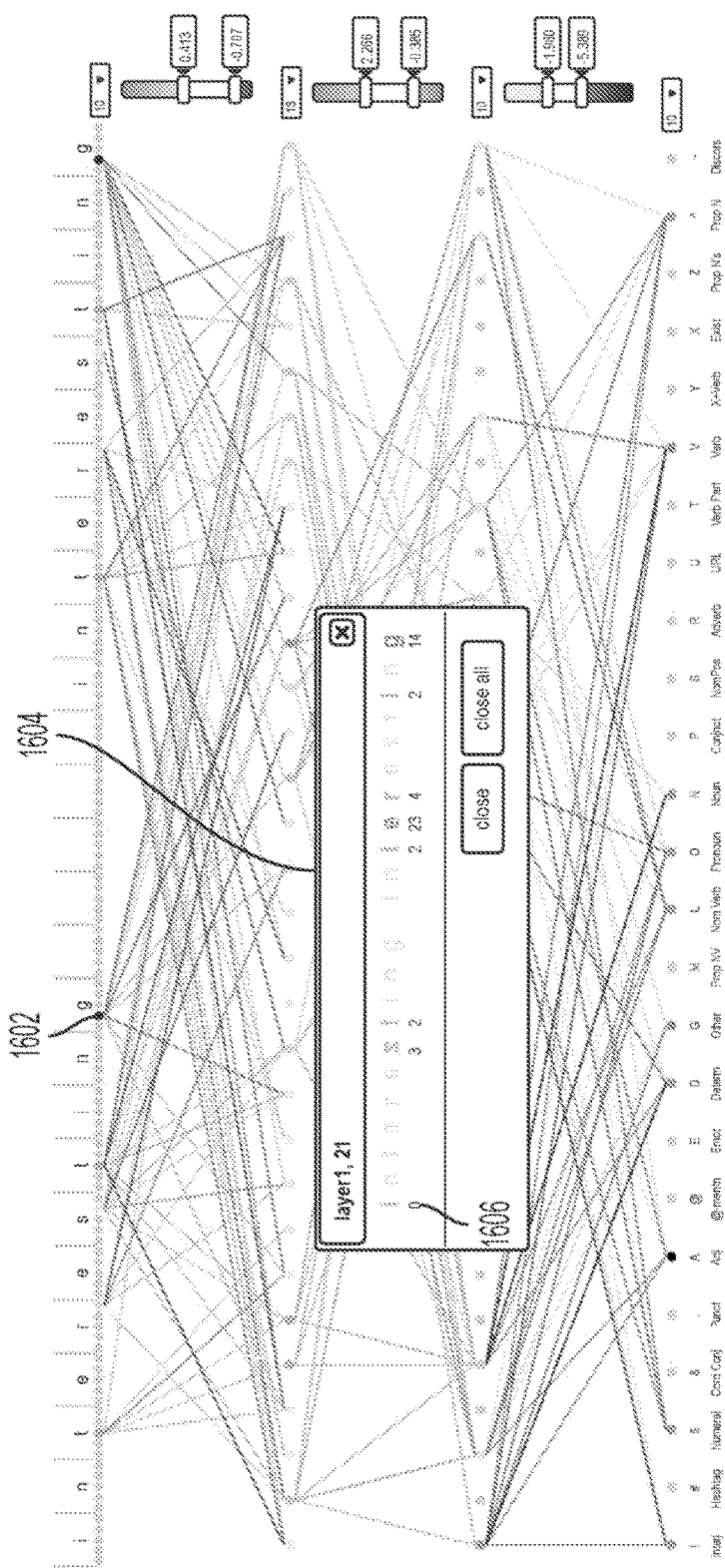
Figure 17:
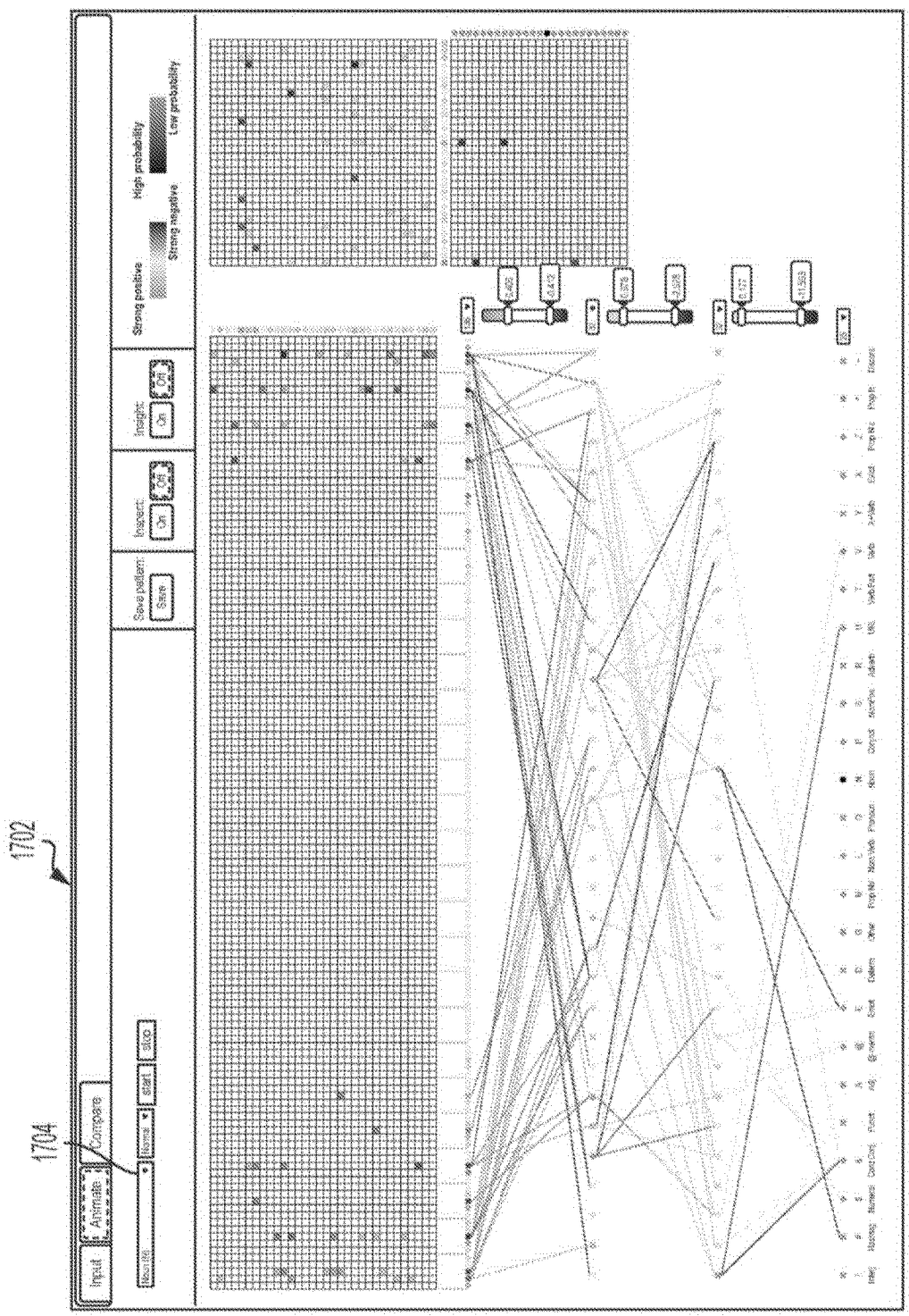
Figure 18A:
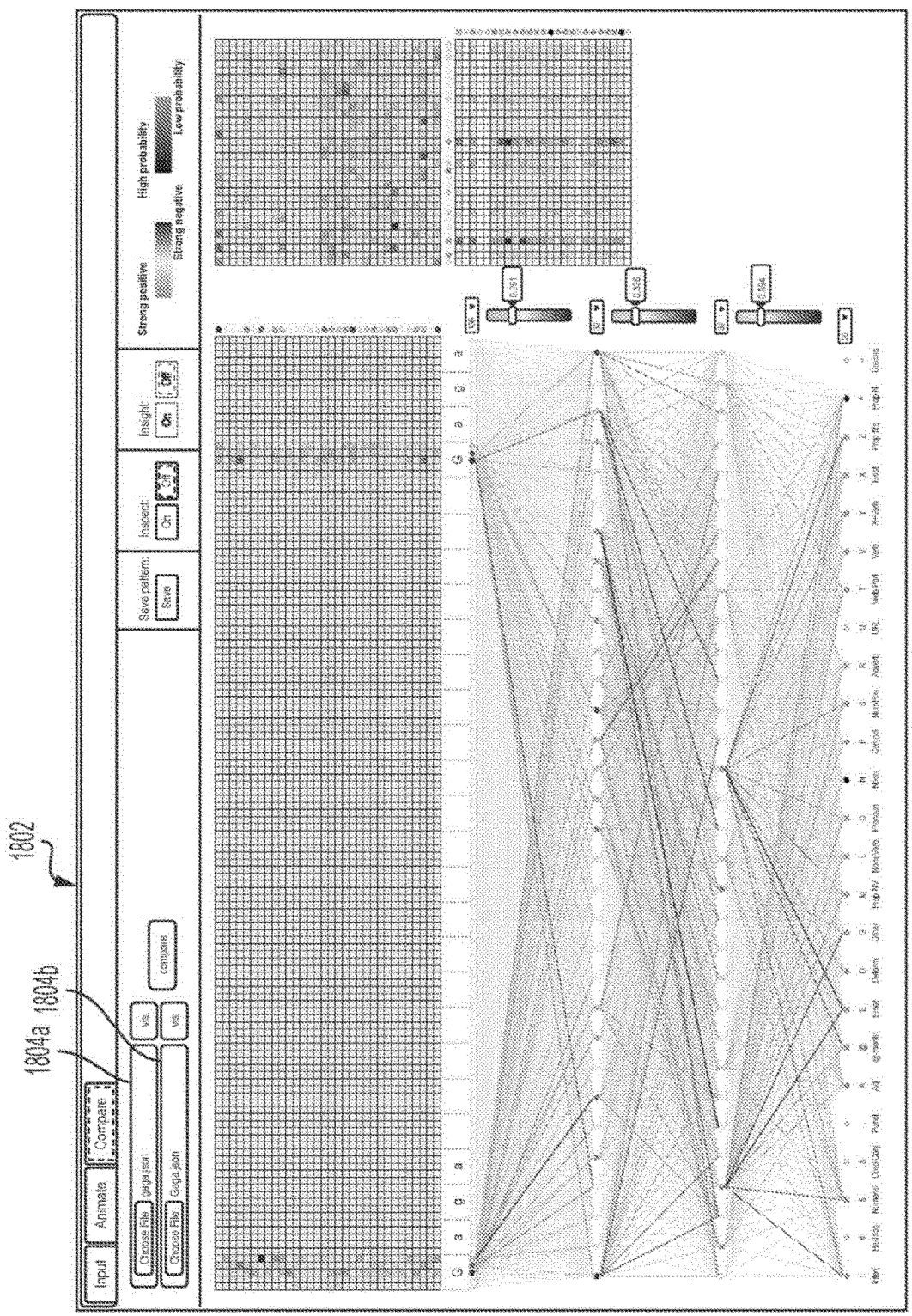
Figure 18B:
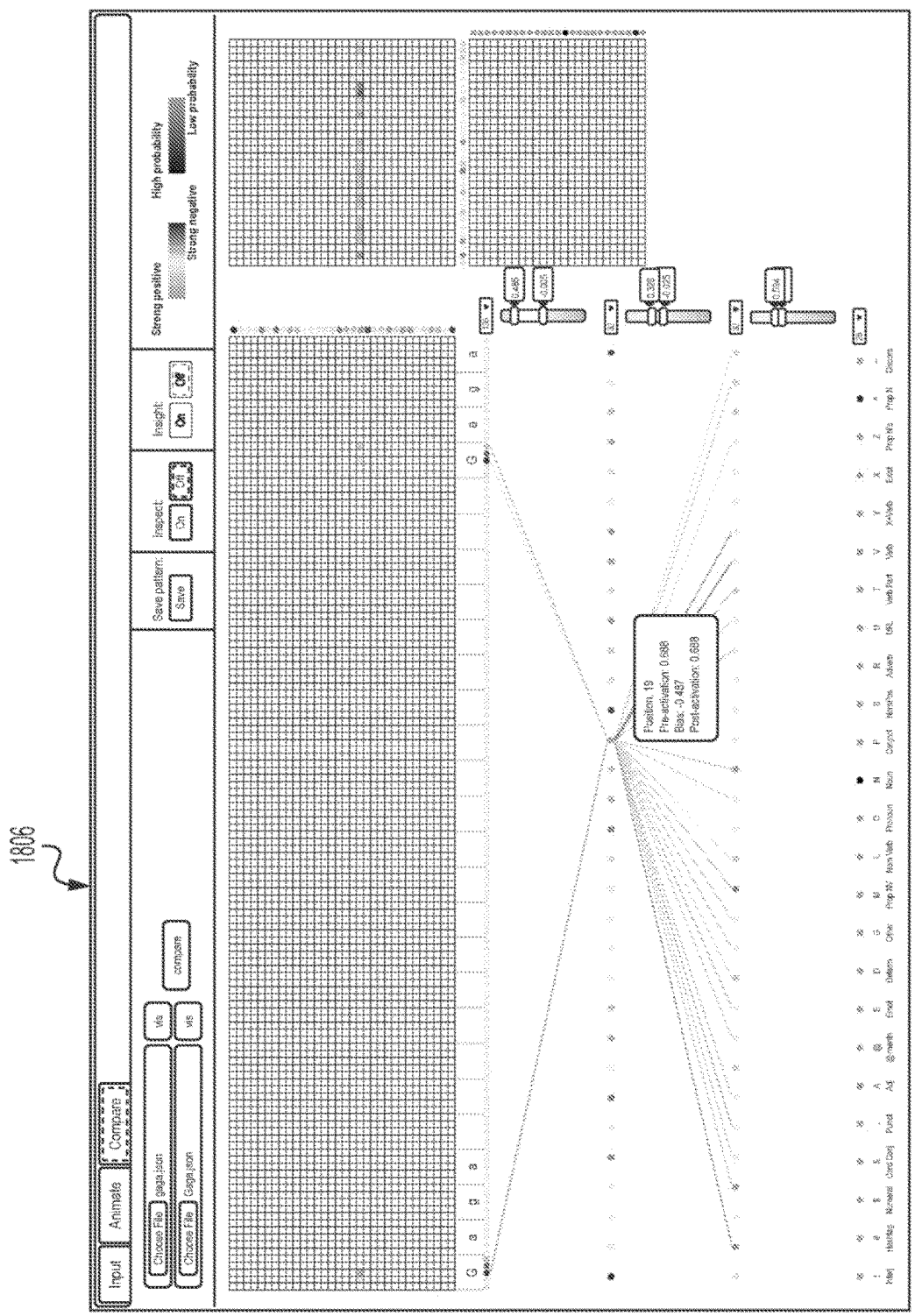
Figure 25:
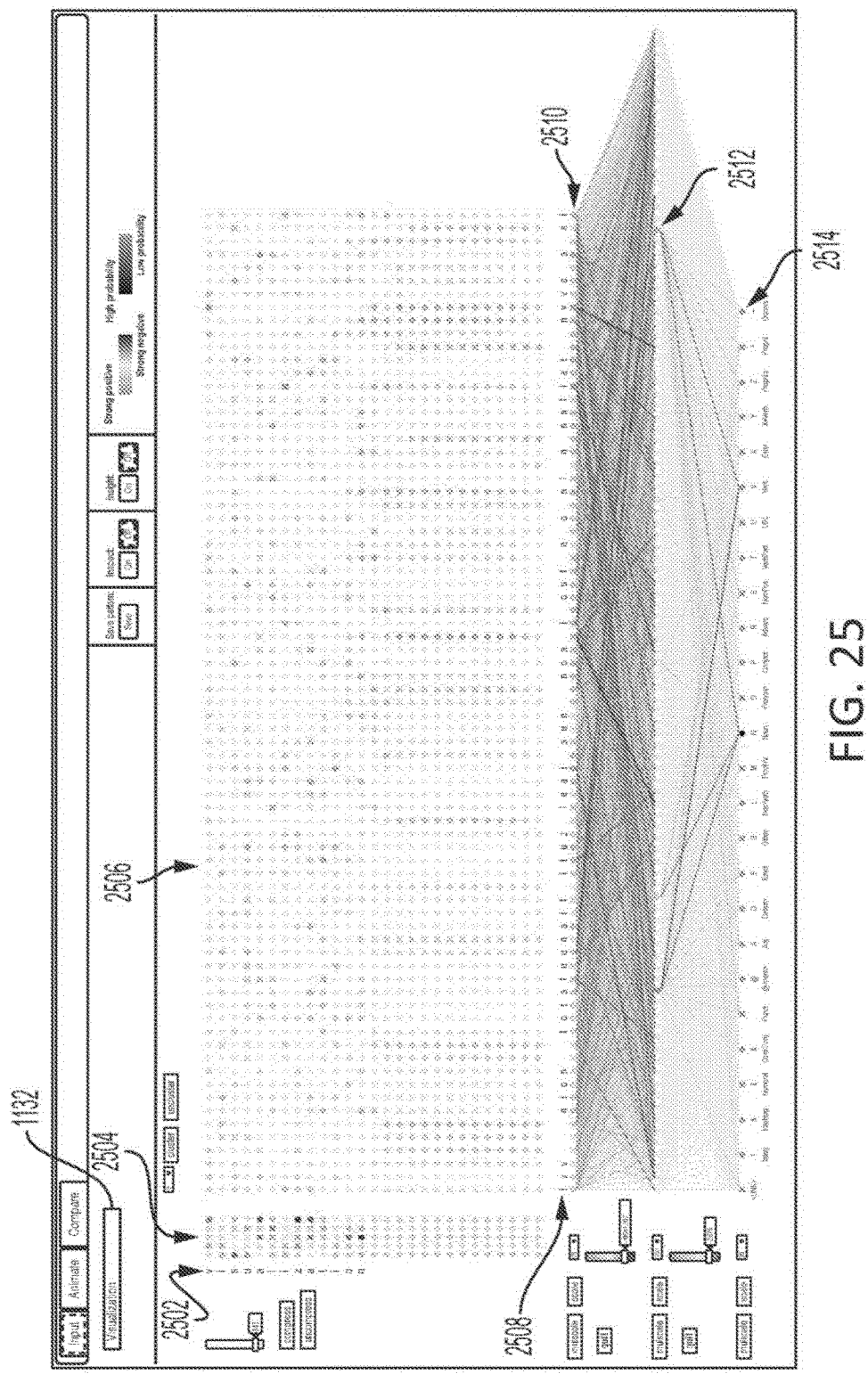
Figure 26:
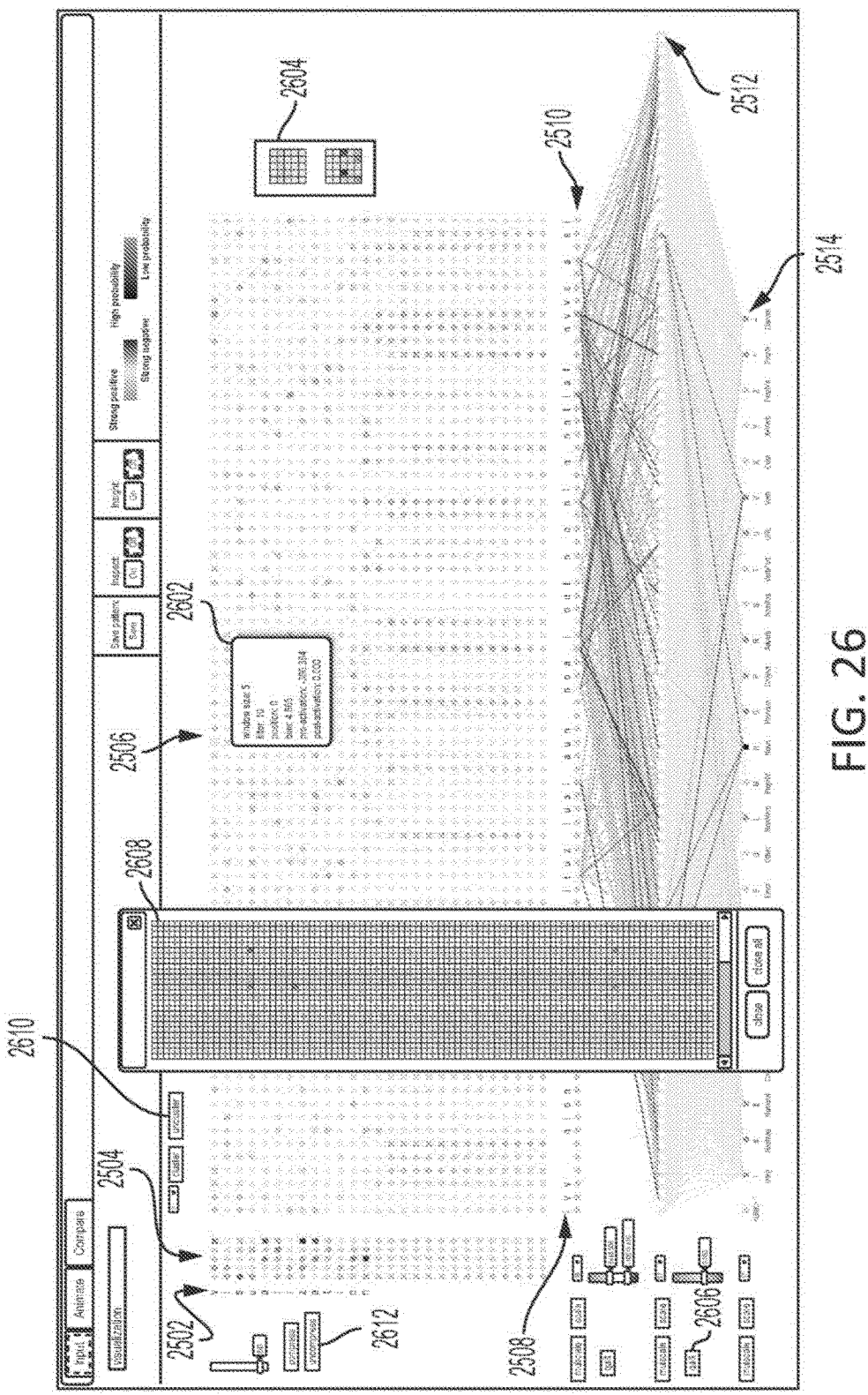

FIG. 36 is a flow chart of another example of a process for interacting with a visualization of a deep neural network according to some aspects. Some examples can include more steps than, fewer steps than, different steps than, or a different order of the steps shown in FIG. 36. Some examples can be implemented using any of the systems and processes described with respect to FIGS. 1-10.

In block 3602, a processing device detects an interaction indicating that a layer of a feed forward neural network (e.g., a fully connected neural network) is to be deactivated in a graphical user interface. Examples of the interaction can include selecting or hovering over a deactivation button in the graphical user interface. Examples of the layer can include an input layer, hidden layer, or output layer of the feed forward neural network.

In block 3604, the processing device causes a display device to visually represent the layer in the feed forward neural network as a line of blocks. An example of this is shown in FIG. 32. The line of blocks can be formed from sub-blocks that are color coded to indicate values associated with the nodes represented by the sub-blocks.

In block 3606, the processing device causes the display device to visually hide at least a portion of the lines in the node-link diagram that represent connections between the layer and an adjacent layer of the feed forward neural network. For example, the processing device can cause the display device to visually hide a majority of the connections between a pooling layer 2510 and an adjacent hidden layer 2512. This may reduce visual clutter in the node-link diagram.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

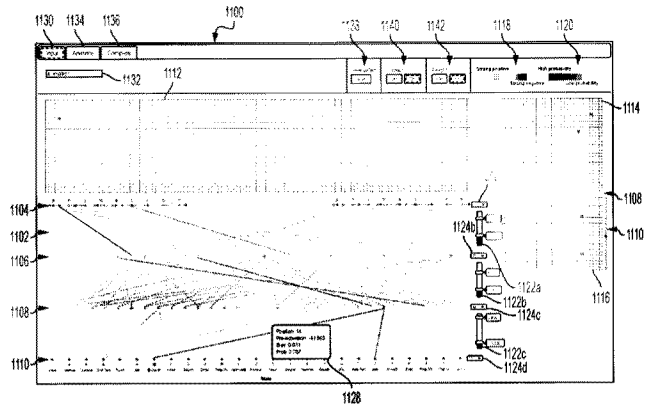

The invention claimed is:

1. A system for providing an interactive visualization of a convolutional neural network, the system comprising:
   a processing device; and
   a memory device on which instructions executable by the processing device are stored for causing the processing device to:

display, via a display device, a graphical user interface comprising a matrix having rows and columns of symbols indicating feature-map values that represent likelihoods of particular features being present or absent at various locations in an input to a convolutional neural network, each column in the matrix having feature-map values generated by convolving the input to the convolutional neural network with a respective filter for identifying a particular feature in the input;

detect, via an input device, an interaction with the graphical user interface indicating that the columns in the matrix are to be combined into a particular number of groups; and in response to detecting the interaction:
cluster the columns into the particular number of groups using a clustering method;
for each group of columns, determine a plurality of average feature-map values, each average feature-map value being determined by averaging the feature-map values represented in a respective row of the columns; and
display an updated version of the matrix within the graphical user interface by visually representing each respective group of columns as a single column of symbols within the matrix, each symbol in the single column of symbols having visual characteristics representing an average feature-map value, from among the plurality of average feature-map values, that corresponds to a row in which the symbol is positioned.

2. The system of claim 1, wherein the interaction is a first interaction, and wherein the memory device further includes instructions executable by the processing device for causing the processing device to:
detect a second interaction with the graphical user interface, the second interaction indicating that a group of columns represented by a single column in the updated version of the matrix is to be expanded; and
based on detecting the second interaction, display an expanded version of the matrix that visually includes all of the columns in the group of columns.

3. The system of claim 2, wherein the memory device further includes instructions executable by the processing device for causing the processing device to:
detect a third interaction indicating that the expanded version of the matrix is to be contracted; and
based on detecting the third interaction, display a contracted version of the matrix in which the group of columns are merged into the single column.

4. The system of claim 1, wherein the interaction is a first interaction, and wherein the memory device further includes instructions executable by the processing device for causing the processing device to:
detect a second interaction with the graphical user interface, the second interaction comprising hovering a cursor over a symbol in the matrix; and
based on detecting the second interaction, modify the graphical user interface by:
displaying a first matrix of blocks within the graphical user interface, the first matrix of blocks being color coded to represent weights of a filter used to generate a feature-map value indicated by the symbol; and
displaying a second matrix of blocks within the graphical user interface, the second matrix of blocks being color coded to represent values in a convolutional matrix formed by multiplying the weights of the filter by embedding weights corresponding to the symbol.

5. The system of claim 4, wherein:
the clustering method includes a k-means clustering method;
the first matrix of blocks is positioned above and adjacent to the second matrix of blocks;
the first matrix of blocks and the second matrix of blocks are positioned to a right of the matrix that has the rows and columns of symbols; and
the symbols in the matrix are color coded to represent the feature-map values.

6. The system of claim 1, wherein the interaction is a first interaction, and wherein the memory device further includes instructions executable by the processing device for causing the processing device to:
detect a second interaction with the graphical user interface, the second interaction indicating a threshold value for compressing the rows in the matrix; and
based on detecting the second interaction, display a compressed version of the matrix by:
determining that adjacent rows in the matrix have a Euclidian distance that is below the threshold value; and
merging the adjacent rows into a single row in the matrix, wherein the single row has symbols with visual characteristics that represent averages of the feature-map values represented by the adjacent rows.

7. The system of claim 6, wherein the memory device further includes instructions executable by the processing device for causing the processing device to:
detect a third interaction with the graphical user interface, the third interaction indicating that a group of rows represented by a single row in the compressed version of the matrix is to be expanded; and
based on detecting the third interaction, display an expanded version of the matrix by visually displaying all of the rows in the group of rows.

8. The system of claim 1, wherein the interaction is a first interaction, and wherein the memory device further includes instructions executable by the processing device for causing the processing device to include a node-link diagram within the graphical user interface, wherein the node-link diagram includes:
a first row of symbols representing an input layer to a feed forward neural network that is part of the convolutional neural network, the first row of symbols having visual characteristics representative of values at the input layer;
one or more rows of symbols representing one or more hidden layers of the feed forward neural network, the one or more rows of symbols having visual characteristics representative of values at the one or more hidden layers;
a final row of symbols representing an output layer of the feed forward neural network, the final row of symbols having visual characteristics representative of values at the output layer; and
lines between (i) the first row of symbols representing the input layer, (ii) the one or more rows of symbols representing the one or more hidden layers, and (iii) the final row of symbols representing the output layer, wherein the lines represent connections between the input layer, the one or more hidden layers, and the output layer.

9. The system of claim 8, wherein the interaction is a first interaction, and wherein the memory device further includes instructions executable by the processing device for causing the processing device to:
- detect a second interaction indicating that a layer of the feed forward neural network is to be deactivated in the graphical user interface; and
- based on detecting the second interaction:
  - visually represent the layer of the feed forward neural network as a line of blocks, each block representing a node in the layer of the feed forward neural network and being color coded to represent an activation value of the node; and
  - visually hide at least a portion of the lines that represent connections between the layer of the feed forward neural network and an adjacent layer of the feed forward neural network.

10. The system of claim 9, wherein the memory device further includes instructions executable by the processing device for causing the processing device to:
- determine that the adjacent layer is also to be deactivated in the graphical user interface; and
- based on determining that the adjacent layer is also to be deactivated in the graphical user interface, visually hide all of the lines that represent connections between the layer and an adjacent layer.

11. A method for providing an interactive visualization of a convolutional neural network, the method comprising:
- displaying, by a processing device and via a display device, a graphical user interface comprising a matrix having rows and columns of symbols indicating feature-map values that represent likelihoods of particular features being present or absent at various locations in an input to a convolutional neural network, each column in the matrix having feature-map values generated by convolving the input to the convolutional neural network with a respective filter for identifying a particular feature in the input;
- detecting, by the processing device and via an input device, an interaction with the graphical user interface indicating that the columns in the matrix are to be combined into a particular number of groups; and
- in response to detecting the interaction:
  - clustering, by the processing device, the columns into the particular number of groups using a clustering method;
  - for each group of columns, determining, by the processing device, a plurality of average feature-map values, each average feature-map value being determined by averaging the feature-map values represented in a respective row of the columns; and
  - displaying, by the processing device and via the display device, an updated version of the matrix within the graphical user interface by visually representing each respective group of columns as a single column of symbols within the matrix, each symbol in the single column of symbols having visual characteristics representing an average feature-map value, from among the plurality of average feature-map values, that corresponds to a row in which the symbol is positioned.

12. The method of claim 11, wherein the interaction is a first interaction, and further comprising:
- detecting a second interaction with the graphical user interface, the second interaction indicating that a group of columns represented by a single column in the updated version of the matrix is to be expanded; and
- based on detecting the second interaction, displaying an expanded version of the matrix that visually includes all of the columns in the group of columns.

13. The method claim 12, further comprising:
- detecting a third interaction indicating that the expanded version of the matrix is to be contracted; and
- based on detecting the third interaction, displaying a contracted version of the matrix in which the group of columns are merged into the single column.

14. The method of claim 11, wherein the interaction is a first interaction, and further comprising:
- detecting a second interaction with the graphical user interface, the second interaction comprising hovering a cursor over a symbol in the matrix; and
- based on detecting the second interaction, modifying the graphical user interface by:
  - displaying a first matrix of blocks within the graphical user interface, the first matrix of blocks being color coded to represent weights of a filter used to generate a feature-map value indicated by the symbol; and
  - displaying a second matrix of blocks within the graphical user interface, the second matrix of blocks being color coded to represent values in a convolutional matrix formed by multiplying the weights of the filter by embedding weights corresponding to the symbol.

15. The method of claim 14, wherein:
- the clustering method includes a k-means clustering method;
- the first matrix of blocks is positioned above and adjacent to the second matrix of blocks;
- the first matrix of blocks and the second matrix of blocks are positioned to a right of the matrix that has the rows and columns of symbols; and
- the symbols in the matrix are color coded to represent the feature-map values.

16. The method of claim 11, wherein the interaction is a first interaction, and further comprising:
- detecting a second interaction with the graphical user interface, the second interaction indicating a threshold value for compressing the rows in the matrix; and
- based on detecting the second interaction, displaying a compressed version of the matrix by:
  - determining that adjacent rows in the matrix have a Euclidian distance that is below the threshold value; and
  - merging the adjacent rows into a single row in the matrix, wherein the single row has symbols with visual characteristics that represent averages of the feature-map values represented by the adjacent rows.

17. The method of claim 16, further comprising:
- detecting a third interaction with the graphical user interface, the third interaction indicating that a group of rows represented by a single row in the compressed version of the matrix is to be expanded; and
- based on detecting the third interaction, displaying an expanded version of the matrix by visually displaying all of the rows in the group of rows.

18. The method of claim 11, further comprising including a node-link diagram within the graphical user interface, wherein the node-link diagram includes:
- a first row of symbols representing an input layer to a feed forward neural network that is part of the convolutional neural network, the first row of symbols having visual characteristics representative of values at the input layer;

one or more rows of symbols representing one or more hidden layers of the feed forward neural network, the one or more rows of symbols having visual characteristics representative of values at the one or more hidden layers;

a final row of symbols representing an output layer of the feed forward neural network, the final row of symbols having visual characteristics representative of values at the output layer; and lines between (i) the first row of symbols representing the input layer, (ii) the one or more rows of symbols representing the one or more hidden layers, and (iii) the final row of symbols representing the output layer, wherein the lines represent connections between the input layer, the one or more hidden layers, and the output layer.

19. The method of claim 18, further comprising:

detecting a second interaction indicating that a layer of the feed forward neural network is to be deactivated in the graphical user interface; and based on detecting the second interaction:
  visually representing the layer of the feed forward neural network as a line of blocks, each block representing a node in the layer of the feed forward neural network and being color coded to represent an activation value of the node; and
  visually hiding at least a portion of the lines that represent connections between the layer of the feed forward neural network and an adjacent layer of the feed forward neural network.

20. The method of claim 19, further comprising:

determining that the adjacent layer is also to be deactivated in the graphical user interface; and based on determining that the adjacent layer is also to be deactivated in the graphical user interface, visually hiding all of the lines that represent connections between the layer and an adjacent layer.

21. A non-transitory computer-readable medium comprising program code that is executable by a processing device for causing the processing device to:

display, via a display device, a graphical user interface comprising a matrix having rows and columns of symbols indicating feature-map values that represent likelihoods of particular features being present or absent at various locations in an input to a convolutional neural network, each column in the matrix having feature-map values generated by convolving the input to the convolutional neural network with a respective filter for identifying a particular feature in the input;

detect, via an input device, an interaction with the graphical user interface indicating that the columns in the matrix are to be combined into a particular number of groups; and in response to detecting the interaction:
  cluster the columns into the particular number of groups using a clustering method;
  for each group of columns, determine a plurality of average feature-map values, each average feature-map value being determined by averaging the feature-map values represented in a respective row of the columns; and
  display an updated version of the matrix within the graphical user interface by visually representing each respective group of columns as a single column of symbols within the matrix, each symbol in the single column of symbols having visual characteristics representing an average feature-map value, from among the plurality of average feature-map values, that corresponds to a row in which the symbol is positioned.

22. The non-transitory computer-readable medium of claim 21, wherein the interaction is a first interaction, and further comprising program code that is executable by the processing device for causing the processing device to:

detect a second interaction with the graphical user interface, the second interaction indicating that a group of columns represented by a single column in the updated version of the matrix is to be expanded; and based on detecting the second interaction, display an expanded version of the matrix that visually includes all of the columns in the group of columns.

23. The non-transitory computer-readable medium of claim 22, further comprising program code that is executable by the processing device for causing the processing device to:

detect a third interaction indicating that the expanded version of the matrix is to be contracted; and based on detecting the third interaction, display a contracted version of the matrix in which the group of columns are merged into the single column.

24. The non-transitory computer-readable medium of claim 21, wherein the interaction is a first interaction, and further comprising program code that is executable by the processing device for causing the processing device to:

detect a second interaction with the graphical user interface, the second interaction comprising hovering a cursor over a symbol in the matrix; and based on detecting the second interaction, modify the graphical user interface by:
  displaying a first matrix of blocks within the graphical user interface, the first matrix of blocks being color coded to represent weights of a filter used to generate a feature-map value indicated by the symbol; and
  displaying a second matrix of blocks within the graphical user interface, the second matrix of blocks being color coded to represent values in a convolutional matrix formed by multiplying the weights of the filter by embedding weights corresponding to the symbol.

25. The non-transitory computer-readable medium of claim 24, wherein:

the clustering method includes a k-means clustering method;

the first matrix of blocks is positioned above and adjacent to the second matrix of blocks;

the first matrix of blocks and the second matrix of blocks are positioned to a right of the matrix that has the rows and columns of symbols; and the symbols in the matrix are color coded to represent the feature-map values.

26. The non-transitory computer-readable medium of claim 21, wherein the interaction is a first interaction, and further comprising program code that is executable by the processing device for causing the processing device to:

detect a second interaction with the graphical user interface, the second interaction indicating a threshold value for compressing the rows in the matrix; and based on detecting the second interaction, display a compressed version of the matrix by:
  determining that adjacent rows in the matrix have a Euclidian distance that is below the threshold value; and merging the adjacent rows into a single row in the matrix, wherein the single row has symbols with visual characteristics that represent averages of the feature-map values represented by the adjacent rows.

27. The non-transitory computer-readable medium of claim 26, further comprising program code that is executable by the processing device for causing the processing device to:
- detect a third interaction with the graphical user interface, the third interaction indicating that a group of rows represented by a single row in the compressed version of the matrix is to be expanded; and
- based on detecting the third interaction, display an expanded version of the matrix by visually displaying all of the rows in the group of rows.

28. The non-transitory computer-readable medium of claim 21, further comprising program code that is executable by the processing device for causing the processing device to include a node-link diagram within the graphical user interface, wherein the node-link diagram includes:
- a first row of symbols representing an input layer to a feed forward neural network that is part of the convolutional neural network, the first row of symbols having visual characteristics representative of values at the input layer;
- one or more rows of symbols representing one or more hidden layers of the feed forward neural network, the one or more rows of symbols having visual characteristics representative of values at the one or more hidden layers;
- a final row of symbols representing an output layer of the feed forward neural network, the final row of symbols having visual characteristics representative of values at the output layer; and
- lines between (i) the first row of symbols representing the input layer, (ii) the one or more rows of symbols representing the one or more hidden layers, and (iii) the final row of symbols representing the output layer, wherein the lines represent connections between the input layer, the one or more hidden layers, and the output layer.

29. The non-transitory computer-readable medium of claim 28, further comprising program code that is executable by the processing device for causing the processing device to:
- detect a second interaction indicating that a layer of the feed forward neural network is to be deactivated in the graphical user interface; and
- based on detecting the second interaction:
  - visually represent the layer of the feed forward neural network as a line of blocks, each block representing a node in the layer of the feed forward neural network and being color coded to represent an activation value of the node; and
  - visually hide at least a portion of the lines that represent connections between the layer of the feed forward neural network and an adjacent layer of the feed forward neural network.

30. The non-transitory computer-readable medium of claim 29, further comprising program code that is executable by the processing device for causing the processing device to:
- determine that the adjacent layer is also to be deactivated in the graphical user interface; and
- based on determining that the adjacent layer is also to be deactivated in the graphical user interface, visually hide all of the lines that represent connections between the layer and an adjacent layer.

* * * * *

UNITED STATES PATENT AND TRADEMARK OFFICE
CERTIFICATE OF CORRECTION

PATENT NO. : 10,048,826 B2
APPLICATION NO. : 15/724029
DATED : August 14, 2018
INVENTOR(S) : Samuel Paul Leeman-Munk et al.

It is certified that error appears in the above-identified patent and that said Letters Patent is hereby corrected as shown below:

On the Title Page

Delete the Title Page and substitute therefore with the attached Title Page consisting of the corrected illustrative figure(s).

In the Drawings

Replacement Sheets for Figures 11, 12A, 12B, 15, 16, 17, 18A, 18B, 25, and 26 are included herewith. These are more legible versions of the existing figures.

Signed and Sealed this
Twentieth Day of November, 2018

Andrei Iancu
*Director of the United States Patent and Trademark Office*

(12) United States Patent
Leeman-Munk et al.

(10) Patent No.: US 10,048,826 B2
(45) Date of Patent: Aug. 14, 2018

(54) INTERACTIVE VISUALIZATIONS OF A CONVOLUTIONAL NEURAL NETWORK

(71) Applicants: SAS Institute Inc., Cary, NC (US); North Carolina State University, Raleigh, NC (US)

(72) Inventors: Samuel Paul Leeman-Munk, Cary, NC (US); Saratendu Sethi, Raleigh, NC (US); Christopher Graham Healey, Cary, NC (US); Shaoliang Nie, Raleigh, NC (US); Kalpesh Padia, Raleigh, NC (US); Ravinder Devarajan, Cary, NC (US); David James Caira, Chapel Hill, NC (US); Jordan Riley Benson, Ellerbe, NC (US); James Allen Cox, Cary, NC (US); Lawrence E. Lewis, Raleigh, NC (US); Mustafa Onur Kabul, Apex, NC (US)

(73) Assignees: SAS INSTITUTE INC., Cary, NC (US); NORTH CAROLINA STATE UNIVERSITY, Raleigh, NC (US)

( * ) Notice: Subject to any disclaimer, the term of this patent is extended or adjusted under 35 U.S.C. 154(b) by 0 days.

(21) Appl. No.: 15/724,029

(22) Filed: Oct. 3, 2017

(65) Prior Publication Data

US 2018/0095632 A1    Apr. 5, 2018

Related U.S. Application Data

(63) Continuation-in-part of application No. 15/584,984, filed on May 2, 2017, now Pat. No. 9,934,462.
(Continued)

(51) Int. Cl.
*G06N 3/04* (2006.01)
*G06F 3/0481* (2013.01)
(Continued)

(52) U.S. Cl.
CPC ............ *G06F 3/04812* (2013.01); *G06F 8/34* (2013.01); *G06N 3/04* (2013.01); *G06T 11/60* (2013.01); *G06N 3/105* (2013.01)

(58) Field of Classification Search
CPC ........................................................ G06N 3/04
(Continued)

(56) References Cited

U.S. PATENT DOCUMENTS

2006/0070005 A1    3/2006    Gilbert et al.
2015/0346972 A1    12/2015    Boekling et al.
(Continued)

OTHER PUBLICATIONS

Krizhevsky et al., "ImageNet Classification with Deep Convolutional Neural Networks" NIPS Proceedings, (2012), 9 pages.
(Continued)

*Primary Examiner* — Lut Wong
(74) *Attorney, Agent, or Firm* — Kilpatrick Townsend & Stockton LLP

(57) ABSTRACT

Interactive visualizations of a convolutional neural network are provided. For example, a graphical user interface (GUI) can include a matrix having symbols indicating feature-map values that represent likelihoods of particular features being present or absent at various locations in an input to a convolutional neural network. Each column in the matrix can have feature-map values generated by convolving the input to the convolutional neural network with a respective filter for identifying a particular feature in the input. The GUI can detect, via an input device, an interaction indicating that that the columns in the matrix are to be combined into a particular number of groups. Based on the interaction, the columns can be clustered into the particular number of groups using a clustering method. The matrix in the GUI can then be updated to visually represent each respective group of columns as a single column of symbols within the matrix.

30 Claims, 35 Drawing Sheets
(20 of 35 Drawing Sheet(s) Filed in Color)